(12) United States Patent
Joo et al.

(10) Patent No.: US 11,050,118 B2
(45) Date of Patent: Jun. 29, 2021

(54) LITHIUM ION BATTERIES COMPRISING NANOFIBERS

(71) Applicant: CORNELL UNIVERSITY, Ithaca, NY (US)

(72) Inventors: Yong Lak Joo, Ithaca, NY (US); Nathaniel S. Hansen, Portland, OR (US); Daehwan Cho, Austin, TX (US); Kyoung Woo Kim, Austin, TX (US)

(73) Assignee: Cornell University, Ithaca, NY (US)

( * ) Notice: Subject to any disclaimer, the term of this patent is extended or adjusted under 35 U.S.C. 154(b) by 232 days.

(21) Appl. No.: 16/035,823

(22) Filed: Jul. 16, 2018

(65) Prior Publication Data

US 2018/0331341 A1    Nov. 15, 2018

Related U.S. Application Data

(63) Continuation of application No. 14/382,403, filed as application No. PCT/US2013/028132 on Feb. 28, 2013, now abandoned.

(Continued)

(51) Int. Cl.
*H01M 2/16* (2006.01)
*H01M 10/0525* (2010.01)
(Continued)

(52) U.S. Cl.
CPC .......... *H01M 50/446* (2021.01); *D01D 5/003* (2013.01); *D01F 1/09* (2013.01);
(Continued)

(58) Field of Classification Search
CPC ........ D01D 5/003; D01D 5/0069; D01F 1/09; D01F 1/10; D01F 9/20; H01M 10/0525;
(Continued)

(56) References Cited

U.S. PATENT DOCUMENTS 7,326,043 B2    2/2008    Joo et al.
7,901,610 B2    3/2011    Joo et al.
(Continued)

FOREIGN PATENT DOCUMENTS

JP    H04112461    4/1992
JP    2000256491    9/2000
(Continued)

OTHER PUBLICATIONS

International Search Report Form PCT/ISA/220, International Application No. PCT/US2013/028132, p. 1-13, International Filing Date Feb. 28, 2013.

(Continued)

*Primary Examiner* — Lingwen R Zeng
(74) *Attorney, Agent, or Firm* — Bond, Schoeneck & King PLLC; Blaine T. Bettinger

(57) ABSTRACT

Lithium ion batteries, electrodes, nanofibers, and methods for producing same are disclosed herein. Provided herein are batteries having (a) increased energy density; (b) decreased pulverization (structural disruption due to volume expansion during lithiation/de-lithiation processes); and/or (c) increased lifetime. In some embodiments described herein, using high throughput, water-based electrospinning process produces nanofibers of high energy capacity materials (e.g., ceramic) with nanostructures such as discrete crystal domains, mesopores, hollow cores, and the like; and such nanofibers providing reduced pulverization and increased charging rates when they are used in anodic or cathodic materials.

20 Claims, 41 Drawing Sheets

Related U.S. Application Data

(60) Provisional application No. 61/605,937, filed on Mar. 2, 2012, provisional application No. 61/701,854, filed on Sep. 17, 2012, provisional application No. 61/717,222, filed on Oct. 23, 2012.

(51) Int. Cl.

| | | |
|---|---|---|
| *H01M 50/446* | (2021.01) | |
| *D01D 5/00* | (2006.01) | |
| *D01F 1/10* | (2006.01) | |
| *D01F 9/20* | (2006.01) | |
| *H01M 4/13* | (2010.01) | |
| *H01M 50/44* | (2021.01) | |
| *H01M 50/403* | (2021.01) | |
| *H01M 50/411* | (2021.01) | |
| *D01F 1/09* | (2006.01) | |
| *H01M 4/133* | (2010.01) | |
| *H01M 4/1393* | (2010.01) | |
| *H01M 4/1395* | (2010.01) | |
| *H01M 4/131* | (2010.01) | |
| *H01M 4/136* | (2010.01) | |
| *H01M 4/02* | (2006.01) | |
| *H01M 4/04* | (2006.01) | |
| *H01M 4/134* | (2010.01) | |

(52) U.S. Cl.
CPC .................. *D01F 1/10* (2013.01); *D01F 9/20* (2013.01); *H01M 4/13* (2013.01); *H01M 4/133* (2013.01); *H01M 4/1393* (2013.01); *H01M 4/1395* (2013.01); *H01M 10/0525* (2013.01); *H01M 50/403* (2021.01); *H01M 50/411* (2021.01); *H01M 50/44* (2021.01); *D01D 5/0069* (2013.01); *H01M 4/0469* (2013.01); *H01M 4/0471* (2013.01); *H01M 4/131* (2013.01); *H01M 4/134* (2013.01); *H01M 4/136* (2013.01); *H01M 2004/021* (2013.01)

(58) Field of Classification Search
CPC ........... H01M 2004/021; H01M 2/145; H01M 2/162; H01M 2/1633; H01M 4/0469; H01M 4/0471; H01M 4/13; H01M 4/131; H01M 4/133; H01M 4/134; H01M 4/136; H01M 4/1393; H01M 4/1395; H01M 50/403; H01M 50/411; H01M 50/44; H01M 50/446; Y02E 60/10

See application file for complete search history.

(56) References Cited

U.S. PATENT DOCUMENTS

| | | |
|---|---|---|
| 2008/0176139 A1 | 7/2008 | White et al. |
| 2010/0151311 A1 | 6/2010 | Usami et al. |
| 2010/0233523 A1 | 9/2010 | Jo et al. |
| 2010/0330421 A1 | 12/2010 | Cui et al. |
| 2011/0236769 A1* | 9/2011 | Xie .................. H01M 8/16 |
| | | 429/401 |
| 2012/0034512 A1 | 2/2012 | Zhang et al. |
| 2012/0070728 A1* | 3/2012 | Wertz .................. H01M 4/628 |
| | | 429/188 |
| 2012/0082884 A1* | 4/2012 | Orilall .................. H01M 2/1686 |
| | | 429/145 |

FOREIGN PATENT DOCUMENTS

| | | |
|---|---|---|
| JP | 2010500717 | 1/2010 |
| JP | 2010225809 | 10/2010 |
| KR | 1020100112378 A | 10/2010 |
| WO | 2008018656 | 2/2008 |
| WO | 2010138619 | 12/2010 |
| WO | 2011055967 | 5/2011 |
| WO | 2011068389 A2 | 6/2011 |
| WO | 2011100743 | 8/2011 |
| WO | 2013123137 | 8/2013 |

OTHER PUBLICATIONS

Office Action in Corresponding Japanese Application No. 2017-219134; dated Aug. 20, 2019; 1 page.
U.S. Appl. No. 13/036,441.
U.S. Appl. No. 61/599,541.

\* cited by examiner

A

B

A

B

A

B 0.63 mA — 1.02 mA — 2.30 mA — 6.90 mA — repeat

A

B

LITHIUM ION BATTERIES COMPRISING NANOFIBERS

CROSS-REFERENCE

The present application is a Continuation of U.S. Non-Provisional application Ser. No. 14/382,403, filed Sep. 2, 2014, which was a U.S. National Stage Entry of PCT Application No. PCT/US13/28132, filed Feb. 28, 2013, which derives priority from U.S. Provisional Application Nos. 61/605,937, entitled "Lithium Ion Batteries Comprising Nanofibers" filed Mar. 2, 2012, 61/701,854, entitled "Lithium Ion Batteries Comprising Nanofibers" filed Sep. 17, 2012, and 61/717,222, entitled "Silicon Nanocomposite Nanofibers" filed Oct. 23, 2012, the entirety of each of which is hereby incorporated by reference.

BACKGROUND OF THE INVENTION

Generally, a battery is a device that converts chemical energy directly to electrical energy, consisting of a number of voltaic cells; each voltaic cell comprises two half-cells connected in series by a conductive electrolyte containing anions and cations. Typically, one half-cell includes electrolyte and the electrode to which anions (negatively charged ions) migrate (i.e., the anode or negative electrode); the other half-cell includes electrolyte and the electrode to which cations (positively charged ions) migrate (i.e., the cathode or positive electrode). In the redox reaction that powers the battery, cations are reduced (electrons are added) at the cathode, while anions are oxidized (electrons are removed) at the anode. In general, the electrodes do not touch each other but are electrically connected by the electrolyte. Some cells use two half-cells with different electrolytes. In some instances, a separator between half-cells allows ions to flow, but prevents mixing of the electrolytes.

SUMMARY OF THE INVENTION

Provided herein are batteries (e.g., lithium ion batteries), battery components, nanofibers useful in batteries, and processes, apparatuses and systems for preparing such batteries, battery components, and nanofibers. In some embodiments, provided herein are lithium-containing nanofibers, electrodes and batteries comprising such nanofibers, as well as processes and systems for preparing the same. In certain embodiments, provided herein are high (e.g., anodic) energy capacity nanofibers, electrodes and batteries comprising such nanofibers, as well as processes and systems for preparing the same. In some embodiments, provided herein are polymer, polymer-clay composite, and polymer-ceramic nanocomposite nanofibers, separators and batteries comprising such nanofibers, as well as processes and systems for preparing the same.

In some embodiments, provided herein is a lithium-ion battery comprising:
a positive electrode, the positive electrode comprising one or more lithium-containing nanofiber;
a negative electrode, the negative electrode comprising one or more anodic nanofiber, the nanofiber comprising a high energy capacity material;
a separator, the separator comprising one or more polymer nanocomposite nanofiber; or
a combination thereof.

In some embodiments, a battery comprises (a) and (b). In other embodiments, a battery comprises (a) and (c). In certain embodiments, a battery comprises (b) and (c). In some embodiments, a battery comprises (a), (b) and (c). In certain embodiments, a battery comprises (a). In some embodiments, a battery comprises (b). In certain embodiments, a battery comprises (c).

In specific embodiments, the lithium ion battery comprises an anode in a first chamber, a cathode in a second chamber, and a separator between the first chamber and the second chamber, and the separator allowing ion transfer (e.g., Li+ ion transfer) between the first chamber and second chamber, e.g., in a temperature dependent manner.

In some embodiments, a battery provided herein comprises a separator comprising a polymer nanocomposite nanofiber. In certain embodiments, the polymer nanocomposite nanofiber comprises a continuous polymer matrix with ceramic and/or clay nanostructures embedded therein. In some embodiments, the polymer comprises PE, UHMWPE, PP, PVA, PAN, PEO, PVP, PVDF, Nylon, aramid, PET, Polyimide, PMMA, or a combination thereof. In specific embodiments, the polymer comprises PAN. In other specific embodiments, the polymer comprises PE or PP. In some embodiments, the polymer nanocomposite comprises a ceramic. In specific embodiments, the ceramic is silica, zirconia, or alumina. In some embodiments, the nanocomposite nanofiber comprises a clay. In specific embodiments, the clay is bentonite, aluminum phyllosilicate, montmorillonite, kaolinite, illite, vermiculite, smectite, chlorite, silicate clay, sesquioxide clays, allophane, imogolite, fluorohectorate, laponite, bentonite, beidellite, hectorite, saponite, nontronite, sauconite, ledikite, magadiite, kenyaite, stevensite, or a combination thereof. In some embodiments, the polymer nanocomposite nanofiber comprises 1-15 wt. % clay (e.g., 3-12 wt. %). In certain embodiments, the polymer nanocomposite nanofiber comprises 1-15 wt. % ceramic (e.g., 3-12 wt. %). In some embodiments, the polymer nanocomposite nanofiber comprises 1-15 wt. % of ceramic and clay combined (e.g., 3-12 wt. %). In some embodiments, the separator does not shrink or melt at elevated temperatures (e.g., at or above 150° C.). In further or alternative embodiments, the battery comprises an electrolyte and the separator is wettable by the electrolyte. In further or alternative embodiments, the separator has an average pore diameter of less than 1 micron (e.g., less than 0.5 micron). In further or alternative embodiments, the separator has a peak pore diameter distribution of less than 1 micron (e.g., less than 0.5 micron). In further or alternative embodiments, the polymer nanocomposite nanofibers are annealed. In further or alternative embodiments, the polymer nanocomposite nanofibers are compressed. In further or alternative embodiments, the separator has a thickness of 10-200 micron. In specific embodiments, the separator has a thickness of 15-100 micron. In more specific embodiments, the separator has a thickness of 30-100 micron. In still more specific embodiments, the separator has a thickness of 30-70 micron. In further or alternative embodiments, the separator has less than a 0.1% weight loss between 20° C. and 200° C. In further or alternative embodiments, the battery retains at least 50% of its discharge capacity (mAh/g) after 100 cycles at a charge rate of at least 250 mA per gram of separator. In specific embodiments, the battery retains at least 70% of its discharge capacity (mAh/g) after 100 cycles at a charge rate of at least 250 mA per gram of separator. In further or alternative embodiments, the battery comprising a separator that has an Rct that is less than 150 ohms (e.g., less than 120, or less than 100 ohms) in a half cell comprising 32 mg of $LiCoO_2$ powder as cathode and having a constant voltage=VOC (1.7-2.0V) (e.g., in a system illustrated in FIG. 48). In further or alternative embodiments, the battery comprising a separator that has an Rs that is less than 40 ohms in a half cell comprising 32 mg of $LiCoO_2$ powder as cathode and having a constant voltage=VOC (1.7-2.0V) (e.g., in a system illustrated in FIG. 48). In further or alternative embodiments, the polymer nanocomposite nanofiber has a diameter of less than 2 micron, or less than 1 micron (e.g., less than 500 nm). In further or alternative embodiments, the polymer nanocomposite nanofiber has an aspect ratio of at least 10 (e.g., at least 100, at least 1000, at least 10,000). In further or alternative embodiments, the polymer nanocomposite nanofiber has a specific surface area of at least 10 $m^2/g$ (e.g., at least 30 $m^2/g$, at least 100 $m^2/g$, at least 300 $m^2/g$, at least 500 $m^2/g$, or at least 1000 $m^2/g$, e.g., as measured by BET). In further or alternative embodiments, the polymer nanocomposite nanofiber has a length of at least 1 micron (e.g., at least 10 microns, at least 100 micron, at least 1,000 micron).

In some embodiments, the positive electrode comprises one or more lithium-containing nanofiber. In certain embodiments, the one or more lithium-containing nanofiber comprises a continuous matrix of a lithium material. In specific embodiments, the continuous matrix of a lithium material is a continuous core matrix or a continuous tubular matrix surrounding a hollow core. In some embodiments, the one or more lithium containing nanofiber comprises a continuous matrix of a first material (e.g., carbon, metal or ceramic), and discrete domains of lithium material embedded in the first material.

In some embodiments, the lithium material has the following formula (I): $Li_aM_bX_c$ (I). In some embodiments, M is one or more metal element (e.g., Fe, Ni, Co, Mn, V, Ti, Zr, Ru, Re, Pt, Bi, Pb, Cu, Al, Li, or a combination thereof). In certain embodiments, X is one or more non-metal (e.g., X represents C, N, O, P, S, $SO_4$, $PO_4$, Se, halide, F, CF, $SO_2$, $SO_2Cl_2$, I, Br, $SiO_4$, $BO_3$, or a combination thereof) (e.g., a non-metal anion). In some embodiments, a is 1-5 (e.g., 1-2), b is 0-2, and c is 0-10 (e.g., 1-4, or 1-3). In specific embodiments, X is selected from the group consisting of O, $SO_4$, $PO_4$, $SiO_4$, and $BO_3$. In more specific embodiments, X is selected from the group consisting of O, $PO_4$, and $SiO_4$. In further or alternative embodiments, M is Mn, Ni, Co, Fe, V, Al, or a combination thereof. In specific embodiments, the lithium material is $LiMn_2O_4$, $LiNi_{1/3}Co_{1/3}Mn_{1/3}O_2$, $LiCoO_2$, $LiNiO_2$, $LiFePO_4$, or $Li_2FePO_4F$. In other specific embodiments, the lithium material is $LiNi_{b1}Co_{b2}Mn_{b3}O_2$, wherein b1+b2+b3=1, and wherein 0≤b1, b2, b3<1. In yet other specific embodiments, the lithium material is $LiMn_2O_4$, $LiMnPO_4$, $LiNiPO_4$, $LiCoPO_4$, $Li_3V_2(PO_4)_3$, $Li_2FeSiO_4$, $Li_2MnSiO_4$, $LiFeBO_3$, or $LiMnBO_3$. In still other embodiments, the lithium material of formula (I) is $Li_2SO_{y'}$, wherein y' is 0-4, (e.g., $Li_2S$ or $Li_2SO_4$).

In some embodiments, the lithium material comprises at least 50 wt. % (e.g., at least 80 wt. %) of the lithium-containing nanofiber. In further or alternative embodiments, the lithium-containing nanofiber comprises at least 2.5 wt. % lithium. In further or alternative embodiments, at least 10% (e.g., about 25%) of the atoms present in the lithium-containing nanofiber are lithium atoms. In further or alternative embodiments, the lithium-containing nanofiber has a diameter of less than 1 micron (e.g., less than 500 nm). In further or alternative embodiments, the lithium-containing nanofiber has an aspect ratio of at least 10 (e.g., at least 100, at least 1,000, at least 10,000). In further or alternative embodiments, the lithium-containing nanofiber has a specific surface area of at least 10 $m^2/g$ (e.g., at least 30 $m^2/g$, at least 100 $m^2/g$, at least 300 $m^2/g$, at least 500 $m^2/g$, or at least 1000 $m^2/g$, e.g., as measured by BET). In further or alternative embodiments, the lithium-containing nanofiber has a length of at least 1 micron (e.g., at least 10 microns, at least 100 micron, at least 1,000 micron). In further or alternative embodiments, the lithium-containing nanofibers having an initial capacity of at least 100 mAh/g (e.g., at a charge/discharge rate of 0.1 C).

In some embodiments, the negative electrode comprises one or more nanofiber comprising a high energy capacity material. In some embodiments, the nanofiber comprises a continuous matrix of high energy capacity material. In specific embodiments, the continuous matrix of a high energy capacity material is a continuous core matrix or a continuous tubular matrix surrounding a hollow core. In some embodiments, the nanofiber comprises a continuous matrix of a first material (e.g., carbon, metal or ceramic), and discrete domains of high energy capacity material embedded in the first material. In specific embodiments, the high energy capacity material is Si, Sn, Ge, an oxide thereof, a carbide thereof, an alloy thereof, or a combination thereof. In some embodiments, the nanofiber comprises a continuous matrix of porous silicon (e.g., mesoporous silicon). In certain embodiments, the nanofiber comprises a continuous matrix of silicon alloy, tin oxide, tin, or germanium. In some embodiments, the nanofiber comprises a carbon matrix (e.g., backbone or tube surrounding a hollow core) with silicon-containing domains (e.g., silicon nanoparticles) embedded therein. In certain embodiments, the nanofiber comprises a carbon backbone with tin-containing or germanium-containing domains (e.g., silicon nanoparticles) embedded therein. In some embodiments, the nanofiber comprises a ceramic backbone with tin-containing or germanium-containing domains (e.g., silicon nanoparticles) embedded therein. In certain embodiments, domains of the nanofibers have an average diameter of less than 100 nm (e.g., less than 60 nm, 10-80 nm, or the like). In further or alternative embodiments, the nanofibers comprise, on average, less than 25 wt. % of carbon. In further or alternative embodiments, the nanofibers comprise, on average, at least 50 elemental wt. % of high energy capacity material. In specific embodiments, the nanofibers comprise, on average, at least 75 elemental wt. % of high energy capacity material. In further or alternative embodiments, domains of the nanofibers are non-aggregated. In further or alternative embodiments, the nanofibers have a specific energy capacity of at least 500 mAh/g on a first cycle at 0.1 C (e.g., as measured in a half-cell). In more specific embodiments, the nanofibers have a specific energy capacity of at least 1000 mAh/g on a first cycle at 0.1 C. In still more specific embodiments, the nanofibers have a specific energy capacity of at least 1500 mAh/g on a first cycle at 0.1 C. In yet more specific embodiments, the nanofibers have a specific energy capacity of at least 2000 mAh/g on a first cycle at 0.1 C. In further or alternative embodiments, the nanofiber has a diameter of less than 1 micron (e.g., less than 500 nm). In further or alternative embodiments, the nanofiber has an aspect ratio of at least 10 (e.g., at least 100, at least 1000, at least 10,000, or the like). In further or alternative embodiments, the nanofiber has a specific surface area of at least 10 $m^2/g$ (e.g., at least 30 $m^2/g$, at least 100 $m^2/g$, at least 300 $m^2/g$, at least 500 $m^2/g$, or at least 1000 $m^2/g$, e.g., as measured by BET). In further or alternative embodiments, the nanofiber has a length of at least 1 micron (e.g., at least 10 microns, at least 100 micron, at least 1,000 micron).

In further or alternative embodiments, the cathode or anode has a specific energy capacity retention of at least 25% (e.g., at least 30%, at least 40%, at least 50%) after 100 cycles at 0.1 C.

In further or alternative embodiments, the cathode or anode has a specific energy capacity retention of at least 25% (e.g., at least 30%, at least 40%, at least 50%, at least 60%, at least 70%) after 50 cycles at 0.1 C.

In some embodiments, provided herein is a battery comprising any separator described herein, any positive electrode (cathode) described herein, and any negative electrode (anode) described herein.

In some embodiments, provided herein is a process for preparing a nanofiber for use in a lithium ion battery, the process comprising electrospinning a fluid stock to form nanofibers, the fluid stock comprising or prepared by combining:

a metal precursor (e.g., lithium precursor, silicon precursor, tin precursor, germanium precursor, or the like) or a plurality of metal nanostructures (e.g., nanoparticles) (e.g., comprising lithium metal oxide—for cathode nanofibers, silicon—for anode nanofibers, clay—for separator nanofibers, ceramic—for separator nanofibers, or the like) and a polymer; and optionally thermally treating the nanofibers.

Provided in some embodiments is a process for producing lithium-containing nanofibers (e.g., for a lithium ion battery positive electrode), the process comprising:

electrospinning a fluid stock to form as-spun nanofibers, the fluid stock comprising lithium precursor, an optional second metal precursor, and a polymer; and optionally thermally treating the as-spun nanofibers to produce the lithium containing nanofibers.

In some embodiments, the process further comprises chemically treating (e.g., oxidizing, such as with air) the as-spun nanofibers. In certain embodiments, the process further comprises chemically treating (e.g., oxidizing, such as with air) the lithium containing nanofibers (e.g., to oxidize the lithium material and remove carbon).

Provided in certain embodiments herein is a process for producing lithium containing nanofibers, the process comprising electrospinning a fluid stock to form as-spun nanofibers, the fluid stock comprising a plurality of nanoparticles and a polymer, the plurality of nanoparticles comprising a lithium material; and optionally thermally treating the as-spun nanofibers to produce the lithium containing nanofibers.

In some embodiments, provided herein is a process for producing nanofibers (e.g., for use in a lithium ion battery negative electrode), the process comprising:

electrospinning a fluid stock to form as-spun nanofibers, the fluid stock comprising or prepared by combining high energy capacity precursor and polymer; and optionally thermally treating the as-spun nanofibers.

Provided in certain embodiments herein, is a process for producing nanofibers (e.g., for use in a lithium ion battery negative electrode), the process comprising:

electrospinning a fluid stock to form as-spun nanofibers, the fluid stock comprising a plurality of nanoparticles and a polymer, the plurality of nanoparticles comprising a high energy capacity anodic material; and optionally thermally treating the as-spun nanofibers.

In some embodiments, provided herein is a process for producing a nanofiber, the process comprising gas assisted electrospinning a fluid stock to form the nanofibers, the fluid stock comprising (i) a plurality of nanoparticles, and (ii) a polymer, the nanofibers comprising a continuous polymer matrix with non-aggregated nanoparticles embedded therein. In specific embodiments, the gas assistances is provided along or around a common axis as the electrospun stock/jet.

In certain embodiments, the polymer of any process described herein is polyvinyl alcohol (PVA), polyvinyl acetate (PVAc), polyethylene oxide (PEO), polyvinyl ether, polyvinyl pyrrolidone, polyglycolic acid, hydroxyethylcellulose (HEC), ethylcellulose, cellulose ethers, polyacrylic acid, polyisocyanate, polyacrylonitrile (PAN), or a combination thereof. In specific embodiments, the polymer is PVA (e.g., wherein the fluid stock comprises water). In other specific embodiments, the polymer is PAN (e.g., wherein the fluid stock comprises DMF). In some embodiments, the electrospinning of the fluid stock according to any process described herein is gas assisted (e.g., coaxially—along or around the same axis—gas assisted). In certain embodiments, any precursor provided herein (e.g., high capacity precursor, lithium precursor, silicon precursor, metal precursor) is a metal acetate, metal nitrate, metal acetylacetonate, metal halide, or any combination thereof.

As described herein, controlling the crystal size, concentration, and morphology of high energy capacity materials within the anode and cathode is useful for (a) increasing the energy density of the battery while (b) decreasing the pulverization (structural disruption due to volume expansion during lithiation/de-lithiation processes) and (c) increasing the lifetime of the battery. In some embodiments described herein, using high throughput, water-based spinning process produces nanofibers of high energy capacity materials (e.g., ceramic) with nanostructures such as discrete crystal domains, mesopores, hollow cores, and the like which reduce pulverization and increase charging rates when they are applied to anodic or cathodic materials.

Provided in certain embodiments here are batteries (e.g., lithium-ion batteries) comprising an electrolyte and, for example:

a. an electrode, the electrode comprising a plurality of nanofibers comprising domains of a high energy capacity material (e.g., in a continuous matrix material);

b. an electrode, the electrode comprising porous nanofibers, the nanofibers comprising a high energy capacity material (e.g., "pure" nanofibers of the high energy capacity material);

c. an anode in a first chamber, a cathode in a second chamber, and a separator between the first chamber and the second chamber, the separator comprising polymer nanofibers, and the separator allowing ion transfer between the first chamber and second chamber in a temperature dependent manner; or d. any combination thereof.

Also, provided in certain embodiments herein methods for producing an electrode, the methods comprising, for example:

a. electrospinning a fluid stock to form nanofibers, the fluid stock comprising a high energy capacity material or precursor thereof and a polymer;

b. heating the nanofibers; and c. assembling the nanofibers into an electrode.

Further embodiments are also contemplated herein, such as those described in the claims and the detailed description.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
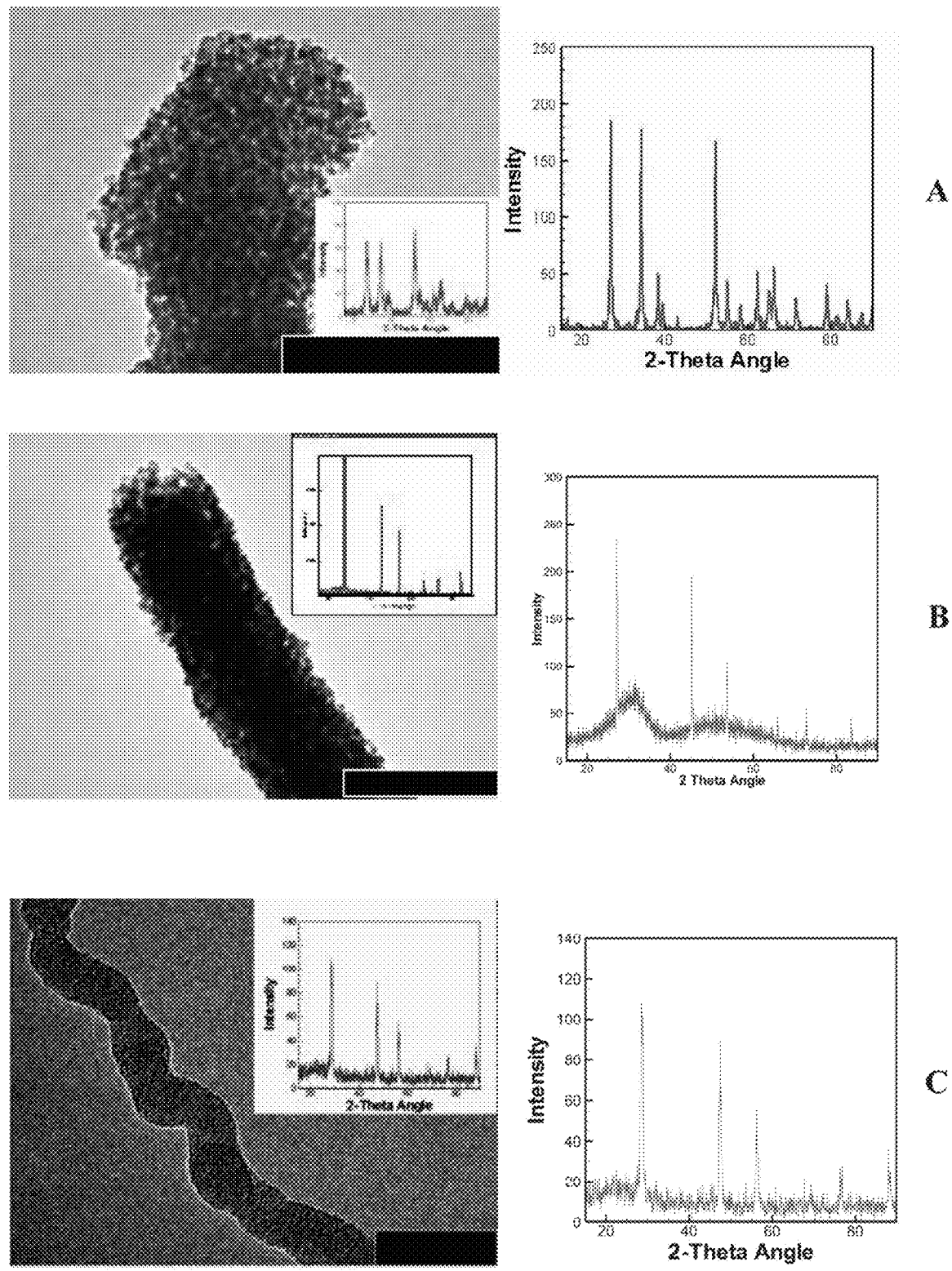
FIG. 1 illustrates (a) an SEM and XRD image of a nanofiber comprising a continuous matrix of (crystalline) $SnO_2$ (panel A), (b) an SEM and XRD image of a nanofiber comprising a continuous matrix of Ge (panel B), and (c) an SEM and XRD image of a nanofiber comprising a Si in a continuous matrix of carbon (panel C).

Described in certain embodiments herein are batteries (e.g., lithium-ion batteries), nanofiber cathodes, nanofiber anodes, and nanofiber separators. Also, provided in certain embodiments herein are lithium containing nanofibers (e.g., for use in a cathode/positive electrode in a lithium ion battery). Provided in some embodiments herein are nanofibers comprising a material capable of lithium uptake—such as lithium alloying or lithium integration (e.g., when used as an anode material in a lithium ion battery). Provided in further embodiments herein are polymer and polymer nanocomposite (e.g., polymer-nanoclay and polymer-nanoceramic) nanofibers (e.g., and battery separators comprising the same).

In some embodiments, provided herein are batteries (e.g., lithium ion batteries) comprising an electrode (e.g., comprising nanofibers—such as those described herein) and methods for making such batteries (e.g., lithium ion battery). In some embodiments, the electrode comprises a plurality of nanofibers, the nanofibers comprising domains of a high energy capacity material (e.g., a material that has a high specific capacity (mAh/g) when used as an electrode material in a lithium ion battery). In some embodiments, the electrode comprises nanofibers comprising a continuous matrix of a high energy capacity material (e.g., a backbone of, a core continuous matrix, a tubular continuous matrix (with a hollow core) of a high energy capacity material). In some embodiments, the electrode comprises porous nanofibers, the nanofibers comprising a high energy capacity material.

Described in certain embodiments herein are batteries (e.g., lithium-ion batteries) and methods for making a battery (e.g., lithium ion battery) comprising a separator. In some embodiments, the battery comprises an anode in a first chamber, a cathode in a second chamber, and a separator between the first chamber and the second chamber. In some embodiments, the separator comprises polymer nanofibers. In some embodiments, the separator allows ion transfer between the first chamber and second chamber in a temperature dependent manner.

In some embodiments, the lithium-ion battery comprises an electrolyte.

Batteries

In certain embodiments, provided herein is a battery (e.g., lithium ion battery) comprising any one or more feature selected from the group consisting of:

an electrode (e.g., cathode or positive electrode) comprising a lithium-containing nanofiber (e.g., as described herein, such as comprising a continuous matrix of a lithium material—such as lithium metal oxide, a lithium metal phosphate, or the like—or comprising non-aggregated nanodomains of a lithium material embedded in a continuous matrix material);

an electrode (e.g., anode or negative electrode) comprising a high energy density nanofiber (e.g., comprising a continuous matrix of a material having a high specific capacity in lithium ion batteries (e.g., higher than carbon)—such as Si, Sn, $SnO_2$, Al, an Sn alloy, an Si alloy, or the like—or comprising non-aggregated nano-domains of a material having a high specific capacity embedded in a continuous matrix material);

a polymer nanofiber separator (e.g., as described herein—such as comprising PAN nanofibers, polymer-nanoclay nanocomposite nanofibers, polymer-nanoceramic nanofibers, or the like); or any combination thereof.

In some aspects, any battery (e.g., lithium-ion battery) described herein has a high charge capacity. In further or alternative embodiments, any battery (e.g., lithium ion battery) described herein has a high energy capacity. In still further or additional embodiments, a battery (e.g., a lithium ion battery) provided herein has a high stability at elevated temperatures, is stable over a high number of charge cycles, has a fast recharging time, has a high energy density, and/or a high power density, among other performance features. In some aspects methods are described for making electrodes suitable for use in batteries (e.g., lithium ion batteries) having a high charge capacity, having a high energy capacity, having a high stability at elevated temperatures, are stable over a high number of charge cycles, having a fast recharging time, having a high energy density, and/or having a high power density, among other performance features.

Intercalation and deintercalation of lithium ions to and from the electrodes of lithium ion batteries causes the volume of the electrodes to expand and contract in some instances. In some embodiments, the electrodes comprising the battery are not pulverized, broken, degraded, reduced to pieces, and/or reduced to particles. In some embodiments, the electrode (or the high energy capacity material portions of the electrode, such as Si nanoparticles in embedded within a carbon matrix of a nanofiber, or a mesoporous Si nanofiber) is capable of expanding its volume by about 10%, about 20%, about 50%, about 100%, about 150%, about 200%, about 300%, about 400%, about 500%, and the like. In some embodiments, the electrode (or the high energy capacity material portions of the electrode) is capable of expanding its volume by at least 10%, at least 20%, at least 50%, at least 100%, at least 150%, at least 200%, at least 300%, at least 400%, at least 500%, or more. In some instances, this expansion is achieved without, with minimal, or with reduced (e.g., as described herein) pulverization, breaking, degradation, or reduction to pieces or particles (e.g., of the electrode, or of the nanofibers, or portions thereof, within the electrode).

In some instances, lithium ion batteries lose charge capacity over time and/or charge cycles (i.e., one cycle of discharge and recharge of the battery). In some instances, pulverization of the electrodes or reorganization of crystalline forms (e.g., into a form that does not allow relithiation) may be a cause that decreases the charge capacity of the electrodes. In some embodiments, the batteries described herein have a high charge capacity after a plurality of charge cycles. In some embodiments, the charge capacity of the battery is degraded by about 1%, about 2%, about 5%, about 10% or about 20% after 100 charge cycles. In some embodiments, the charge capacity of the battery is degraded by at most 1%, at most 2%, at most 5%, at most 10% or at most 20% or at most 30% or at most 50% after 100 charge cycles. In some embodiments, the charge capacity of the battery is degraded by at most 1%, at most 2%, at most 5%, at most 10% or at most 20% or at most 30% or at most 50% after 20 charge cycles, 40 charge cycles, 50 charge cycles, 75 charge cycles, or the like.

In some instances, lithium ion batteries lose energy capacity over time and/or charge cycles. Without limitation, pulverization of the electrodes may be the or one cause that decreases the energy capacity of the electrodes. In some embodiments, the batteries described herein have a high energy capacity after a plurality of charge cycles. In some embodiments, the energy capacity of the battery is degraded by about 1%, about 2%, about 5%, about 10% or about 20% after 100 charge cycles. In some embodiments, the energy capacity of the battery is degraded by at most 1%, at most 2%, at most 5%, at most 10% or at most 20% or at most 30% or at most 50% after 100 charge cycles. In some embodiments, the energy capacity of the battery is degraded by at most 1%, at most 2%, at most 5%, at most 10% or at most 20% or at most 30% or at most 50% after 20 charge cycles, 40 charge cycles, 50 charge cycles, 75 charge cycles, or the like.

In one aspect, the lithium ion batteries described herein are stable. In some embodiments, stable battery has an energy density of at least 50%, at least 75%, at least 90%, and the like of its initial value (e.g., after 50 charge cycles, at least 100 charge cycles, at least 300 charge cycles, or more). In some embodiments, the battery is stable if the power density of the battery is at least 50%, at least 75%, at least 90%, and the like of its initial value (e.g., after 50 charge cycles, at least 100 charge cycles, at least 300 charge cycles, or more). In some embodiments, the battery is stable if the energy capacity of the battery is at least 50%, at least 75%, at least 90%, and the like of its initial value (e.g., after 50 charge cycles, at least 100 charge cycles, at least 300 charge cycles, or more). In some embodiments, the battery is stable if the charge capacity of the battery is at least 50%, at least 75%, at least 90%, and the like of its initial value (e.g., after 50 charge cycles, at least 100 charge cycles, at least 300 charge cycles, or more). In some embodiments, the battery is stable if the recharging time of the battery is at least 50%, at least 75%, at least 90%, and the like of its initial value (e.g., after 50 charge cycles, at least 100 charge cycles, at least 300 charge cycles, or more). Further, in some instances, a battery provided herein has an energy density or charge capacity at least 300% higher, at least 500% higher, at least 800% higher, or more than a comparable carbon anode.

In one aspect, the lithium ion batteries described herein are stable over a high number of charge cycles. The number of charge cycles is any suitable number. In some embodiments, the battery is stable after about 50, about 100, about 500, about 1,000, about 5,000, or about 10,000 charge cycles. In some embodiments, the battery is stable after at least 50, at least 100, at least 500, at least 1,000, at least 5,000, or at least 10,000 charge cycles.

In one aspect, the lithium ion batteries described herein are stable at high temperatures. In some embodiments, the battery is stable at 50° C., at 75° C., at 100° C., at 150° C., at 200° C., at 300° C., at 400° C., and the like. In some embodiments, the battery is stable at a high temperature for any suitable amount of time. In some embodiments, the battery is stable for 1 hour, 1 day, 1 week, 1 month, or one year. In one embodiment, the battery is stable for at least 7 days at a temperature of 150° C.

In one aspect, the lithium ion batteries described herein are capable of being recharged quickly. In some embodiments, the battery is capable of being recharged in any suitable amount of time including about 30 minutes, about 1 hour, about 2 hours, about 3 hours, about 4 hours, about 5 hours, about 7 hours, about 9 hours, and the like. In some embodiments, the battery is capable of being recharged in less than 30 minutes, less than 1 hour, less than 2 hours, less than 3 hours, less than 4 hours, less than 5 hours, less than 7 hours, less than 9 hours, and the like. The notation (C/1) indicates that the battery is capable of being recharged in 1 hour, (C/5 or 0.2 C) in 5 hours, and the like.

In one aspect, the lithium ion batteries described herein have a high energy density. The energy density is any suitably high value. In some embodiments, the battery has an energy density of about 100, about 150, about 200, about 250, about 300, about 350, about 400, or about 500 Wh/kg. In some embodiments, the battery has an energy density of at least 100, at least 150, at least 200, at least 250, at least 300, at least 350, at least 400, or at least 500 Wh/kg.

In one aspect, the lithium ion batteries described herein have a high power density. The power density is any suitably high value. In some embodiments, the battery has a power density of about 300, about 400, about 500, about 750, about 1,000, about 1,200, about 1,400, about 1,600, about 1,800, about 2,000, about 3,000, and the like W/kg. In some embodiments, the battery has a power density of at least 300, at least 400, at least 500, at least 750, at least 1,000, at least 1,200, at least 1,400, at least 1,600, at least 1,800, at least 2,000, at least 3,000, and the like W/kg.

Negative Electrode/Anode and Nanofibers Therefor

In some embodiments, an anode (or negative electrode) described herein comprises a plurality of nanofibers. In certain embodiments, an anode provided herein comprises a plurality of nanofibers comprising a high energy capacity material. In specific embodiments, the anode comprises a continuous matrix material (e.g., carbon, ceramic, or the like) and discrete domains of a high energy capacity material. In other specific embodiments, the anode comprises a continuous matrix of a high energy capacity material. In some instances, the anode or high energy capacity material comprises Si, Ge, Sn, Co, Cu, Fe, any oxidation state thereof, or any combination thereof. In certain embodiments, the anode or high energy capacity material comprises Si, Ge, Sn, Al, an oxide thereof, a carbide thereof, or an alloy thereof. In specific embodiments, the anode or high energy capacity material comprises $SiO_2$, Sn, Si, Al, Ge, or an Si alloy. In certain embodiments, provided herein are mesoporous nanofibers (e.g., comprising a continuous silicon matrix).

Figure 2:
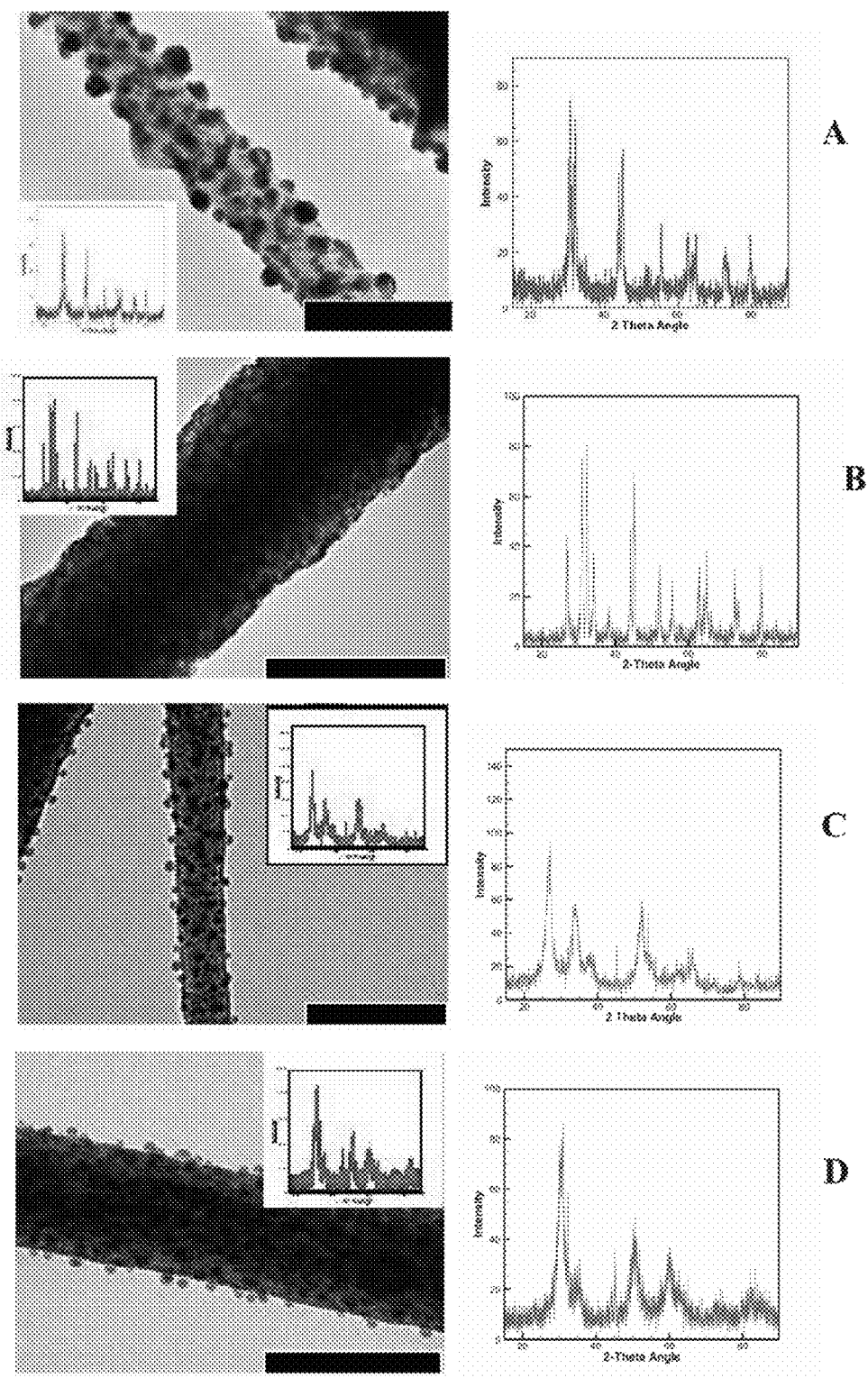
FIG. 2 illustrates (a) an SEM and XRD image of a nanofiber comprising (crystalline) Sn in a continuous matrix of (amorphous) Sn (panel A), (b) an SEM and XRD image of a nanofiber comprising (crystalline) Sn in a continuous matrix carbon (panel B), (c) an SEM and XRD image of a nanofiber comprising (crystalline) Sn in a continuous matrix of alumina ($Al_2O_3$) (panel C) and (d) an SEM and XRD image of a nanofiber comprising (crystalline) Sn in a continuous matrix of zirconia ($ZrO_2$) (panel D).
Figure 3:
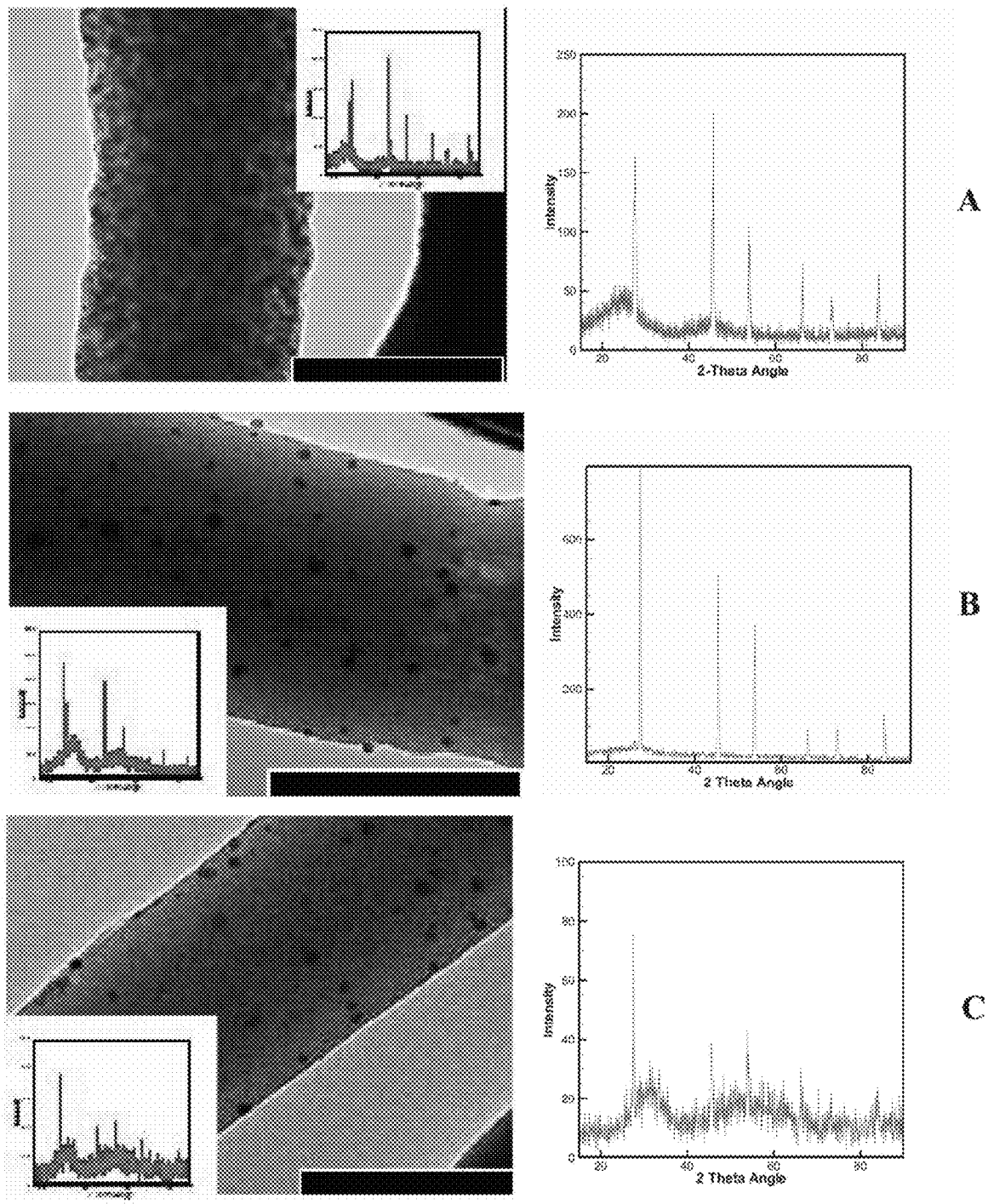
FIG. 3 illustrates (a) an SEM and XRD image of a nanofiber comprising (crystalline) Ge in a continuous matrix of carbon (carbonized from PAN) (panel A), (b) an SEM and XRD image of a nanofiber comprising (crystalline) Ge in a continuous matrix alumina ($Al_2O_3$) (panel B) and (c) an SEM and XRD image of a nanofiber comprising (crystalline) Ge in a continuous matrix of zirconia ($ZrO_2$) (panel C).

FIG. 1 illustrates (a) an SEM image of a nanofiber comprising a continuous matrix of (crystalline) $SnO_2$ (panel A), (b) an SEM image of a nanofiber comprising a continuous matrix of Ge (panel B), and (c) an SEM image of a nanofiber comprising a Si in a continuous matrix of carbon (panel C). In some instances, the nanofibers of FIG. 1 are prepared by electrospinning a fluid stock comprising a polymer (e.g., PVA) and a metal precursor (e.g., tin precursor, germanium precursor, or silicon precursor, respectively), subsequently followed by thermal treatment (e.g., under oxidizing, inert, or reducing conditions—such as using hydrogen or a sacrificial oxidizing agent). FIG. 2 illustrates (a) an SEM image of a nanofiber comprising (crystalline) Sn in a continuous matrix of (amorphous) Sn (panel A), (b) an SEM image of a nanofiber comprising (crystalline) Sn in a continuous matrix carbon (panel B), (c) an SEM image of a nanofiber comprising (crystalline) Sn in a continuous matrix of alumina ($Al_2O_3$) (panel C) and (d) an SEM image of a nanofiber comprising (crystalline) Sn in a continuous matrix of zirconia ($ZrO_2$) (panel D). In some instances, the nanofibers of FIG. 2 are optionally prepared by electrospinning a fluid stock comprising (i) Sn nanoparticles, and (ii) tin precursor and polymer (e.g., PVA), polymer (e.g., PAN), aluminum precursor (e.g., aluminum acetate) and polymer (e.g., PVA), or zirconium precursor (e.g., zirconium acetate) and polymer (e.g., PVA), respectively, followed by thermal treatment (e.g., under inert conditions, such as in (b), or oxidizing conditions, such as in (a), (c) or (d)). FIG. 3 illustrates (a) an SEM image of a nanofiber comprising (crystalline) Ge in a continuous matrix of carbon (carbonized from PAN) (panel A), (b) an SEM image of a nanofiber comprising (crystalline) Ge in a continuous matrix alumina ($Al_2O_3$) (panel B) and (d) an SEM image of a nanofiber comprising (crystalline) Ge in a continuous matrix of zirconia ($ZrO_2$) (panel C). In some instances, the nanofibers of FIG. 3 are optionally prepared by electrospinning a fluid stock comprising (i) Ge nanoparticles, and (ii) polymer (e.g., PAN), aluminum precursor (e.g., aluminum acetate) and polymer (e.g., PVA), or zirconium precursor (e.g., zirconium acetate) and polymer (e.g., PVA), respectively, followed by thermal treatment (e.g., under inert conditions, such as in (a), or oxidizing conditions, such as in (b) or (c)). In specific embodiments, the electrospinning of such fluid stocks is gas assisted.

Figure 10:
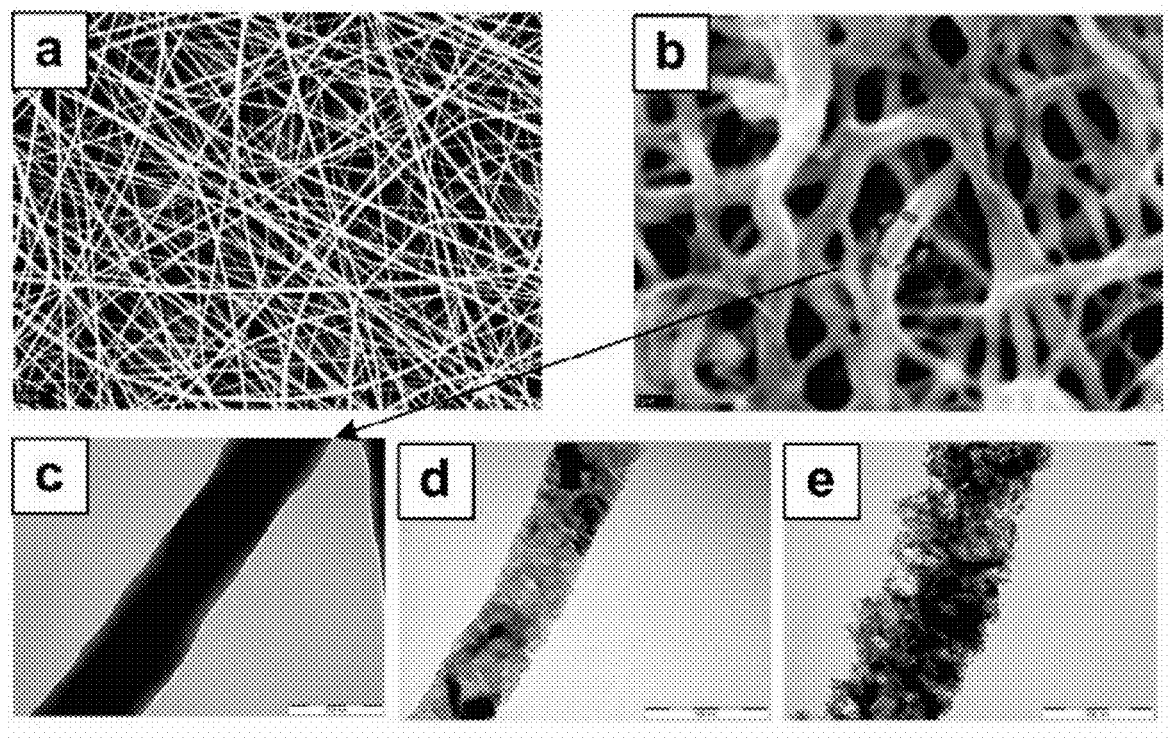
FIG. 10 illustrates an (a) SEM image of as-spun silicon precursor/polymer nanofibers, (b) SEM image of silica nanofibers (heated from (a)), (c) TEM image of silica nanofibers, (d) TEM image of Si/MgO nanofibers (silica nanofibers heated under vacuum with Mg), and (e) TEM image of mesoporous silicon nanofibers (HCl treated from (d)).
Figure 11:
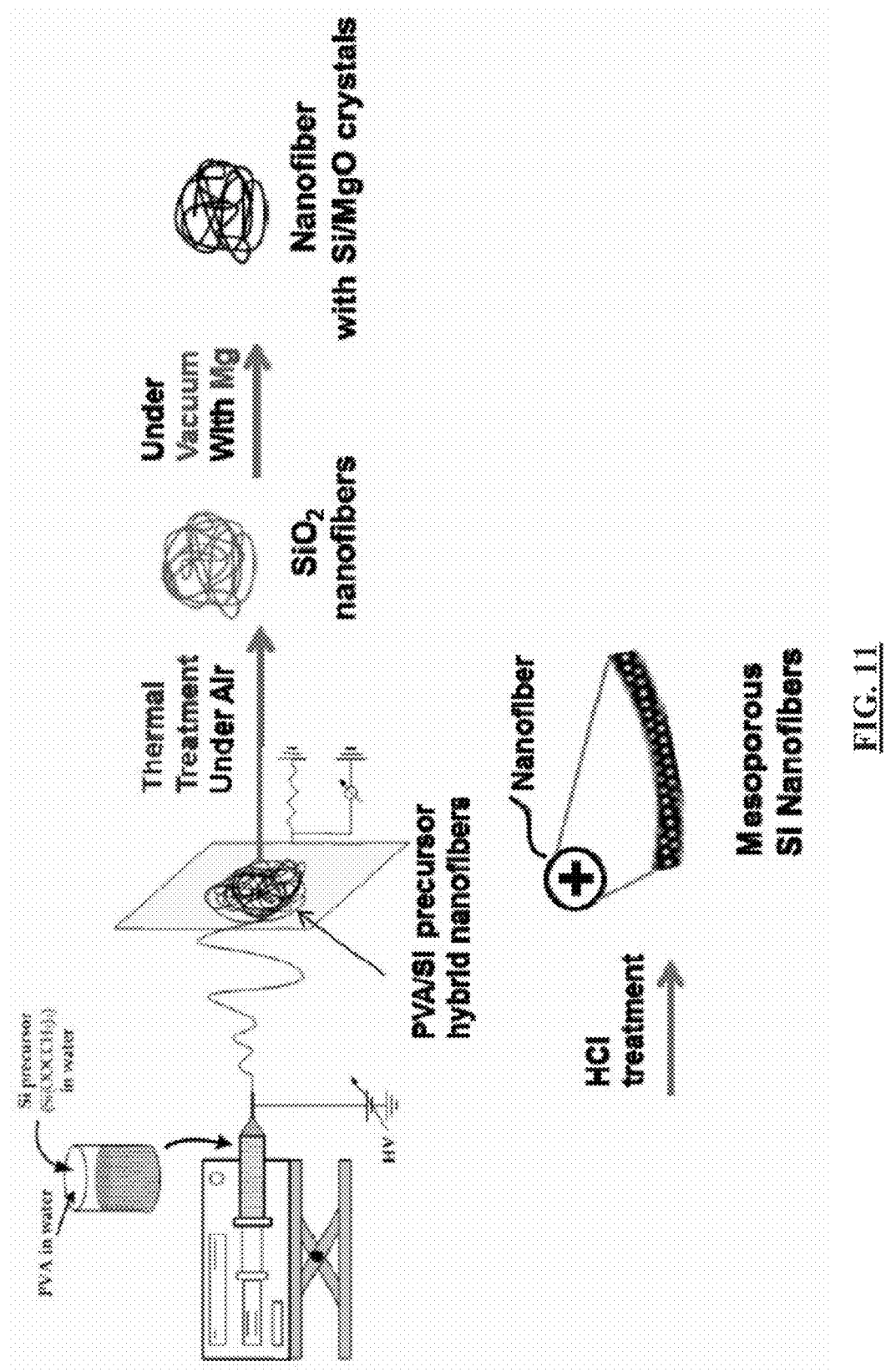
FIG. 11 illustrates a schematic of a synthetic process for preparing mesoporous silicon nanofibers.
Figure 12:
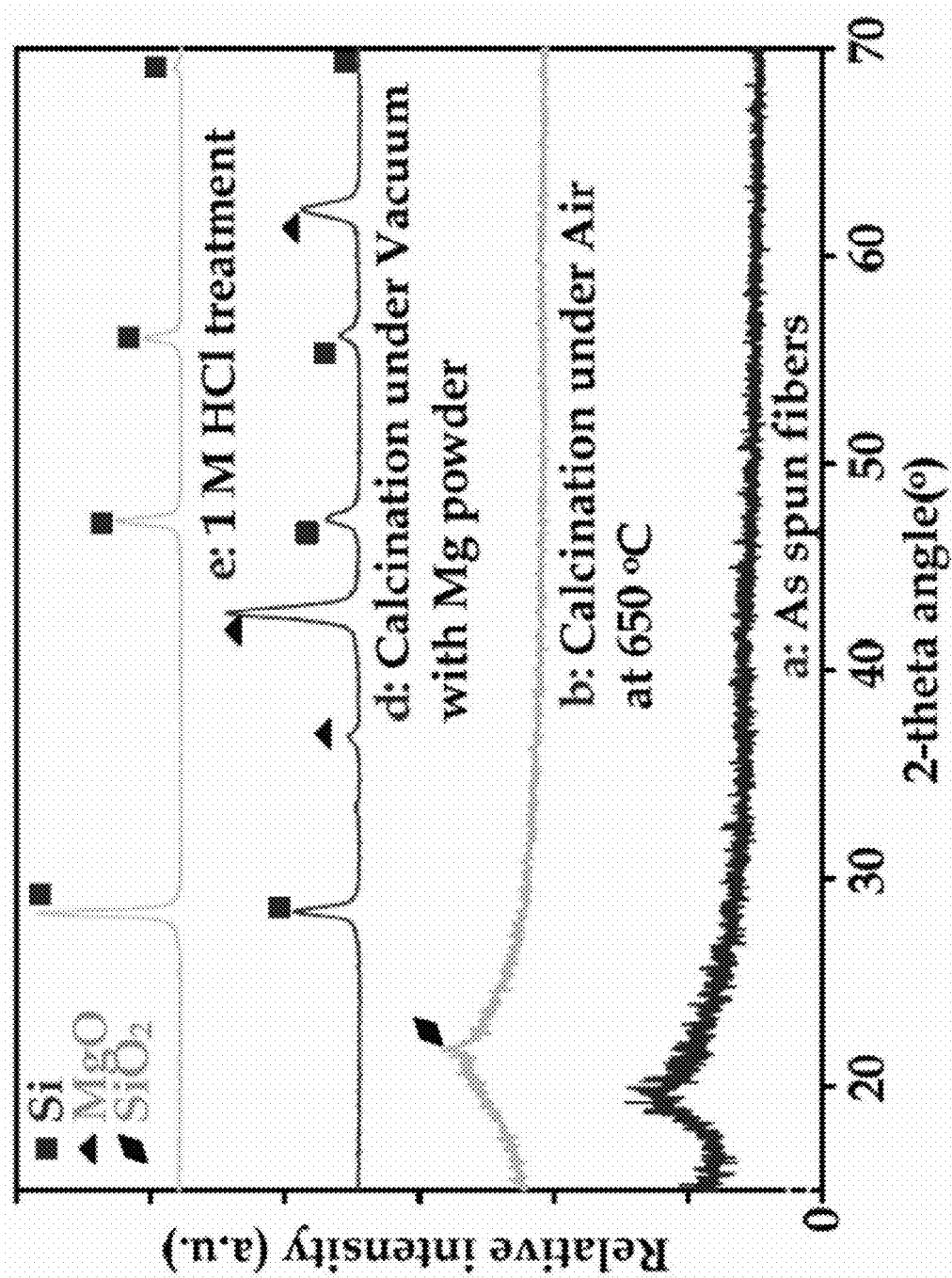
FIG. 12 illustrates X-Ray Diffraction of as-spun silicon precursor/polymer nanofibers (bottom), silica nanofibers (second from bottom), Si/MgO nanofibers (second from top), and mesoporous silicon nanofibers (top).

FIG. 11 illustrates a schematic of a synthetic process for preparing nanofibers (e.g., mesoporous nanofibers) of a high energy capacity material described herein. In some embodiments, a fluid stock is prepared by combining a polymer and a precursor (of a high energy capacity material). In certain embodiments, the fluid stock is then electrospun to prepare an as-spun nanofiber. In specific embodiments, thermal treatment then calcines the precursor to either a high energy capacity material, or a material that can be converted to a high energy capacity material (e.g., $SiO_2$, as illustrated in FIG. 11). In some embodiments, the calcined material is then converted to a high energy capacity material—e.g., through reduction of the calcined material, such as with hydrogen or a sacrificial oxidizing agent, such as magnesium. In some instances, the reducing agent is optionally removed following chemical treatment. In the case of using such a process for preparing silicon nanofibers, FIG. 10 illustrates SEM (a-b) and TEM (c-e) images of the nanofibers including images of (a) the as-spun fiber, (b) fiber heated in air, (c) fiber heated in air, (d) fiber heated under vacuum with Mg, and (e) HCl treated fiber. FIG. 12 illustrates X-Ray Diffraction of the nanofibers at various stages of the synthetic process.

Figure 4:
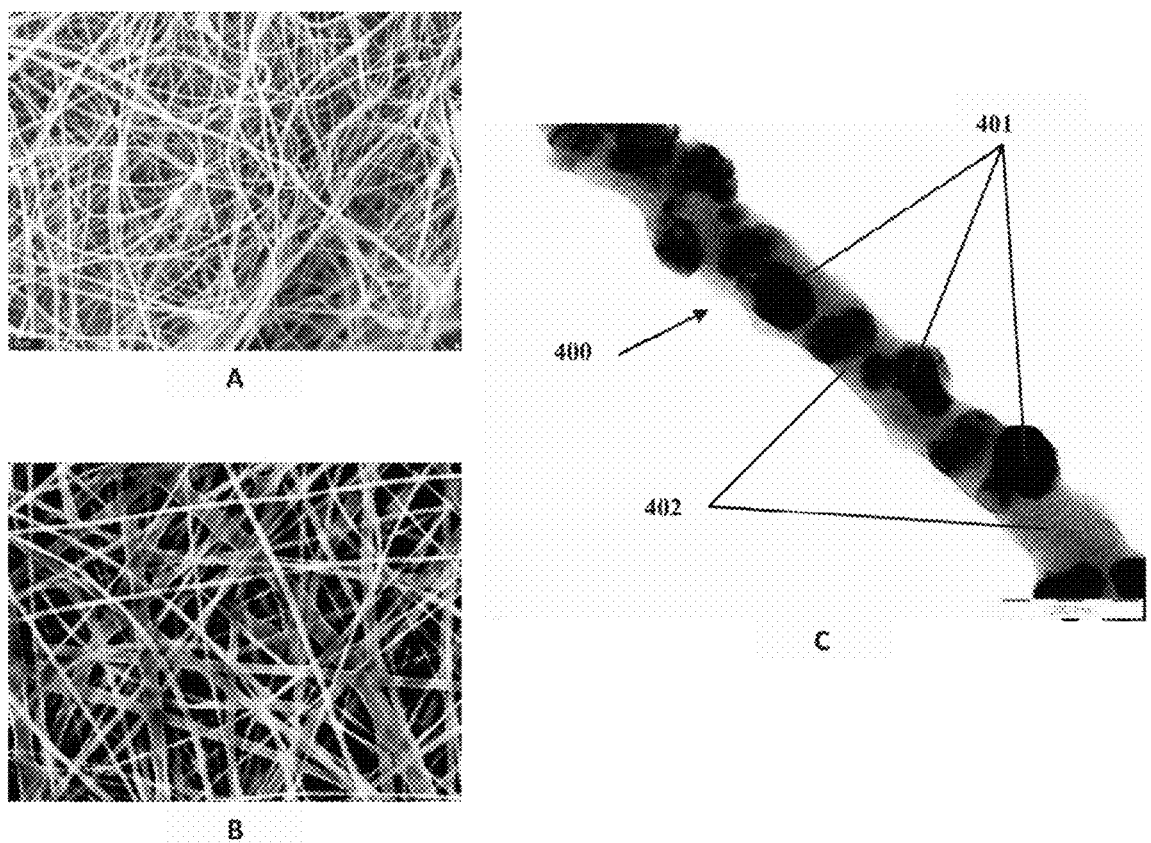
FIG. 4 illustrates silicon/polymer and silicon/carbon nanocomposite nanofibers. Panel A illustrates an SEM image of polymer/Si nanoparticle nanocomposite nanofibers. Panel B illustrates an SEM image of carbon/Si nanoparticle nanocomposite nanofibers. Panel C illustrates a TEM image of carbon/Si nanoparticle nanocomposite nanofibers.
Figure 58:
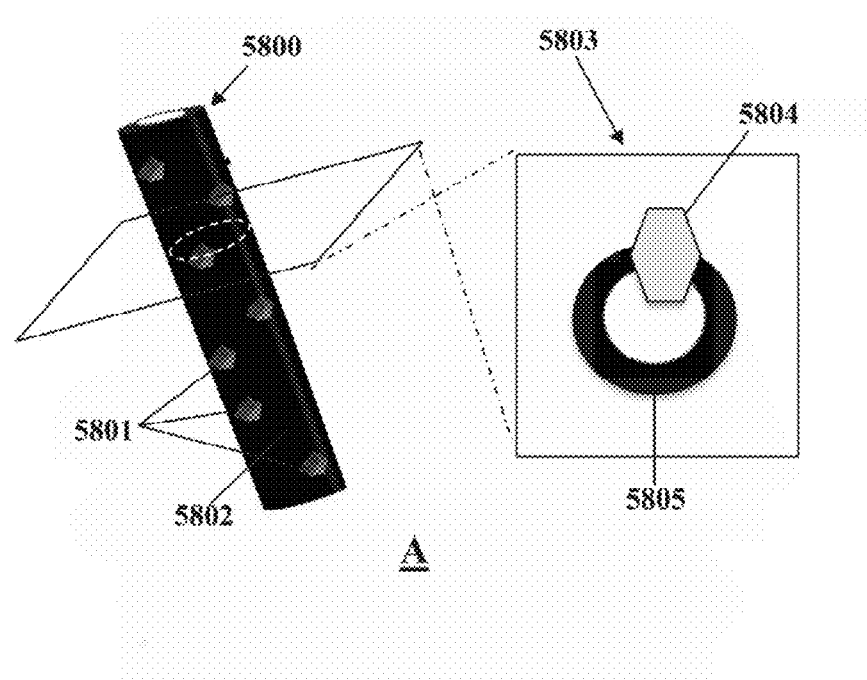
FIG. 58 illustrates an exemplary structure of a nanocomposite nanofiber having a tubular matrix material with discrete domains (e.g., nanoparticles) embedded therein and a hollow core (Panel A); and an exemplary nanocomposite having a core matrix or backbone material with discrete domains (e.g., nanoparticles) embedded therein (Panel B).
Figure 58:
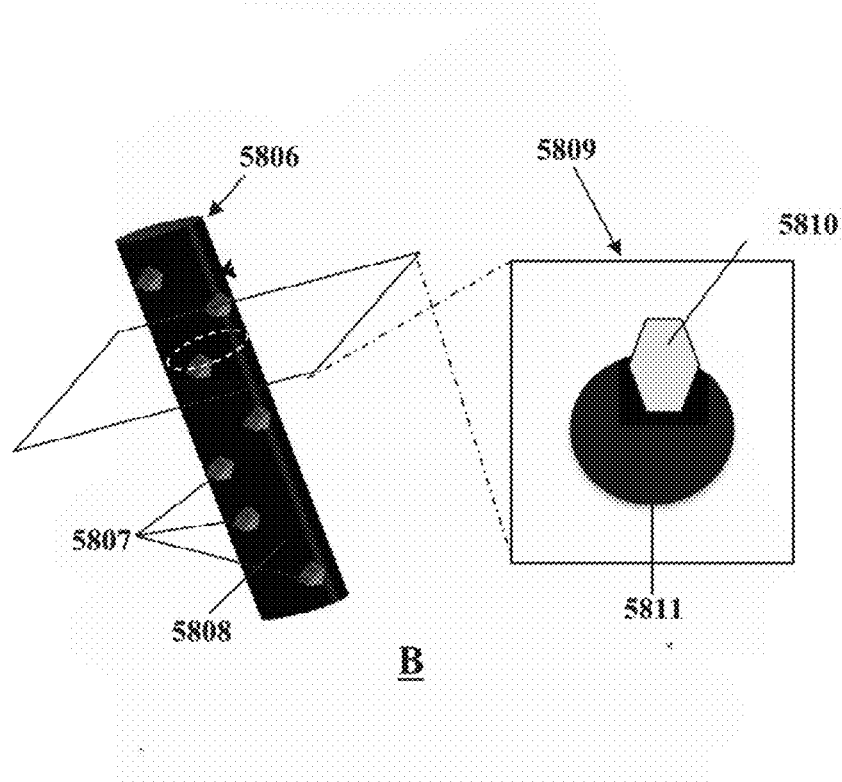

In some embodiments, a nanofiber provided herein comprises (i) a silicon material (e.g., silicon); and (ii) a continuous matrix material (e.g., ceramic, metal, or carbon). In certain embodiments, the continuous matrix is a continuous core matrix (e.g., not a hollow tube). In some embodiments, the silicon material forms discrete isolated domains of the nanofibers. In some specific embodiments, the silicon material domains are non-aggregated. In some embodiments, the silicon material is a nanoparticle comprising silicon. In certain embodiments, the silicon discrete domain material (e.g., silicon nanoparticle) is embedded within the continuous matrix material (e.g., in a continuous matrix material/backbone material), such as illustrated in FIG. 58 or FIG. 4 (which illustrates a nanofiber 400 having a matrix material 402 with domains (nanoparticles) 401 embedded therein) or FIG. 5.

In some embodiments, the silicon material domains are non-aggregated. In specific embodiments, the nanofibers comprises less than 50% of domains (e.g., Si nanoparticles) that are aggregated. In specific embodiments, the nanofibers comprises less than 40% of domains (e.g., Si nanoparticles)

that are aggregated. In specific embodiments, the nanofibers comprises less than 25% of domains (e.g., Si nanoparticles) that are aggregated. In specific embodiments, the nanofibers comprises less than 10% of domains (e.g., Si nanoparticles) that are aggregated. In specific embodiments, the nanofibers comprises less than 5% of domains (e.g., Si nanoparticles) that are aggregated.

In some embodiments, provided herein is a battery (e.g., a primary or secondary cell) comprising at least one nanofiber described herein. In specific instances, the battery comprises plurality of such nanofibers, e.g., a non-woven mat thereof. In some embodiments, the battery comprises at least two electrodes (e.g., an anode and a cathode) and a separator, at least one of the electrodes comprising at least one nanofiber described herein. In specific embodiments, the battery is a lithium-ion battery and the anode comprises at least one nanofiber described herein (e.g., a nanofiber mat thereof). Likewise, provided herein is an electrode comprising any nanofiber described herein (e.g., a nanofiber mat comprising one or more such nanofibers).

In some embodiments, the batteries comprise a negative electrode (anode) comprising a plurality of nanofibers described herein. In specific embodiments, the negative electrode or plurality of nanofibers have a discharge capacity or specific energy capacity of at least 1500 mAh/g on a first cycle at 0.1 C (e.g., as determined by half cell or full cell testing). In further or alternative embodiments, the negative electrode or plurality of nanofibers have a discharge capacity or specific energy capacity of at least 2000 mAh/g on a first cycle at 0.1 C. In further or alternative embodiments, the negative electrode or plurality of nanofibers have a discharge capacity or specific energy capacity of at least 1400 mAh/g on a 10th cycle at 0.1 C. In further or alternative embodiments, the negative electrode or plurality of nanofibers have a discharge capacity or specific energy capacity of at least 1800 mAh/g on a 10th cycle at 0.1 C. In further or alternative embodiments, the negative electrode or plurality of nanofibers have a discharge capacity or specific energy capacity of at least 1000 mAh/g on a 50th cycle at 0.1 C. In further or alternative embodiments, the negative electrode or plurality of nanofibers have a discharge capacity or specific energy capacity of at least 1600 mAh/g on a 50th cycle at 0.1 C. In further or alternative embodiments, the negative electrode or plurality of nanofibers have a discharge capacity or specific energy capacity of at least 250 mAh/g on a 98th cycle at 0.1 C. In further or alternative embodiments, the negative electrode or plurality of nanofibers have a discharge capacity or specific energy capacity of at least 400 mAh/g on a 98th cycle at 0.1 C.

In certain embodiments, provided herein is a negative electrode comprising high energy capacity material (e.g., silicon nanoparticles) or a plurality of nanofibers having an discharge capacity or specific energy capacity on a $25^{th}$ cycle at 0.1 C that is at least 40% of the discharge capacity or specific energy capacity on the $1^{st}$ cycle at 0.1 C. In further or alternative embodiments, provided herein is a negative electrode comprising high energy capacity material (e.g., silicon nanoparticles) or plurality of nanofibers having an discharge capacity or specific energy capacity on a $25^{th}$ cycle at 0.1 C that is at least 50% of the discharge capacity or specific energy capacity on the $1^{st}$ cycle at 0.1 C. In certain embodiments, provided herein is a negative electrode comprising high energy capacity material (e.g., silicon nanoparticles) or plurality of nanofibers having an discharge capacity or specific energy capacity on a $98^{th}$ cycle at 0.1 C that is at least 10% of the discharge capacity or specific energy capacity on the $1^{st}$ cycle at 0.1 C. In further or alternative embodiments, provided herein is a negative electrode comprising high energy capacity material (e.g., silicon nanoparticles) or plurality of nanofibers having an discharge capacity or specific energy capacity on a $98^{th}$ cycle at 0.1 C that is at least 20% of the discharge capacity or specific energy capacity on the $1^{st}$ cycle at 0.1 C. In certain embodiments, provided herein is a negative electrode comprising high energy capacity material (e.g., silicon nanoparticles) or plurality of nanofibers having an discharge capacity or specific energy capacity on a $98^{th}$ cycle at 0.1 C that is at least 20% of the discharge capacity or specific energy capacity on the $10^{th}$ cycle at 0.1 C. In further or alternative embodiments, provided herein is a negative electrode comprising high energy capacity material (e.g., silicon nanoparticles) or plurality of nanofibers having an discharge capacity or specific energy capacity on a $98^{th}$ cycle at 0.1 C that is at least 30% of the discharge capacity or specific energy capacity on the $10^{th}$ cycle at 0.1 C.

Figure 6:
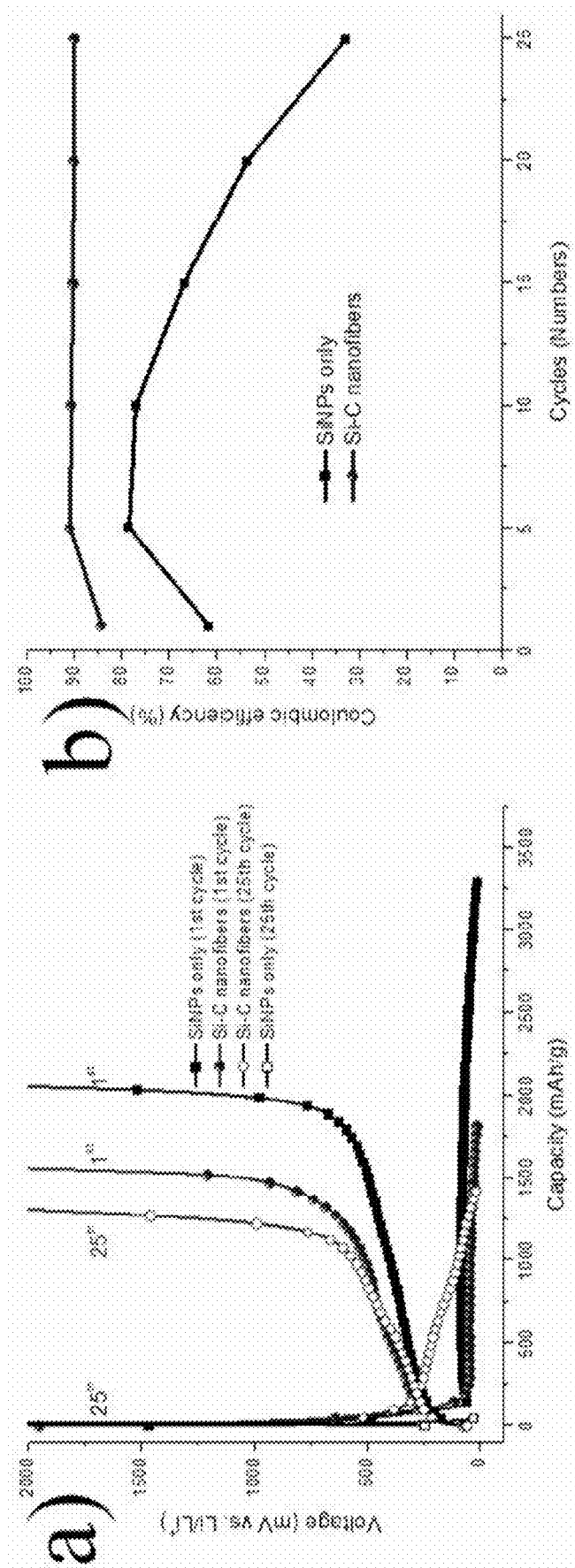
FIG. 6 illustrates charge/discharge curves of $1^{st}$ cycle and $25^{th}$ cycle (panel A) and plotted curves of Coulombic efficiencies (panel B) for Si/C nanofibers provided herein compared against Si nanoparticles alone.

FIG. 6 illustrates charge/discharge curves of $1^{st}$ cycle and $25^{th}$ cycle (panel A) and plotted curves of Coulombic efficiencies (panel B) for Si/C nanofibers provided herein compared against Si nanoparticles alone. In some embodiments, provided herein is a plurality of nanofibers or a negative electrode comprising Si nanoparticles having a capacity at least as great as set forth in FIG. 6. In some embodiments, provided herein is a Si containing negative electrode or plurality of nanofibers having a Coulombic efficiency of at least 80% over 25 cycles. In some embodiments, provided herein is a Si containing negative electrode or plurality of nanofibers having a Coulombic efficiency of at least 90% over 25 cycles.

Figure 7:
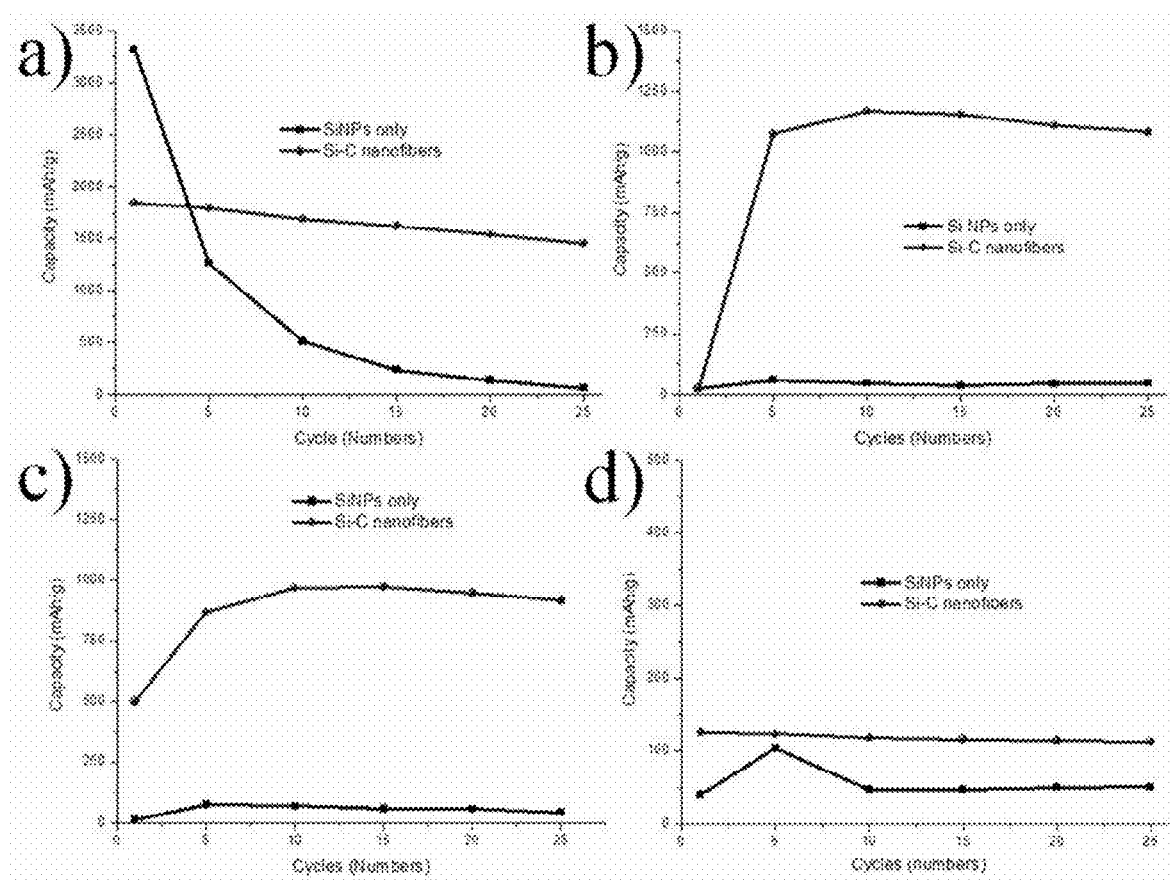
FIG. 7 illustrates plotted graphs of discharge capacities of silicon nanoparticles in carbon nanofibers provided herein compared to silicon nanoparticles alone at various discharge rates.
Figure 13:
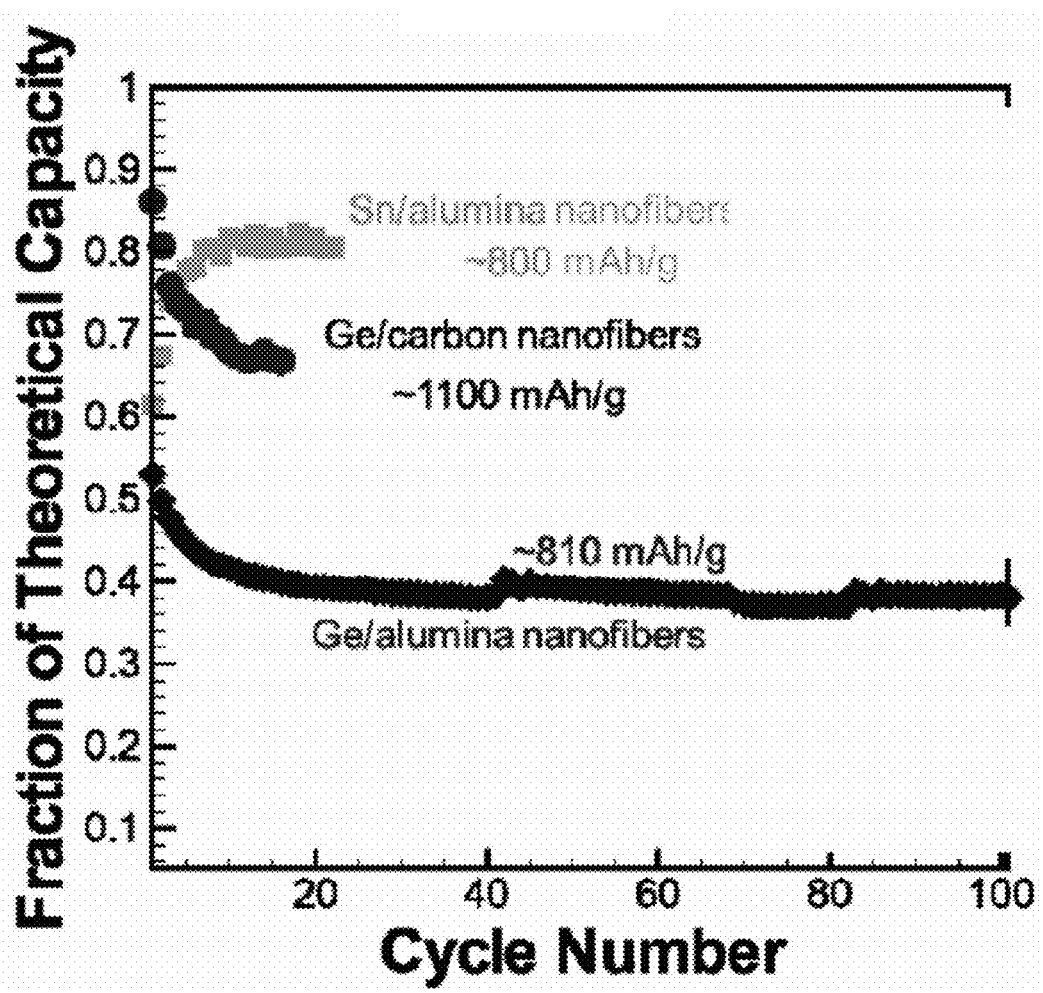
FIG. 13 illustrates the capacity of certain Sn/alumina, Ge/carbon, and Ge/alumina nanofibers provided herein.

FIG. 7 illustrates plotted graphs of discharge capacities of silicon nanoparticles in carbon nanofibers provided herein compared to silicon nanoparticles alone at various discharge rates. In certain embodiments, a nanofiber provided herein has a discharge capacity at least as great as the values set forth in FIG. 7 at any given cycle number or discharge rate. FIG. 13 illustrates the capacity of other nanofibers (Sn/alumina, Ge/carbon, and Ge/alumina) provided herein. In certain embodiments, provided herein is a nanofiber having a discharge capacity of at least 750 mAh/g (e.g., after 25 cycles) at 0.1 C. In certain embodiments, provided herein is a nanofiber having a discharge capacity of at least 1000 mAh/g (e.g., after 25 cycles) at 0.1 C. In certain embodiments, provided herein is a nanofiber having a discharge capacity of at least 1450 mAh/g (e.g., after 25 cycles) at 0.1 C. In some embodiments provided herein is a nanofiber having a discharge capacity of at least 1150 mAh/g (e.g., after 25 cycles) at 0.5 C. In some embodiments, provided herein is a nanofiber having a discharge capacity of at least 1000 mAh/g (e.g., after 25 cycles) at a discharge rate of 0.8 C. In some embodiments, provided herein are nanofibers having a energy capacity, discharge capacity, or charge capacity of at least 30% theoretical capacity for the material (e.g., after 25 cycles). In some embodiments, provided herein are nanofibers having a energy capacity, discharge capacity, or charge capacity of at least 40% theoretical capacity for the material (e.g., after 25 cycles). In certain embodiments, provided herein are nanofibers having a energy capacity, discharge capacity, or charge capacity of at least 50% theoretical capacity for the material (e.g., after 25 cycles). In some embodiments, provided herein are nanofibers having a energy capacity, discharge capacity, or charge capacity of at least 60% theoretical capacity for the material (e.g., after 25 cycles or initial cycle). n some embodiments, provided herein are nanofibers having a energy capacity, discharge capacity, or charge capacity of at least 70% theoretical capacity for the material (e.g., after 25 cycles or initial cycle). n some embodiments, provided herein are nanofibers having a energy capacity, discharge capacity, or charge capacity of at least 80% theoretical capacity for the material (e.g., after 25 cycles or initial cycle).

Figure 8:
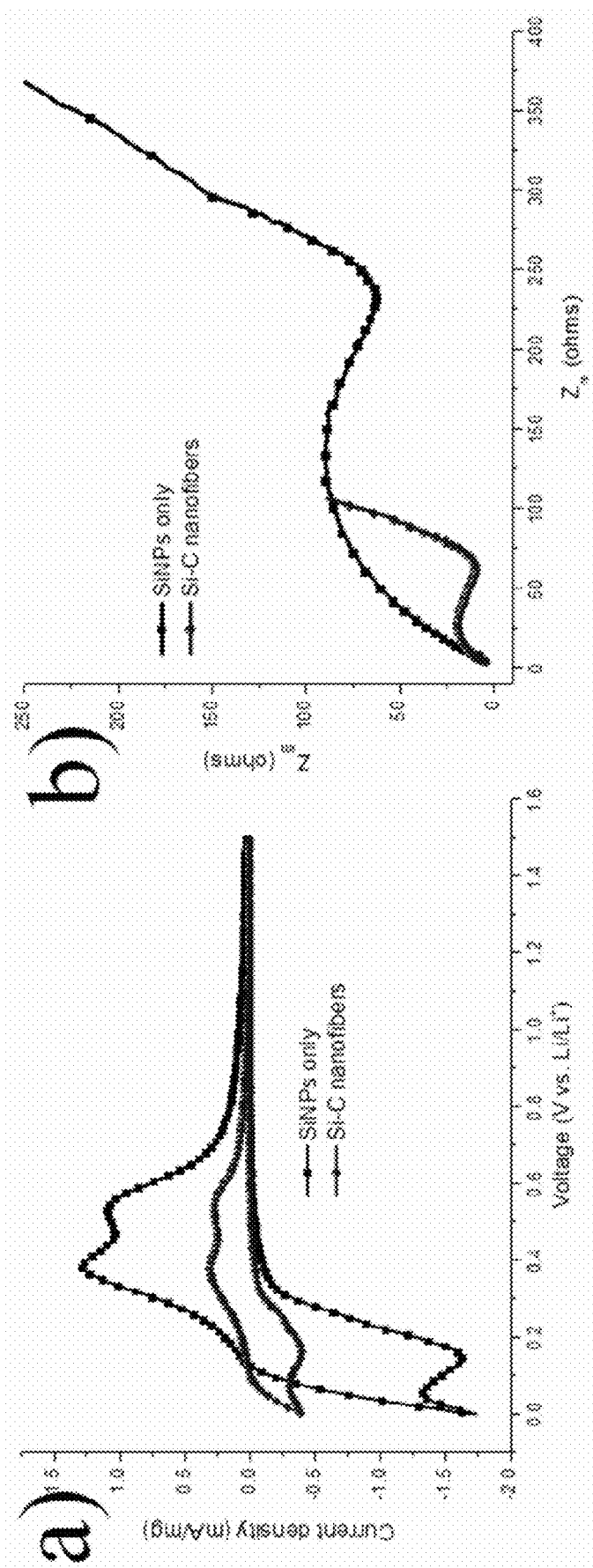
FIG. 8 illustrates cyclic voltammograms (panel A) and Nyquist plots (panel B) of silicon nanoparticles and certain Si/C nanofibers provided herein.

FIG. 8 illustrates cyclic voltammograms (panel A) and Nyquist plots (panel B) of silicon nanoparticles and certain Si/C nanofibers described herein. In specific embodiments, the charge transport resistance (e.g., as determined from AC impedance) of a described herein is as demonstrated in FIG. 8. In some embodiments, the charge transport resistance of a nanofiber described herein is less than 100Ω. In specific embodiments, the charge transport resistance of a nanofiber described herein is less than 75Ω. In more specific embodiments, the charge transport resistance of a nanofiber described herein is less than 65Ω. In specific embodiments, the charge transport resistance of a nanofiber described herein is less than 60Ω. In further or alternative embodiments, the solution (polarization) resistance of a nanofiber provided herein is less than 5Ω (e.g., compared to 7.4Ω of pure silicon nanoparticles). In specific embodiments, the solution (polarization) resistance of a nanofiber provided herein is less than 4Ω. In more specific embodiments, the solution (polarization) resistance of a nanofiber provided herein is less than 3.5Ω.

Figure 9:
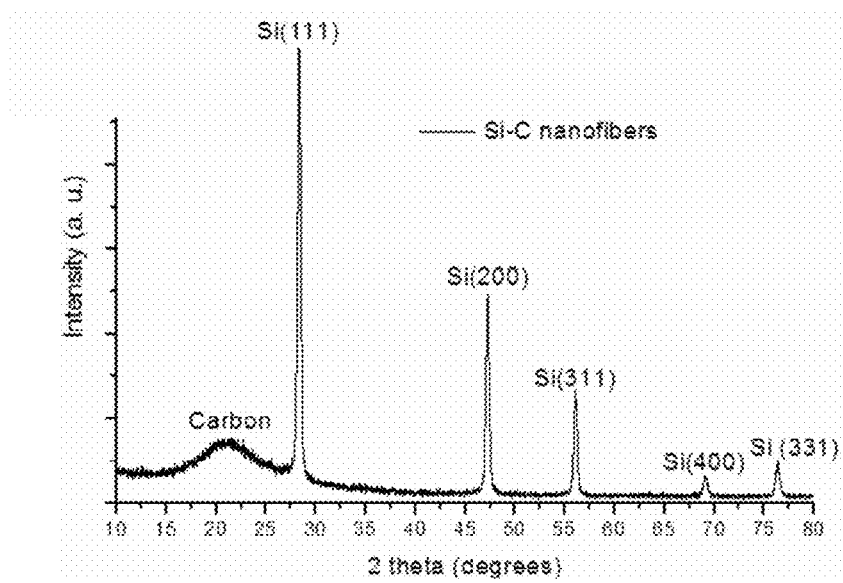
FIG. 9 illustrates an X-Ray diffraction (XRD) pattern for certain Si/C nanofibers provided herein.

In specific embodiments, provided herein is a nanofibers comprising a backbone (e.g., a continuous matrix material, such as a continuous core matrix), the backbone comprising nanoparticles embedded therein, the backbone comprising carbon and the nanoparticles comprising a high energy capacity material (e.g., silicon). In more specific embodiments, the nanofiber has an X-Ray diffraction (XRD) pattern similar or identical to that forth in FIG. 9. In some embodiments, the nanofiber has an XRD pattern with at least 3 of the peaks in the XRD pattern set forth in FIG. 9. In some embodiments, the nanofiber has an XRD pattern with at least 4 of the peaks in the XRD pattern set forth in FIG. 9. In some embodiments, the nanofiber has an XRD pattern with at least 5 of the peaks in the XRD pattern set forth in FIG. 9 In some embodiments, the nanofiber has an XRD pattern with at least 3 of the following peaks: 28.37°±0.03, 47.200±0.03, 56.09°±0.03, 69.02°±0.03, and 76.37°±0.03. In certain embodiments, the nanofiber has an XRD pattern with at least 4 of the following peaks: 28.37°±0.03, 47.200±0.03, 56.09°±0.03, 69.02°±0.03, and 76.37°±0.03. In some embodiments, the nanofiber has an XRD pattern with at least 5 of the following peaks: 28.37°±0.03, 47.200±0.03, 56.09°±0.03, 69.02°±0.03, and 76.37°±0.03.

In various embodiments, the high energy capacity material in a nanocomposite nanofiber provided herein is any suitable high energy capacity material. In some embodiments, the high energy capacity material is an elemental metal (e.g., silicon, germanium, or tin), an oxide thereof (e.g., tin oxide), or an alloy thereof (e.g., a silicon metal oxide). In certain embodiments, the high energy capacity material is a material suitable for use in a lithium ion battery anode or negative electrode. In some embodiments, a nanofiber herein comprises a material that is a precursor material capable of being converted into a material suitable for use in a lithium ion battery anode or negative electrode. In various embodiments, the high energy capacity material is in a crystalline state. In various embodiments, the high energy capacity material is in a zero oxidation state, a positive oxidation state, or a combination thereof. In specific embodiments, the high energy capacity material is generally in a zero oxidation state (e.g., a +0 oxidation state, or having an average oxidation state of less than +0.05, on average).

In specific embodiments, a nanocomposite nanofiber provided herein comprises high energy capacity nanoparticles. In specific embodiments, the nanoparticles are silicon nanoparticles and comprise at least 90 wt. % zero oxidation silicon and less than 10 wt % silicon dioxide. In specific embodiments, the nanoparticles are silicon nanoparticles and comprise at least 60 wt. % zero oxidation silicon and less than 20 wt % silicon dioxide and less than 20% silicon carbide. In some embodiments, the nanoparticles are silicon nanoparticles and comprise at least 50 wt. % zero oxidation silicon and less than 30 wt % silicon dioxide and less than 30% silicon carbide. In some specific embodiments, the silicon nanoparticles comprise at least 95 wt. % zero oxidation silicon and less than 5 wt % silicon dioxide. In still more specific embodiments, the silicon nanoparticles comprise 90-99 wt. % zero oxidation silicon and 0.01 (or 0.1) wt % to 5 wt % silicon dioxide.

In certain embodiments, the discrete high energy capacity material domain (e.g., silicon nanoparticle) has an average diameter of less than 200 nm. In specific embodiments, the average diameter is 1 nm to 200 nm. In some embodiments, the average diameter is less than 100 nm. In specific embodiments, the average diameter is 10 nm to 100 nm. In more specific embodiments, the average diameter is 10 nm to 80 nm. In still more specific embodiments, the average diameter is 20 nm to 70 nm.

In certain embodiments, provided herein are nanofibers comprising a high energy capacity material and other optional components. In specific embodiments, the nanofibers comprise at least 25% by weight of high energy capacity material (e.g., on average for a plurality of nanofibers). In more specific embodiments, the nanofibers comprise at least 50% by weight of the high energy capacity material (e.g., on average for a plurality of nanofibers). In still more specific embodiments, the nanofibers comprise at least 60% by weight of the high energy capacity material (e.g., on average for a plurality of nanofibers). In yet more specific embodiments, the nanofibers comprise at least 70% by weight of the high energy capacity material (e.g., on average for a plurality of nanofibers). In specific embodiments, the nanofibers comprise at least 80% by weight of the high energy capacity material (e.g., on average for a plurality of nanofibers).

In certain embodiments, the nanofibers comprise at least 25% by weight of silicon (e.g., on an elemental basis) (e.g., on average for a plurality of nanofibers). In specific embodiments, the nanocomposite nanofibers comprise at least 50% by weight of the silicon (e.g., on average for a plurality of nanofibers). In more specific embodiments, the nanocomposite nanofibers comprise at least 75% by weight of silicon (e.g., on average for a plurality of nanofibers). In yet more specific embodiments, the nanocomposite nanofibers comprise at least 90% by weight of silicon (e.g., on average for a plurality of nanofibers). In specific embodiments, the nanocomposite nanofibers comprise at least 95% by weight of silicon (e.g., on average for a plurality of nanofibers).

Figure 23:
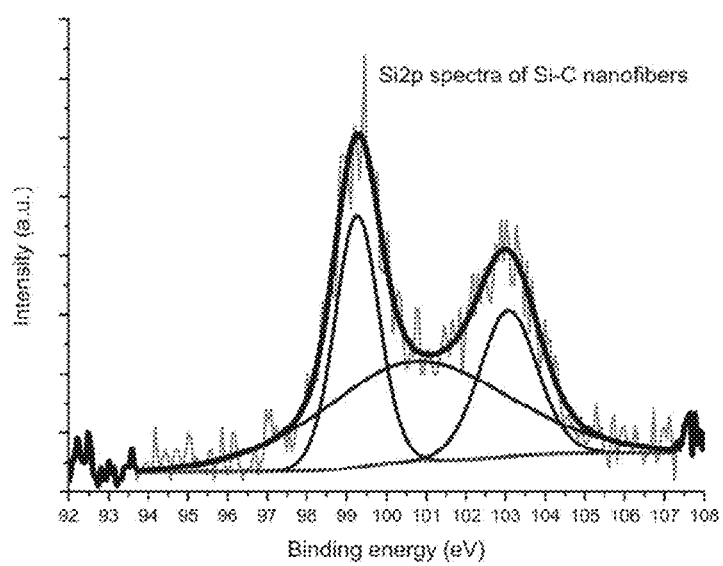
FIG. 23 illustrates an X-Ray photoelectron spectrograph (XPS) of certain silicon/carbon nanocomposite nanofibers.

FIG. 23 illustrates an X-Ray photoelectron spectrograph (XPS) of silicon/carbon nanocomposite nanofibers described herein. In certain embodiments, nanofibers provided herein comprise (e.g., on average) at least 10% by weight of a second silicon material (e.g., silicon oxide and/or silicon carbide). In specific embodiments, nanofibers provided herein comprise (e.g., on average) at least 20% by weight of a second silicon material. In more specific embodiments, nanofibers provided herein comprise (e.g., on average) at least 30% by weight of a second silicon material. In some embodiments, nanofibers provided herein comprise (e.g., on average) less than 30% by weight of a second silicon material. In specific embodiments, nanofibers provided herein comprise (e.g., on average) less than 20% by weight of a second silicon material.

In some embodiments, the silicon material comprises silicon, silicon oxide, silicon carbide or a combination thereof. In specific embodiments, the silicon material comprises silicon. In some embodiments, the silicon of the silicon material is substantially in a zero oxidation state. In specific embodiments, at least 50%, at least 60%, at least 70%, at least 80%, at least 90%, at least 95%, or the like of the silicon in the silicon material is in a neutral (zero) oxidation state.

In certain embodiments, the silicon material is or comprises one or more material represented by formula (I):

$$Si_xSn_qM_yC_z \qquad (I)$$

In some embodiments, M is one or more metal (e.g., Mn, Mo, Nb, W, Ta, Fe, Cu, Ti, V, Cr, Ni, Co, Zr, Y, or a combination thereof). In certain embodiments, (q+x)>2y+z; q≥0, and z≥0. In some embodiments, q, x, y, and z represent atomic percent values. In more specific embodiments, q, x, and y are each ≥0.

Second Material

In some embodiments, a nanocomposite nanofiber provided herein comprises a silicon material and a second material. In certain embodiments, additional materials are optionally present. In some embodiments, the second materials is a continuous matrix material, as described herein. In certain embodiments, the second material is a second silicon material, as described herein, e.g., silicon and silica. In some embodiments, the second material is a polymer (e.g., an organic polymer, such as a water soluble organic polymer). In other embodiments, the second material is a metal oxide, a ceramic, a metal (e.g., a single metal material or an alloy), carbon, or the like. In some embodiments, the second material comprises at least 3%, at least 5%, at least 10%, at least 15%, at least 20%, at least 30% or the like of the second material (e.g., carbon).

In certain embodiments, provided herein is an electrode (e.g., negative electrode or anode) comprising a plurality of nanofibers, the nanofibers comprising a continuous matrix of a high energy capacity material (e.g., silicon). In other embodiments, provided herein is an electrode (e.g., negative electrode or anode) comprising a plurality of nanofibers, the nanofibers comprising (a) a continuous matrix material; and (b) discrete, isolated (i.e., non-aggregated) domains of a high energy capacity material (e.g., silicon). In specific embodiments, at least 50% of the high energy capacity material (e.g., silicon) has an oxidation state of zero. In more specific embodiments, at least 70% of the high energy capacity material (e.g., silicon) has an oxidation state of zero. In still more specific embodiments, at least 80% of the high energy capacity material (e.g., silicon) has an oxidation state of zero. In yet more specific embodiments, at least 90% of the high energy capacity material (e.g., silicon) has an oxidation state of zero. In more specific embodiments, at least 95% of the high energy capacity material (e.g., silicon) has an oxidation state of zero.

In some embodiments, the electrode comprises a plurality of nanofibers having a continuous matrix of high energy capacity material (e.g., silicon). In certain embodiments, the continuous matrix of high energy capacity material (e.g., silicon) is porous (e.g., mesoporous). In certain embodiments, the continuous matrix of high energy capacity material (e.g., silicon) is hollow (e.g., hollow silicon nanofibers—or silicon tube nanofibers). In specific embodiments, the nanofibers comprise (e.g., on average) at least 50% high energy capacity material (e.g., silicon) (e.g., by elemental analysis). In specific embodiments, the nanofibers comprise (e.g., on average) at least 70% high energy capacity material (e.g., silicon). In more specific embodiments, the nanofibers comprise (e.g., on average) at least 80% high energy capacity material (e.g., silicon). In still more specific embodiments, the nanofibers comprise (e.g., on average) at least 90% high energy capacity material (e.g., silicon). In yet more specific embodiments, the nanofibers comprise (e.g., on average) at least 95% high energy capacity material (e.g., silicon).

In some embodiments, the electrode comprises a plurality of nanofibers comprising (a) a matrix; and (b) a plurality of isolated, discrete domains comprising high energy capacity material (e.g., silicon). In specific embodiments, the matrix is a continuous matrix of carbon (e.g., amorphous carbon). In certain embodiments, the matrix and/or discrete high energy capacity material (e.g., silicon) domains are porous (e.g., mesoporous). In certain embodiments, the continuous matrix is hollow. In specific embodiments, the nanofibers comprise (e.g., on average) at least 30% high energy capacity material (e.g., silicon) (e.g., by elemental analysis). In specific embodiments, the nanofibers comprise (e.g., on average) at least 50% high energy capacity material (e.g., silicon). In more specific embodiments, the nanofibers comprise (e.g., on average) at least 60% high energy capacity material (e.g., silicon). In still more specific embodiments, the nanofibers comprise (e.g., on average) at least 70% high energy capacity material (e.g., silicon). In yet more specific embodiments, the nanofibers comprise (e.g., on average) at least 80% high energy capacity material (e.g., silicon). In specific embodiments, the discrete domains comprise (e.g., on average) at least 50% high energy capacity material (e.g., silicon) (e.g., by elemental analysis). In specific embodiments, the discrete domains comprise (e.g., on average) at least 70% high energy capacity material (e.g., silicon). In more specific embodiments, the discrete domains comprise (e.g., on average) at least 80% high energy capacity material (e.g., silicon). In still more specific embodiments, the discrete domains comprise (e.g., on average) at least 90% high energy capacity material (e.g., silicon). In yet more specific embodiments, the discrete domains comprise (e.g., on average) at least 95% high energy capacity material (e.g., silicon).

In some embodiments, provided herein is a battery comprising such an electrode (e.g., anode). In specific embodiments, the battery is a secondary cell. Also, provided in certain embodiments herein are nanofibers or nanofiber mats comprising one or more such nanofiber as described herein.

In some embodiments, negative electrodes provided herein are prepared by depositing high energy (anodic) capacity nanofibers onto a current collector, thereby creating a negative electrode comprising the nanofibers in contact with a current collector. In certain embodiments, as-treated nanofibers are ground in a mortal and pestle to produce processed nanofibers, which are then deposited on a current collector. In some embodiments, the processed nanofibers are dispersed in a solvent to prepare a composition, the composition is deposited onto a current collector, and evaporation of the solvent results in formation of an electrode on the current collector. In specific embodiments, the composition further comprises a binder. In further or alternative specific embodiments, the composition further comprises a conductive material (e.g., carbon black)—e.g., to improve electron mobility.

Positive Electrode/Cathode and Nanofibers Therefor

In some embodiments, the nanofibers provide herein comprise a backbone material (a core matrix material). In specific embodiments, the backbone material is a lithium material described herein. In other specific embodiments, the backbone material is a continuous matrix material with non-aggregated domains embedded therein, the non-aggregated domains comprising a lithium material described herein (e.g., a nanoparticle comprising a lithium material described herein). In certain embodiments, nanofibers described herein comprise a hollow core. In specific embodiments, the nanofibers described herein comprise a continuous matrix material surrounding the hollow core. In more specific embodiments, the continuous matrix material comprises a lithium material described herein. In other specific embodiments, the continuous matrix material comprises non-aggregated domains embedded therein, the non-aggregated domains comprising a lithium material described herein (e.g., a nanoparticle comprising a lithium material described herein). In various embodiments herein, a continuous matrix material is comprises a ceramic, a metal, or carbon. In specific embodiments, the continuous matrix material is a conductive material.

In certain embodiments, the lithium material (e.g., core matrix lithium material) provided herein is crystalline. In some embodiments, the lithium material comprises a layered crystalline structure. In certain embodiments, the lithium material comprises a spinel crystalline structure. In certain embodiments, the lithium material comprises an olivine crystalline structure.

In some embodiments, the lithium material is any material capable of intercalating and deintercalating lithium ions. In some embodiments, the lithium material is or comprises a lithium metal oxide, a lithium metal phosphate, a lithium metal silicate, a lithium metal sulfate, a lithium metal borate, or a combination thereof. In specific embodiments, the lithium material is a lithium metal oxide. In other specific embodiments, the lithium material is a lithium metal phosphate. In other specific embodiments, the lithium material is a lithium metal silicate. In other specific embodiments, the lithium material is lithium sulfide.

In some embodiments, provided herein is a nanofiber comprising a lithium material (e.g., a continuous core matrix of a lithium material). In some embodiments, the nanofibers comprise a continuous matrix of a lithium material. In certain embodiments, the nanofibers comprises a continuous matrix material (e.g., carbon, ceramic, or the like) and discrete domains of a lithium material (e.g., wherein the discrete domains are non-aggregated). In specific embodiments, the continuous matrix material is a conductive material (e.g., carbon). In further embodiments, provided herein is a cathode (or positive electrode) comprising a plurality of nanofibers comprising a lithium material. In some embodiments, less than 40% of the nanoparticles are aggregated (e.g., as measured in any suitable manner, such as by TEM). In specific embodiments, less than 30% of the nanoparticles are aggregated). In more specific embodiments, less than 25% of the nanoparticles are aggregated. In yet more specific embodiments, less than 20% of the nanoparticles are aggregated). In still more specific embodiments, less than 10% of the nanoparticles are aggregated). In more specific embodiments, less than 5% of the nanoparticles are aggregated).

In some instances, the lithium material is or comprises $LiCoO_2$, $LiCo_{x1}Ni_{y1}Mn_{z1}O_2$, $LiMn_{x1}Ni_{y1}Co_{z1}V_{a1}O_4$, $Li_2S$, $LiFe_{x1}Ni_{y1}Co_{z1}V_{a1}PO_4$, any oxidation state thereof, or any combination thereof. Generally, x1, y1, z1, and a1 are independently selected from suitable numbers, such as a number from 0 to 5 or from greater than 0 to 5.

In certain embodiments, provided herein is a plurality of nanofibers, the nanofibers comprising lithium, such as a continuous matrix of a lithium containing material (e.g., a lithium salt or lithium alloy/insertion compound, such as a lithium metal oxide). In other embodiments, provided herein is an electrode (e.g., positive electrode or cathode) comprising a plurality of nanofibers, the nanofibers comprising (a) a continuous matrix material; and (b) discrete, isolated domains comprising lithium. In some embodiments, the continuous matrix or isolated domains comprise lithium in the form of a lithium containing metal alloy. In specific embodiments, the lithium containing metal alloy is a lithium metal oxide. In some embodiments, the nanofiber(s) comprise a lithium containing material of the following formula (I):

$$Li_aM_bX_c \qquad (I)$$

In certain embodiments, M represents one or more metal element (e.g., M represents Fe, Ni, Co, Mn, V, Ti, Zr, Ru, Re, Pt, Bi, Pb, Cu, Al, Li, or a combination thereof) and X represents one or more non-metal (e.g., X represents C, N, O, P, S, $SO_4$, $PO_4$, Se, halide, F, CF, $SO_2$, $SO_2Cl_2$, I, Br, $SiO_4$, $BO_3$, or a combination thereof) (e.g., a non-metal anion). In some embodiments, a is 0.5-5, or 1-5 (e.g., 1-2), b is 0-2, and c is 0-10 (e.g., 1-4, or 1-3).

In some embodiments, X is selected from the group consisting of O, $SO_4$, $PO_4$, $SiO_4$, $BO_3$. In more specific embodiments, X is selected from the group consisting of O, $PO_4$, and $SiO_4$. In certain embodiments, M is Mn, Ni, Co, Fe, V, Al, or a combination thereof.

In certain embodiments, a lithium material of formula (I) is $LiMn_2O_4$, $LiNi_{1/3}Co_{1/3}Mn_{1/3}O_2$, $LiCoO_2$, $LiNiO_2$, $LiFePO_4$, $Li_2FePO_4F$, or the like. In some embodiments, a lithium material of formula (I) is $LiNi_{b1}Co_{b2}Mn_{b3}O_2$, wherein b1+b2+b3=1, and wherein 0≤b1, b2, b3<1. In some embodiments, a lithium material of formula (I) is $LiNi_{b1}Co_{b2}Al_{b3}O_2$, wherein b+b2+b3=1, and wherein 0<b1, b2, b3<1. In certain embodiments, a lithium material of formula (I) is $LiMn_2O_4$, $LiMn_{b1}Fe_{b2}O_4$ (wherein b1+b2=2, e.g., b1=1.5), $LiMnPO_4$, $LiNiPO_4$, $LiCoPO_4$, $Li_3V_2(PO_4)_3$, $Li_2FeSiO_4$, $Li_2MnSiO_4$, $LiFeBO_3$, or $LiMnBO_3$.

In some embodiments, the lithium material of formula (I) is $Li_2SO_{y'}$, wherein y' is 0-4, such as $Li_2S$ or $Li_2SO_4$.

In more specific embodiments, the lithium metal of formula (I) is represented by the lithium metal of formula (Ia):

$$Li_aM_bO_2 \qquad (Ia)$$

In specific embodiments, M, a, and b are as described above. In specific embodiments, a lithium metal of formula (Ia) has the structure $LiMO_2$ (e.g., $LiNi_{1/3}Co_{1/3}Mn_{1/3}O_2$). In some embodiments, a and b are each 1 and the one or more metal of M have an average oxidation state of 3.

In more specific embodiments, the lithium metal of formula (Ia) is represented by the lithium metal of formula (Ib):

$$Li(M'_{(1-g)}Mn_g)O_2 \qquad (Ib)$$

In certain embodiments, M' represents one or more metal element (e.g., M' represents Fe, Ni, Co, Mn, V, Li, Cu, Zn, or a combination thereof). In some embodiments, g is 0-1 (e.g., 0<g<1). In specific embodiments, M' represents one or more metal having an average oxidation state of 3.

In more specific embodiments, the lithium metal of formula (Ia) or (Ib) is represented by the lithium metal of formula (Ic):

$$Li[Li_{(1-2h)/3}M''_hMn_{(2-h)/3}]O_2 \qquad (Ic)$$

In certain embodiments, M" represents one or more metal element (e.g., M" represents Fe, Ni, Co, Zn, V, or a combination thereof). In some embodiments, h is 0-0.5 (e.g., 0<h<0.5, such as 0.083<h<0.5). In a specific embodiment, the lithium metal of formula (Ic) is Li[Li$_{(1-2h)/3}$Ni$_h$Co$_{(h-h')}$Mn$_{(2-h)/3}$]O$_2$, wherein h' is 0-0.5 (e.g., 0<h'<0.5).

In more specific embodiments, the lithium metal of formula (Ia) is represented by the lithium metal of formula (Id):

$$\text{LiNi}_{b'}\text{Co}_{b''}\text{M}'''_{b'''}\text{O}_2 \quad \text{(Id)}$$

In certain embodiments, M''' represents one or more metal element (e.g., M''' represents Fe, Mn, Zn, V, or a combination thereof). In some embodiments, each of b', b", and b''' is independently 0-2 (e.g., 0-1, such as 0<b', b", and b'''<1). In specific embodiments, the sum of b', b", and b''' is 1. In some embodiments, the one or more metal of M''' when taken together with the Ni and Co have an average oxidation state of 3.

In some embodiments, the lithium metal of formula (I) is represented by the lithium metal of formula (Ie):

$$\text{Li}_a\text{M}_b\text{O}_3 \quad \text{(Ie)}$$

In specific embodiments, M, a, and b are as described above. In specific embodiments, a lithium metal of formula (Ie) has the structure Li$_2$MO$_3$ (e.g., Li$_2$MnO$_3$). In some embodiments, a is 2, b is 1 and the one or more metal of M have an average oxidation state of 4.

In certain embodiments, provided herein is an electrode (e.g., positive electrode or cathode) comprising a plurality of nanofibers, the nanofibers comprising a continuous matrix of a lithium containing metal (e.g., a lithium metal alloy, such as a lithium metal oxide). In other embodiments, provided herein is an electrode (e.g., positive electrode or cathode) comprising a plurality of nanofibers, the nanofibers comprising (a) a continuous matrix material; and (b) discrete, isolated domains of a lithium containing metal (e.g., a lithium metal alloy, such as a lithium metal oxide).

In some embodiments, the plurality of nanofibers have a continuous matrix of a lithium containing material. In certain embodiments, the continuous matrix of lithium containing material is porous (e.g., mesoporous). In certain embodiments, the continuous matrix of lithium containing material is hollow (e.g., hollow lithium containing metal nanofibers).

In specific embodiments, the nanofibers comprise (e.g., on average) at least 50% lithium containing material (e.g., by elemental analysis). In specific embodiments, the nanofibers comprise (e.g., on average) at least 70% lithium containing material. In more specific embodiments, the nanofibers comprise (e.g., on average) at least 80% lithium containing material. In still more specific embodiments, the nanofibers comprise (e.g., on average) at least 90% lithium containing material. In yet more specific embodiments, the nanofibers comprise (e.g., on average) at least 95% lithium containing material.

In certain embodiments, the nanofibers comprise (e.g., on average) at least 0.5 wt. % lithium (e.g., by elemental analysis). In specific embodiments, the nanofibers comprise (e.g., on average) at least 1 wt. % lithium (e.g., by elemental analysis). In more specific embodiments, the nanofibers comprise (e.g., on average) at least 2.5 wt. % lithium (e.g., by elemental analysis). In still more specific embodiments, the nanofibers comprise (e.g., on average) at least 5 wt. % lithium (e.g., by elemental analysis). In specific embodiments, the nanofibers comprise (e.g., on average) at least 7 wt. % lithium (e.g., by elemental analysis). In more embodiments, the nanofibers comprise (e.g., on average) at least 10 wt. % lithium (e.g., by elemental analysis).

In some embodiments, lithium atoms constitute (e.g., on average) at least 10% of the atoms present in the nanofibers. In specific embodiments, lithium atoms constitute (e.g., on average) at least 20% of the atoms present in the nanofibers. In more specific embodiments, lithium atoms constitute (e.g., on average) at least 30% of the atoms present in the nanofibers. In still more specific embodiments, lithium atoms constitute (e.g., on average) at least 40% of the atoms present in the nanofibers. In yet more specific embodiments, lithium atoms constitute (e.g., on average) at least 50% of the atoms present in the nanofibers. For example, in certain embodiments, provided herein are nanofibers comprising pure LiNi$_{1/3}$Co$_{1/3}$Mn$_{1/3}$O$_2$, which comprises about 7 wt. % lithium (6.94 mol wt. Li/96.46 mol wt. LiNi$_{1/3}$Co$_{1/3}$Mn$_{1/3}$O$_2$) and about 25% lithium atoms (1 lithium atom/(1 lithium atom+⅓ nickel atom+⅓ manganese atom+⅓ cobalt atom+2 oxygen atoms)).

In some embodiments, the electrode comprises a plurality of nanofibers comprising (a) a matrix; and (b) a plurality of isolated, discrete domains comprising a lithium containing metal (e.g., a lithium alloy/intercalculation compound, such as a lithium metal oxide). In specific embodiments, the matrix is a continuous matrix of carbon (e.g., amorphous carbon). In certain embodiments, the matrix and/or discrete lithium containing domains are porous (e.g., mesoporous). In certain embodiments, the continuous matrix is hollow. In specific embodiments, the nanofibers comprise (e.g., on average) at least 30% lithium material (e.g., by elemental analysis). In specific embodiments, the nanofibers comprise (e.g., on average) at least 40% lithium material. In more specific embodiments, the nanofibers comprise (e.g., on average) at least 50% lithium material. In still more specific embodiments, the nanofibers comprise (e.g., on average) at least 70% lithium material. In yet more specific embodiments, the nanofibers comprise (e.g., on average) at least 80% lithium material. In some embodiments, the nanofibers comprise lithium containing domains that comprise (e.g., on average) at least 70% lithium material. In more specific embodiments, the domains comprise (e.g., on average) at least 80% lithium material. In still more specific embodiments, the domains comprise (e.g., on average) at least 90% lithium material. In yet more specific embodiments, the domains comprise (e.g., on average) at least 95% lithium material. In certain embodiments, the nanofibers comprise (e.g., on average) at least 0.1 wt. % lithium (e.g., by elemental analysis). In specific embodiments, the nanofibers comprise (e.g., on average) at least 0.5 wt. % lithium (e.g., by elemental analysis). In more specific embodiments, the nanofibers comprise (e.g., on average) at least 1 wt. % lithium (e.g., by elemental analysis). In still more specific embodiments, the nanofibers comprise (e.g., on average) at least 2.5 wt. % lithium (e.g., by elemental analysis). In specific embodiments, the nanofibers comprise (e.g., on average) at least 5 wt. % lithium (e.g., by elemental analysis). In more embodiments, the nanofibers comprise (e.g., on average) at least 10 wt. % lithium (e.g., by elemental analysis). In some embodiments, lithium atoms constitute (e.g., on average) at least 10% of the atoms present in the nanofibers. In specific embodiments, lithium atoms constitute (e.g., on average) at least 5% of the atoms present in the nanofibers or the domains. In more specific embodiments, lithium atoms constitute (e.g., on average) at least 10% of the atoms present in the nanofibers or domains. In still more specific embodiments, lithium atoms constitute (e.g., on average) at least 20% of the atoms present in the nanofibers or domains. In yet more specific embodiments, lithium atoms constitute (e.g., on average) at least 30% of the atoms present in the nanofibers or domains. In further embodiments, lithium atoms constitute (e.g., on average) at least 40%, at least 50%, or the like of the atoms present in the domains.

In certain embodiments, provided herein are lithium-containing-nanofibers comprising a lithium material described herein, wherein up to 50% of the lithium is absent. In some instances, the lithium is absent due to delithiation (de-intercalculation of lithium) during lithium ion battery operation. In other instances, the lithium is absent due to volatility and/or sublimation of the lithium component. In specific embodiments, up to 40% of the lithium is absent. In more specific embodiments, up to 30% of the lithium is absent. In still more specific embodiments, up to 20% of the lithium is absent. In yet more specific embodiments, up to 10% of the lithium is absent.

In some embodiments, provided herein is a battery comprising such an electrode (e.g., cathode). In specific embodiments, the battery is a secondary cell. Also, provided in certain embodiments herein are nanofibers or nanofiber mats comprising one or more such nanofiber as described herein.

In some embodiments, lithium-containing nanofibers provided herein have an initial capacity of at least 60 mAh/g as a cathode in a lithium ion battery (e.g., at a charge/discharge rate of 0.1 C—such as in a half cell with lithium as the counter electrode). In specific embodiments, lithium-containing nanofibers provided herein have an initial capacity of at least 80 mAh/g as a cathode in a lithium ion battery (e.g., at a charge/discharge rate of 0.1 C). In more specific embodiments, lithium-containing nanofibers provided herein have an initial capacity of at least 100 mAh/g as a cathode in a lithium ion battery (e.g., at a charge/discharge rate of 0.1 C). In still more specific embodiments, lithium-containing nanofibers provided herein have an initial capacity of at least 120 mAh/g as a cathode in a lithium ion battery (e.g., at a charge/discharge rate of 0.1 C). In yet more specific embodiments, lithium-containing nanofibers provided herein have an initial capacity of at least 160 mAh/g as a cathode in a lithium ion battery (e.g., at a charge/discharge rate of 0.1 C). In more specific embodiments, lithium-containing nanofibers provided herein have an initial capacity of at least 180 mAh/g as a cathode in a lithium ion battery (e.g., at a charge/discharge rate of 0.1 C).

In certain embodiments, lithium-containing nanofibers have a capacity (e.g., charge, discharge, and/or specific capacity) at least 50% initial capacity after 50 cycles. In specific embodiments, lithium-containing nanofibers have a capacity (e.g., charge, discharge, and/or specific capacity) at least 60% initial capacity after 50 cycles. In more specific embodiments, lithium-containing nanofibers have a capacity (e.g., charge, discharge, and/or specific capacity) at least 70% initial capacity after 50 cycles. In certain embodiments, lithium-containing nanofibers have a capacity (e.g., charge, discharge, and/or specific capacity) at least 50% initial capacity after 40 cycles. In specific embodiments, lithium-containing nanofibers have a capacity (e.g., charge, discharge, and/or specific capacity) at least 60% initial capacity after 40 cycles. In more specific embodiments, lithium-containing nanofibers have a capacity (e.g., charge, discharge, and/or specific capacity) at least 70% initial capacity after 40 cycles.

Figure 32:
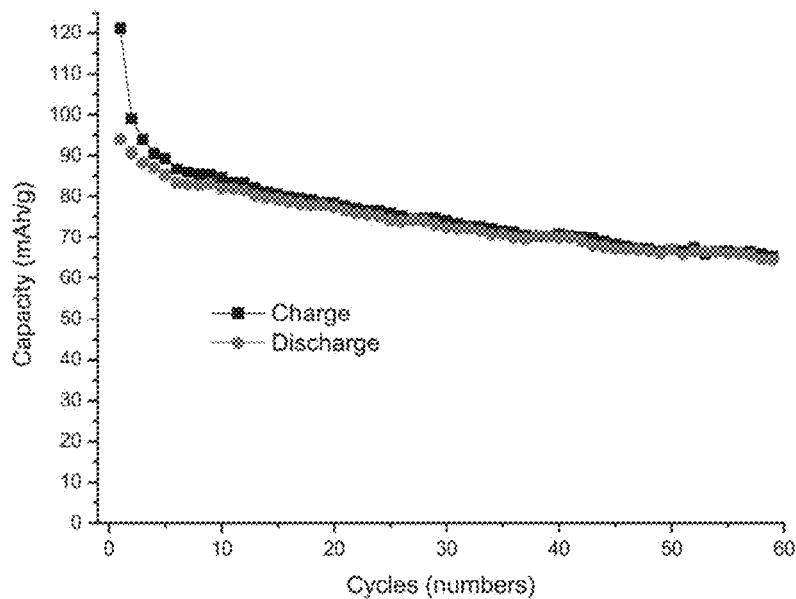
FIG. 32 illustrates the charge/discharge capacities for lithium cobalt oxide nanofiber cathodes in a lithium ion battery half cell.
Figure 32:
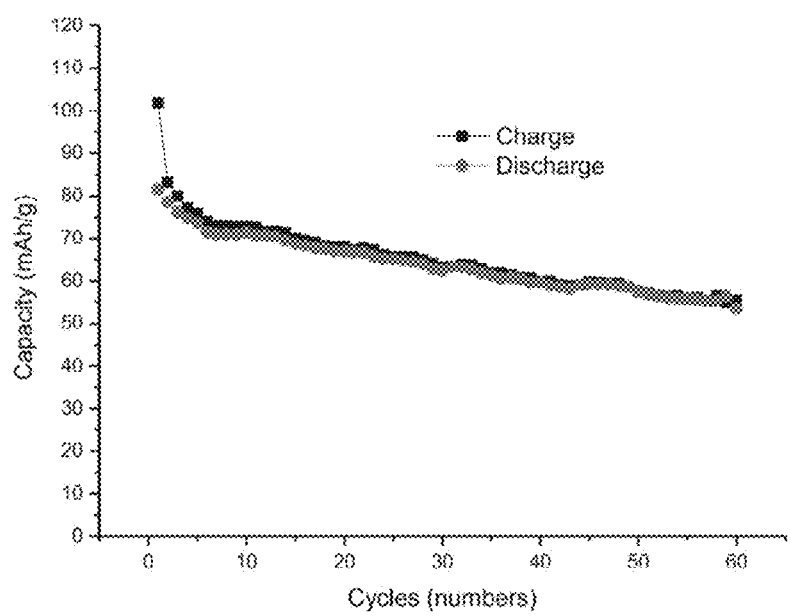
Figure 41:
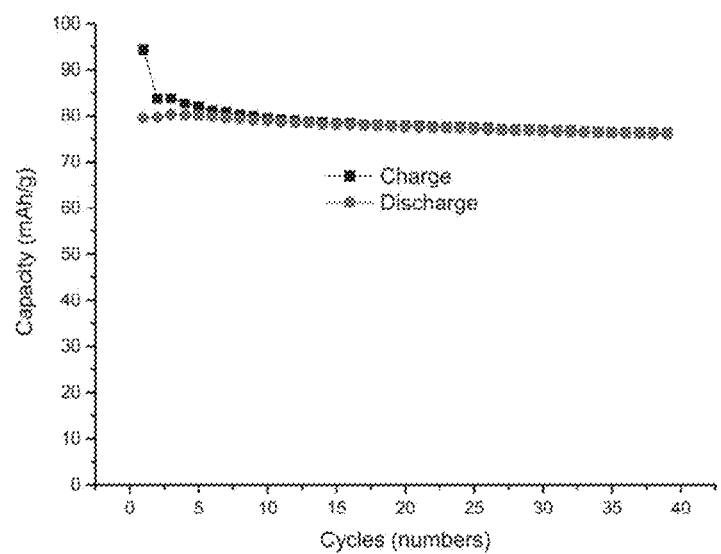
FIG. 41 illustrates the charge/discharge capacity of certain lithium manganese oxide nanofibers for about 40 cycles.

FIG. 32 illustrates the charge/discharge capacities for lithium cobalt oxide nanofiber cathodes in a lithium ion battery half cell. FIG. 41 illustrates the charge/discharge capacity of the lithium manganese oxide nanofiber cathodes in a lithium ion battery half cell.

In some embodiments, provided herein is a battery comprising such an electrode (e.g., cathode). In specific embodiments, the battery is a secondary cell. Also, provided in certain embodiments herein are nanofibers or nanofiber mats comprising one or more such nanofiber as described herein.

In some embodiments, positive electrodes provided herein are prepared by depositing lithium-containing nanofibers onto a current collector, thereby creating a positive electrode comprising the nanofibers in contact with a current collector. In certain embodiments, as-treated nanofibers are ground in a mortal and pestle to produce processed nanofibers, which are then deposited on a current collector. In some embodiments, the processed nanofibers are dispersed in a solvent to prepare a composition, the composition is deposited onto a current collector, and evaporation of the solvent results in formation of an electrode on the current collector. In specific embodiments, the composition further comprises a binder. In further or alternative specific embodiments, the composition further comprises a conductive material (e.g., carbon black)—e.g., to improve electron mobility.

Separator and Nanofibers Therefor

Described herein are lithium-ion batteries and methods for making a lithium ion battery comprising a separator. In some embodiments, the battery comprises an anode in a first chamber, a cathode in a second chamber, and a separator between the first chamber and the second chamber. In some embodiments, the separator comprises polymer nanofibers. In some embodiments, the separator allows ion transfer between the first chamber and second chamber in a temperature dependent manner.

In certain embodiments, provided herein are nanofibers comprising a polymer matrix (e.g., continuous matrix, or continuous core matrix or backbone) and optionally comprising thermally stable nanostructures embedded therein. In specific embodiments, the nanostructures are present. In some embodiments, the thermally stable nanostructures have any suitable shape or configuration. In specific embodiments, the thermally stable nanostructures comprise a clay or ceramic. In specific embodiments, such nanofibers are for use in or as a battery separator (e.g., a lithium ion battery separator).

In certain embodiments, provided herein are nanofibers comprising a polymer matrix (e.g., continuous matrix, or continuous core matrix or backbone) and comprising nanoclay and/or nanoceramic structures embedded therein. In some embodiments, the thermally stable structures have any suitable shape or configuration.

In some embodiments, non-limiting exemplary clays (e.g., in nanoclay structures) provided herein are selected from the group consisting of bentonite, aluminum phyllosilicate, montmorillonite, kaolinite, illite, vermiculite, smectite, chlorite, silicate clay, sesquioxide clays, allophane, imogolite, fluorohectorate, laponite, bentonite, beidellite, hectorite, saponite, nontronite, sauconite, ledikite, magadiite, kenyaite, stevensite, and combinations thereof. In specific embodiments, the clay (e.g., nanoclay) is a hydrophilic clay (e.g., nanoclay), such as bentonite. In some embodiments, non-limiting exemplary ceramics (e.g., in nanoceramic structures) provided herein are selected from the group consisting of silica, alumina, titania, beryllia, silicon carbide, and combinations thereof. In some embodiments, non-limiting exemplary ceramics include metal oxide ceramics, metal carbide ceramics, metal silicate ceramics, metal nitride ceramics, and the like.

In some embodiments, nanofibers (e.g., for use as separators) comprise any suitable amount of thermally stable nanostructured material. In specific embodiments, such nanofibers comprise (e.g., on average) about 0.1 wt % to about 70 wt % nanoclay and/or nanoceramic (cumulatively). In more specific embodiments, nanofibers comprise (e.g., on average) about 0.5 wt % to about 50 wt % nanoclay and/or nanoceramic (cumulatively). In still more specific embodiments, nanofibers comprise (e.g., on average) about 2 wt % to about 25 wt % nanoclay and/or nanoceramic (cumulatively). In still more specific embodiments, nanofibers comprise (e.g., on average) about 3 wt % to about 10 wt % nanoclay and/or nanoceramic (cumulatively).

Any suitable polymer is used. In some embodiments, the polymer comprises a water soluble polymer, a thermoplastic, or a solvent soluble polymer. In certain embodiments, the polymer is a polyolefin. In some embodiments, the polymer is polyethylene (PE) (e.g., ultra-high molecular weight polyethylene (UHMWPE)), polypropylene (PP), polyvinyl alcohol (PVA), polyacrylonitrile (PAN), polyethylene oxide (PEO), polyvinylpyrrolidone (PVP), polyvinylidene fluoride (PVDF), nylon, aramid, polyethylene terephthalate (PET), polyimide (PI), or any combination thereof. In specific embodiments, the polymer is polyacrylonitrile (PAN). In other specific embodiments, the polymer is polyethylene (PE) or polypropylene (PP). Other polymers described herein (e.g., electrospinnable polymers described herein) are optionally utilized.

In specific embodiments, provided herein is a lithium ion battery separator comprising nanofiber, the nanofiber comprising (i) a continuous polymer matrix; and (ii) nanoclay and/or nanoceramic (e.g., a ceramic nanoparticle) embedded within the continuous polymer matrix. In specific embodiments, the polymer matrix is a thermoplastic, a water soluble polymer, or a solvent soluble polymer. In more specific embodiments, the polymer is PE, PP, meta-aramid, or PAN. In still more specific embodiments, the polymer is PAN.

In some embodiments, a process for producing (e.g., polymer-clay or polymer-ceramic) nanocomposite nanofibers (e.g., for use as battery separators—such as lithium ion battery separators) comprises electrospinning a fluid stock to form as-spun nanofibers, the fluid stock comprising a plurality of nanostructures and a polymer, the plurality of nanostructures comprising a clay, a ceramic, or a combination thereof. In some embodiments, the process further comprises annealing the nanofibers. In certain embodiments, the thermal treatment occurs under inert conditions (e.g., in an argon atmosphere). In further or alternative embodiments, the process further comprise compressing the nanofibers (e.g., electrospinning or assembling a non-woven mat of nanofibers and subsequently compressing the non-woven mat). In certain embodiments, the electrospinning is gas assisted. In specific embodiments, the electrospinning is coaxially gas assisted. In other embodiments, fluid is a solvent based solution. In some embodiments, the polymer is a solvent soluble polymer, such as polyacrylonitrile (PAN) (e.g., soluble in DMF), or a polyolefin (e.g., polyethylene (PE) or polypropylene (PP)).

In some embodiments, nanofibers (e.g., for use in a separator herein) are thermally treated (e.g., annealed) nanofibers. In specific embodiments, the nanofibers are annealed at a temperature of less than 300° C., e.g., 100° C.-200° C. In some embodiments, the nanofibers are annealed at a temperature below the melt temperature of the polymer therein.

In certain embodiments, nanofibers (e.g., for use in a separator herein) are compressed. In some embodiments, the nanofibers are formed into a non-woven mat and compressed. Any suitable pressure is optionally utilized. In some embodiments, the nanofibers are compressed at a pressure of 0.1 Mpa to 10 Mpa. In some embodiments, the nanofibers are compressed at a pressure of 1 Mpa to 5 Mpa.

In some embodiments, a separator (e.g., in a lithium ion battery) provided herein comprises a nanofiber mat, comprising a (or a plurality of) nanofiber(s) provided herein, the separator having a thickness of 10 to 100 microns. In specific embodiments, the thickness is 20-60 microns. In more specific embodiments, the thickness is 30-50 microns.

Figure 47:
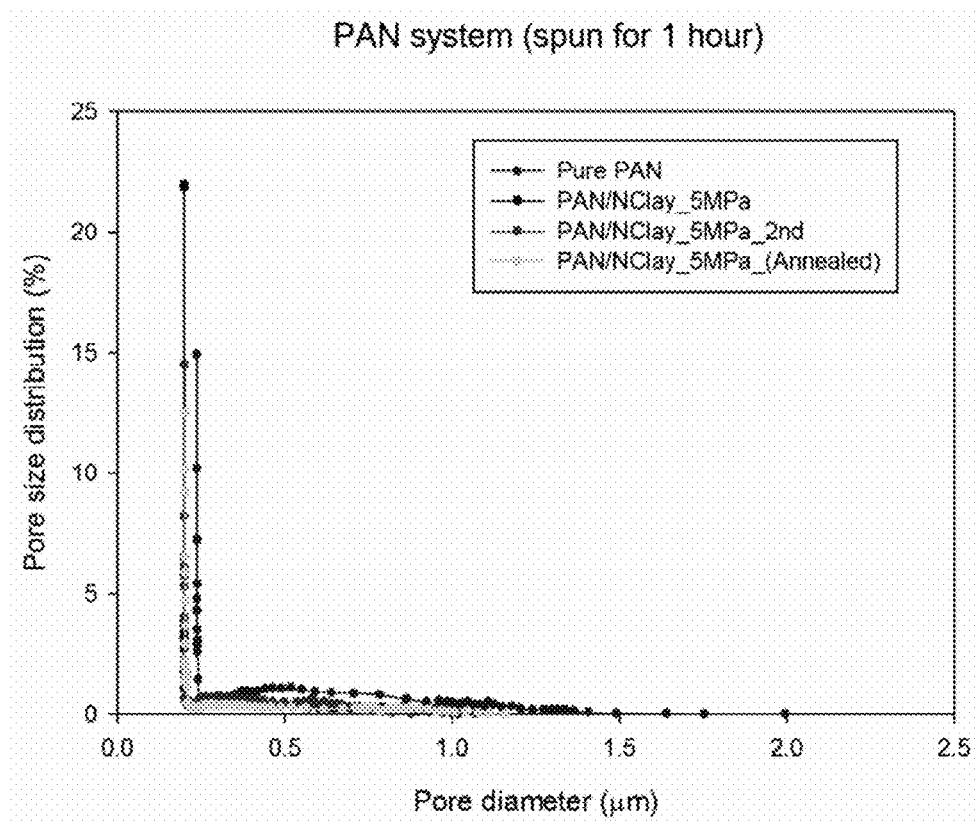
FIG. 47 illustrates the pore size distribution of various polymer containing nanofiber mats (e.g., for use in separators) provided herein.

In some embodiments, a separator provided herein has an average pore size of less than 1 micron. In specific embodiments, a separator provided herein has an average pore size of less than 0.5 micron. In some embodiments, a separator provided herein has a peak pore size distribution at less than 1 micron. In specific embodiments, a separator provided herein has a peak pore size distribution at less than 0.5 micron. FIG. 47 illustrates the pore size distribution of various nanofiber mats (e.g., for use in separators) provided herein.

Figure 48:
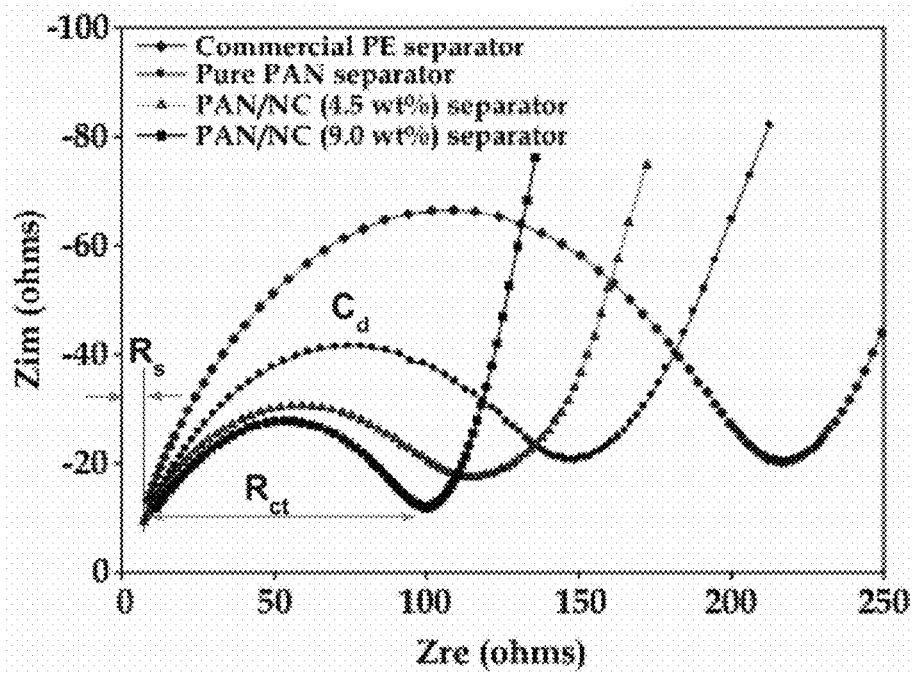
FIG. 48 illustrates a Nyquist plot of various separators provided herein (compared to commercial PE separator).

FIG. 48 illustrates a Nyquist plot of different separators provided herein (compared to commercial PE separator), wherein 32 mg of $LiCoO_2$ powder is used as a cathode (e.g., in a half cell) and the constant voltage=VOC (1.7-2.0V)–Cd=double layer capacitor (charge-transfer process); Rct=polarization (charge transport) resistor; W=Warburg resistor; Rs=solution resistor. FIG. 48 indicates the decreased cell resistance (Rct and Rs) for the separators provided herein compared to commercial (Celgard) polyethylene separators. In some embodiments, provided herein is a separator having an Rct of less than 200 ohms, less than 150 ohms, less than 100 ohms, or the like (e.g., wherein 32 mg of $LiCoO_2$ is used as a cathode and the constant voltage=VOC (1.7-2.0V), such as with the circuit illustrated in FIG. 48). In some embodiments, a separator provided herein has an Rs, Cd, and/or Rct less than or equal to that found for the PAN nanofiber separator, or either of the PAN/nanoclay nanofiber separators under the conditions set forth in FIG. 48.

Figure 49:
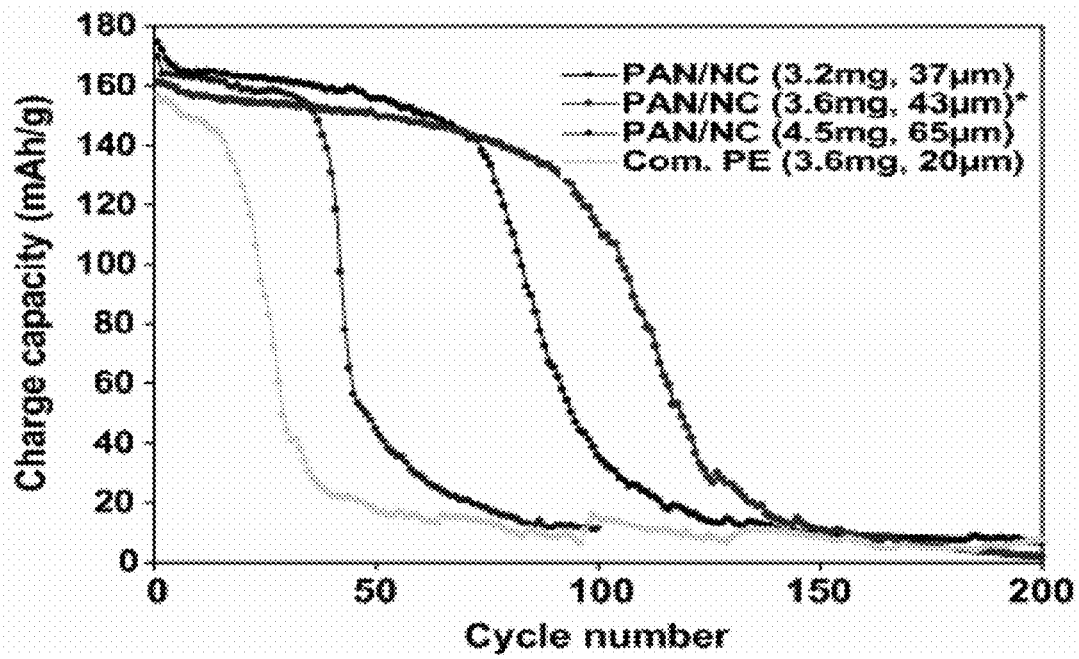
FIG. 49 illustrates the cycle test results of commercial PE (Celgard) and various nanofiber separators provided herein.

In some embodiments, provided herein are separators that are stable for at least 50 cycles at 0.2 C. In some embodiments, provided herein are separators that are stable for at least 70 cycles at 0.2 C. In some embodiments, provided herein are separators that are stable for at least 90 cycles at 0.2 C. In some embodiments, provided herein are separators that are stable for at least 100 cycles at 0.2 C. In certain embodiments, stability refers to maintaining at least 60% of initial charge capacity of a battery (e.g., lithium ion battery cell). In certain embodiments, stability refers to maintaining at least 70% of initial charge capacity of a battery (e.g., lithium ion battery cell). In certain embodiments, stability refers to maintaining at least 80% of initial charge capacity of a battery (e.g., lithium ion battery cell). FIG. 49 illustrates the cycle test results of commercial PE (Celgard) and various nanofiber separators provided herein (top PAN/NC in legend:compressed PAN/nanoclay nanocomposite nanofibers; second PAN/NC in legend:compressed and annealed PAN/nanoclay nanocomposite nanofibers; third PAN/NC in legend:not compressed and not annealed PAN/nanoclay nanocomposite nanofibers).

Figure 50:
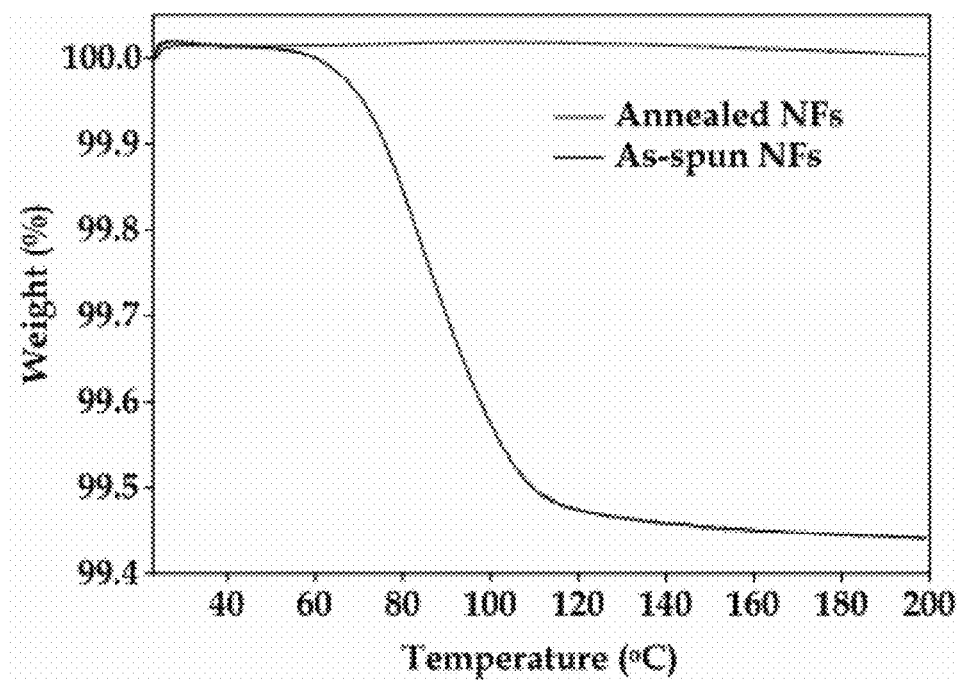
FIG. 50 illustrates a TGA curve of certain nanofiber (e.g., for separators) provided herein.

In some embodiments, the nanofibers (e.g., for use in separators herein) have high thermal stability. In specific instances, such nanofibers have less than a 0.5 wt % loss (e.g., as measured by TGA) between room temperature and 200° C. In more specific embodiments, such nanofibers have less than a 0.2 wt % loss (e.g., as measured by TGA) between room temperature and 200° C. In still more specific embodiments, such nanofibers have less than a 0.2 wt % loss (e.g., as measured by TGA) between room temperature and 200° C. FIG. 50 illustrates improved thermal stability of annealed nanofibers provided herein versus non-annealed nanofibers. In some instances, improved thermal stability is evidence of decreased contaminants—e.g., leading to improved battery cycling, as observed in FIG. 49.

Figure 51:
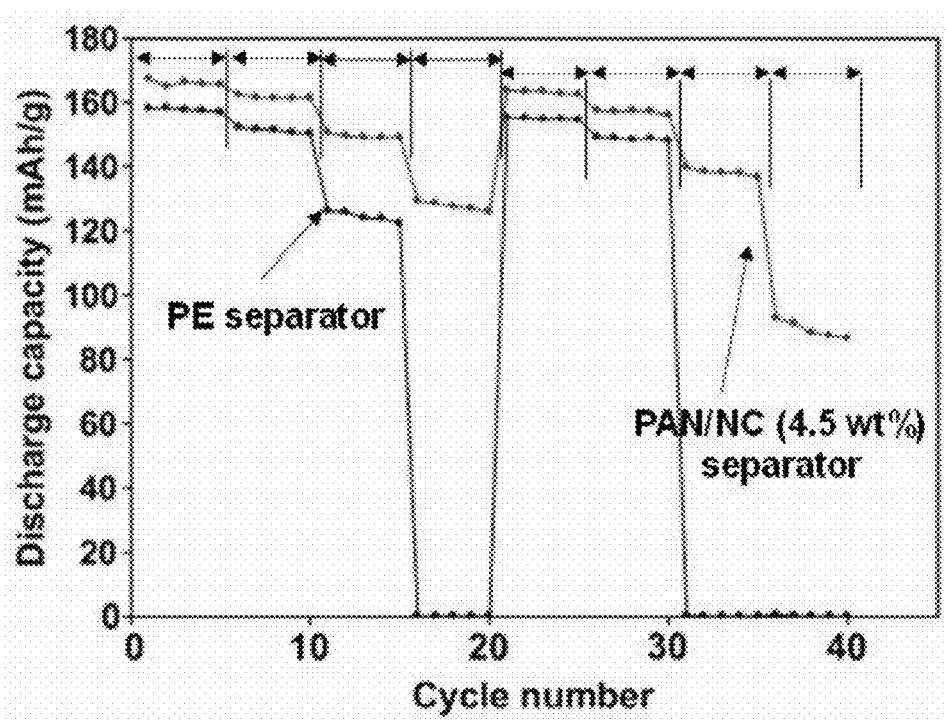
FIG. 51 illustrates C rate capacity tests for discharge capacity of half cells (with lithium cobalt oxide) using a separator provided herein.
Figure 52:
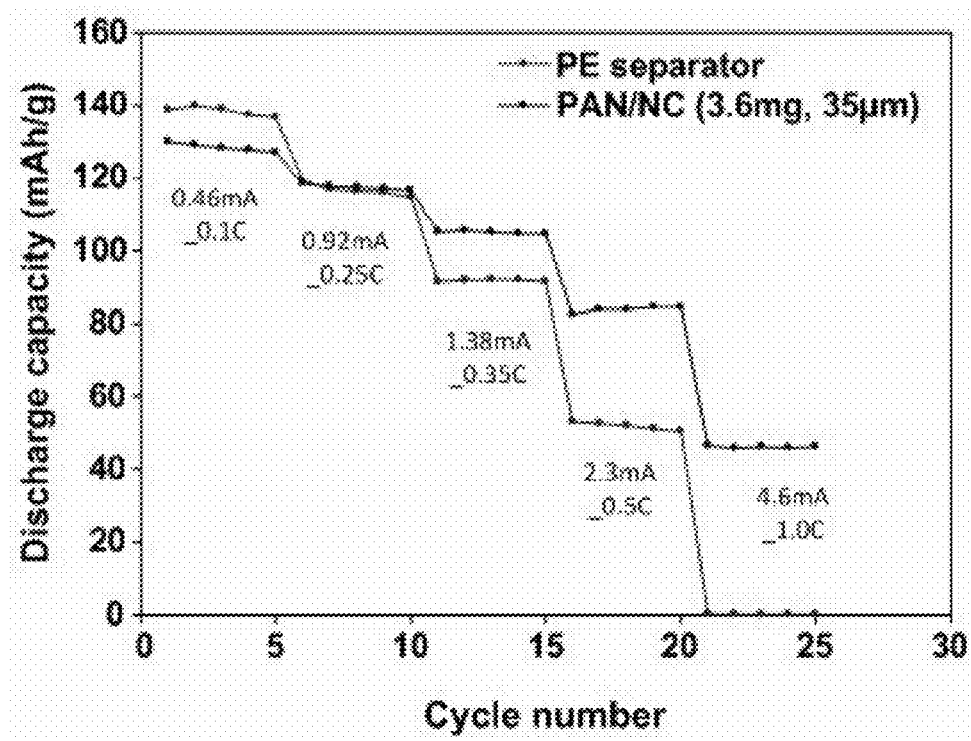
FIG. 52 illustrates C rate capacity tests for discharge capacity of half cells (with lithium manganese oxide) using a separator provided herein.

In some embodiments, batteries provided herein having a separator as described herein retain discharge capabilities at about 1.5 C, following 5 cycles at about 0.1 C, 5 cycles at about 0.2 C, and 5 cycles at about 0.5 C. In some embodiments, batteries provided herein having a separator as described herein retain discharge capabilities at about 0.5 C, following (sequentially) 5 cycles at about 0.1 C, 5 cycles at about 0.2 C, 5 cycles at about 0.5 C, 5 cycles at about 1.5 C, 5 cycles at about 0.1 C, and 5 cycles at about 0.2 C. In some embodiments, batteries provided herein having a separator as described herein retain discharge capabilities at about 1.5 C, following (sequentially) 5 cycles at about 0.1 C, 5 cycles at about 0.2 C, 5 cycles at about 0.5 C, 5 cycles at about 1.5 C, 5 cycles at about 0.1 C, 5 cycles at about 0.2 C, and 5 cycles at about 0.5 C. In some instances, such discharge capabilities are at least 50% of the initial discharge capabilities at the same C (e.g., for the same or identical cell). In specific instances, such discharge capabilities are at least 60% of the initial discharge capabilities at the same C (e.g., for the same or identical cell). In more specific instances, such discharge capabilities are at least 70% of the initial discharge capabilities at the same C (e.g., for the same or identical cell). FIG. 51 and FIG. 52 illustrate plots of a C rate capability test comparing a polymer-nanoclay nanofiber separator provided herein to a commercial (Celgard) polyethylene separator, and demonstrates the superior capabilities of the separators provided herein.

In some instances, the separators described herein are a safety feature. For example, stopping the ion transfer between the first chamber and second chamber above a certain temperature prevents the battery from exploding and/or catching fire in some instances.

In some embodiments, the battery described herein comprises a separator, wherein the separator allows transfer of ions between the first chamber and second chamber below a temperature (e.g., the melting point of the polymer comprising the nanofibers) and prohibits or allows reduced ion transfer above the temperature. The temperature is any suitable temperature (e.g., a temperature below which the battery explodes). In some instances, the temperature is about 60° C., about 80° C., about 100° C., about 150° C., about 200° C., about 300° C., about 400° C., about 500° C., and the like. In some instances, the temperature is at least 60° C., at least 80° C., at least 100° C., at least 150° C., at least 200° C., at least 300° C., at least 400° C., at least 500° C., and the like. In some instances, the temperature is at most 60° C., at most 80° C., at most 100° C., at most 150° C., at most 200° C., at most 300° C., at most 400° C., at most 500° C., and the like.

In some embodiments, the separator does not shrink or melt at elevated temperatures (e.g., above 80° C., above 100° C., above 150° C., above 200° C., above 300° C., above 400° C., and the like). In some embodiments, the separator is wettable by the electrolyte. In some embodiments, the separator is not soluble in the electrolyte.

In some embodiments, the separator comprises polymer nanofibers. Any suitable method for electrospinning is used. For example, elevated temperature electrospinning is described in U.S. Pat. No. 7,326,043 filed on Oct. 18, 2004; U.S. patent application Ser. No. 13/036,441 filed on Feb. 28, 2011; and U.S. Pat. No. 7,901,610 filed on Jan. 10, 2008. In some embodiments, the electrospinning step comprises co-axially electrospinning the fluid stock with a second fluid. Co-axial electrospinning is described in PCT Patent Application PCT/US11/24894 filed on Feb. 15, 2011. In some embodiments, the second fluid is a gas (i.e., the electrospinning is gas assisted). Gas-assisted electrospinning is described in PCT Patent Application PCT/US11/24894 filed on Feb. 15, 2011. Briefly, gas-assisted electrospinning comprises expelling a stream of gas at high velocity along with the fluid stock (e.g., as a stream inside the fluid stock or surrounding the fluid stock), which can increase the throughput of an electrospinning process. In some embodiments, the fluid stock surrounds the gas stream. In some embodiments, the nanofibers comprise a hollow core (e.g., when electrospun with an inner gas stream).

Electrolytes

In one aspect, described herein is a lithium-ion battery comprising an electrolyte and: (a) an electrode, the electrode comprising a plurality of nanofibers comprising domains of a high energy capacity material; (b) an electrode, the electrode comprising porous nanofibers, the nanofibers comprising a high energy capacity material; (c) an anode in a first chamber, a cathode in a second chamber, and a separator between the first chamber and the second chamber, the separator comprising polymer nanofibers, and the separator allowing ion transfer between the first chamber and second chamber in a temperature dependent manner; or (d) any combination thereof.

In some embodiments, the electrolyte is a lithium salt in an organic solvent.

A liquid electrolyte conducts lithium ions, acting as a carrier between the cathode and the anode when a battery passes an electric current through an external circuit. In some embodiments, the conductivity of liquid electrolyte at room temperature (20° C.) are in the range of 10 mS/cm, increasing by approximately 30-40% at 40° C. and decreasing by a slightly smaller amount at 0° C.

Any suitable material and/or solution is used as the electrolyte. In some instances, lithium is highly reactive to water, therefore, nonaqueous or aprotic solutions are used. In some embodiments, the electrolyte is a mixture of organic carbonates such as ethylene carbonate (EC), fluoroethylene carbonate (FEC), or diethyl carbonate comprising complexes of lithium ions. In some embodiments, these non-aqueous electrolytes use non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$).

In some embodiments, organic solvents decompose on anodes during charging. Here, when organic solvents are used as the electrolyte, the solvent decomposes on initial charging and forms a solid layer called the solid electrolyte interphase (SEI), which is electrically insulating yet provides sufficient ionic conductivity in some embodiments. In some instances, the interphase prevents decomposition of the electrolyte after the second charge. For example, ethylene carbonate is decomposed at a relatively high voltage, 0.7 V vs. lithium, and forms a dense and stable interface.

In some embodiments, a suitable solution are composite electrolytes based on POE (poly(oxyethylene)). In various embodiments, POE is either solid (high molecular weight) and be applied in dry Li-polymer cells, or liquid (low molecular weight) and be applied in regular Li-ion cells.

Nanofibers

In some embodiments, a battery (e.g., lithium ion battery) provided herein comprises a plurality of electrodes, one or more of the electrodes comprising nanofibers (e.g., a nanofiber as described herein). In certain embodiments, a battery (e.g., lithium ion battery) provided herein comprises a plurality of electrodes (e.g., a positive and a negative electrode) and a separator, one or more of the electrodes and/or the separator comprising nanofibers. In specific embodiments, provided herein is a battery (e.g., lithium ion battery) comprising a positive electrode (cathode), a negative electrode (anode), and a separator, all of which comprise nanofibers. Also, provided herein the nanofibers themselves, regardless of presence in a battery, electrode, or separator described herein.

In some embodiments, nanofibers provided herein comprise a matrix material (e.g., a continuous matrix material, a continuous core matrix material or backbone, or a continuous tube matrix material that surrounds a hollow core). In some embodiments (e.g., for nanofibers for use in electrodes), the matrix material provides structural support for domains of high energy capacity material (e.g., discrete, isolated domains of high energy capacity material). In certain embodiments (e.g., for nanofibers for use in separators), the matrix material provides structural support for domains of (e.g., chemically and/or thermally) inert material (e.g., discrete, isolated domains of inert material), such as nanoclay or nanoceramic.

In some embodiments, a nanofiber matrix material comprises a high energy capacity material (e.g., the nanofiber is "pure" high energy material and does not comprise the domains discussed above). In some embodiments, the nanofibers (e.g., pure high energy material nanofibers) comprise (e.g., on average) at least 75 wt. % (e.g., by elemental analysis, TGA analysis, or the like) of the high energy material, at least 80 wt. %, at least 85%, at least 90%, at least 95%, at least 98%, or the like of the high energy material.

In some embodiments, the nanofiber matrix comprises Si, Ge, Sn, Fe, Co, Cu, Ni, $LiCo_xNi_yMn_zO_2$, $LiMn_xNi_yCo_zV_aO_4$, S, sulfur encapsulated in carbon, $Li_2S$, $Fe_xNi_yCo_zV_aPO_4$, $LiFe_xNi_yCo_zV_aPO_4$, any oxidation state thereof, or any combination thereof.

In some embodiments, domains of the high energy capacity material are dispersed in a nanofiber matrix, the matrix comprising polymer (e.g., PVA, PAN, PEO, PVP, PPO, PS, PMMA, PC, cellulose), carbon (e.g., graphite, amorphous), ceramic (e.g., $Al_2O_3$, $ZrO_2$, $TiO_2$), Si (e.g., amorphous silicon), Ge, Sn, metal (e.g., Fe, Cu, Co, Ag, Ni, Au), any oxidation state thereof, or any combination thereof. In some embodiments, the nanofiber matrix is polymer, carbon, metal, or ceramic. In specific embodiments, the nanofiber matrix is polymer or carbon. In more specific embodiments, (e.g., wherein the nanofiber is for use in a separator), the nanofiber matrix is polymer. In other specific embodiments, (e.g., wherein the nanofiber is for use as an electrode), the nanofiber matrix is carbon.

In some embodiments, the domains of high energy capacity material comprise crystalline high energy capacity material. In some embodiments, the domains of high energy capacity material comprise amorphous high energy capacity material. In some embodiments, the domains of high energy capacity material comprise nanoparticles comprising the high energy capacity material.

In some instances, intercalation of lithium ions expands the volume of the high energy material during operation of the battery. In one aspect, the domains of high energy capacity material are spaced sufficiently far apart in the nanofiber to avoid pulverization of the electrode during operation of the battery. In some embodiments, the spaces between the domains in the nanofiber matrix are sufficient to avoid impingement of the domains upon each other upon expansion of the electrode during operation of the battery.

The domains, nanostructures, or nanoparticles provided herein (e.g., of high energy material) have any suitable size. In some instances, the domains, nanostructures, or nanoparticles have an average diameter of about 5 nm, about 10 nm, about 20 nm, about 30 nm, about 40 nm, about 50 nm, about 60 nm, about 70 nm, about 80 nm, about 90 nm, about 100 nm, about 130 nm, about 150 nm, about 200 nm, and the like. In some instances, the domains, nanostructures, or nanoparticles have an average diameter of at most 5 nm, at most 10 nm, at most 20 nm, at most 30 nm, at most 40 nm, at most 50 nm, at most 60 nm, at most 70 nm, at most 80 nm, at most 90 nm, at most 100 nm, at most 130 nm, at most 150 nm, at most 200 nm, and the like. In some instances, e.g., wherein the domain, nanostructure, or nanoparticle is not spherical, the diameter refers to the (e.g., average of the plurality of structures) shortest cross-sectional distance across the structure. For example, the diameter of a cylinder refers to the diameter of the circular portion of the cylinder. In some instances, the domains, nanostructures, or nanoparticles have an average length of about 5 nm, about 10 nm, about 20 nm, about 30 nm, about 40 nm, about 50 nm, about 60 nm, about 70 nm, about 80 nm, about 90 nm, about 100 nm, about 130 nm, about 150 nm, about 200 nm, and the like. In some instances, the domains, nanostructures, or nanoparticles have an average length of at most 5 nm, at most 10 nm, at most 20 nm, at most 30 nm, at most 40 nm, at most 50 nm, at most 60 nm, at most 70 nm, at most 80 nm, at most 90 nm, at most 100 nm, at most 130 nm, at most 150 nm, at most 200 nm, at most 400 nm, at most 600 nm, at most 800 nm, and the like. In some instances, e.g., wherein the domain, nanostructure, or nanoparticle is not spherical, the length refers to the (e.g., average of the plurality of structures) longest cross-sectional distance across the structure (for spherical structures, the length is the same as the diameter).

In one aspect, the domains of high energy material have a uniform size. In some instances, the standard deviation of the size of the domains is about 50%, about 60%, about 70%, about 80%, about 100%, about 120%, about 140%, about 200%, and the like of the average size of the domains (i.e., the size is uniform). In some instances, the standard deviation of the size of the domains is at most 50%, at most 60%, at most 70%, at most 80%, at most 100%, at most 120%, at most 140%, at most 200%, and the like of the average size of the domains (i.e., the size is uniform).

The domains of high energy material have any suitable distance between each other (separation distance). In some instances, the domains have an average separation distance of about 2 nm, about 5 nm, about 10 nm, about 20 nm, about 30 nm, about 40 nm, about 50 nm, about 60 nm, about 70 nm, about 80 nm, about 90 nm, about 100 nm, about 130 nm, about 150 nm, about 200 nm, and the like. In some instances, the domains have an average diameter of at most 2 nm, at most 5 nm, at most 10 nm, at most 20 nm, at most 30 nm, at most 40 nm, at most 50 nm, at most 60 nm, at most 70 nm, at most 80 nm, at most 90 nm, at most 100 nm, at most 130 nm, at most 150 nm, at most 200 nm, and the like.

Figure 5:
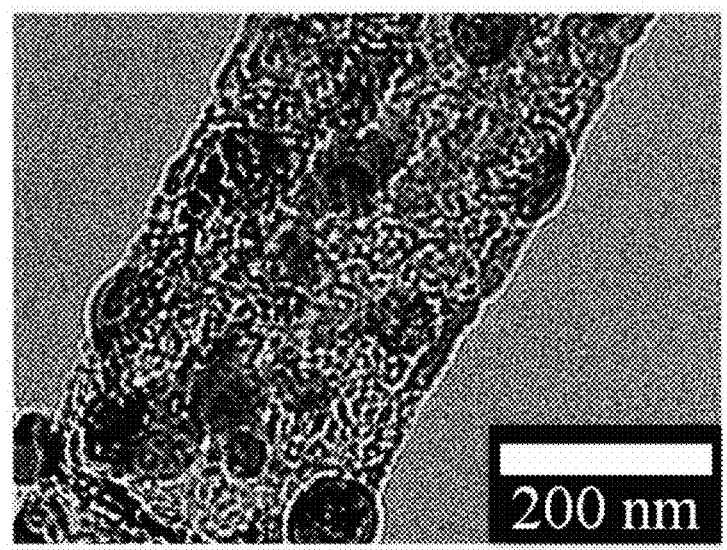
FIG. 5 illustrates a TEM image for silicon/carbon nanocomposite nanofibers.
Figure 22:
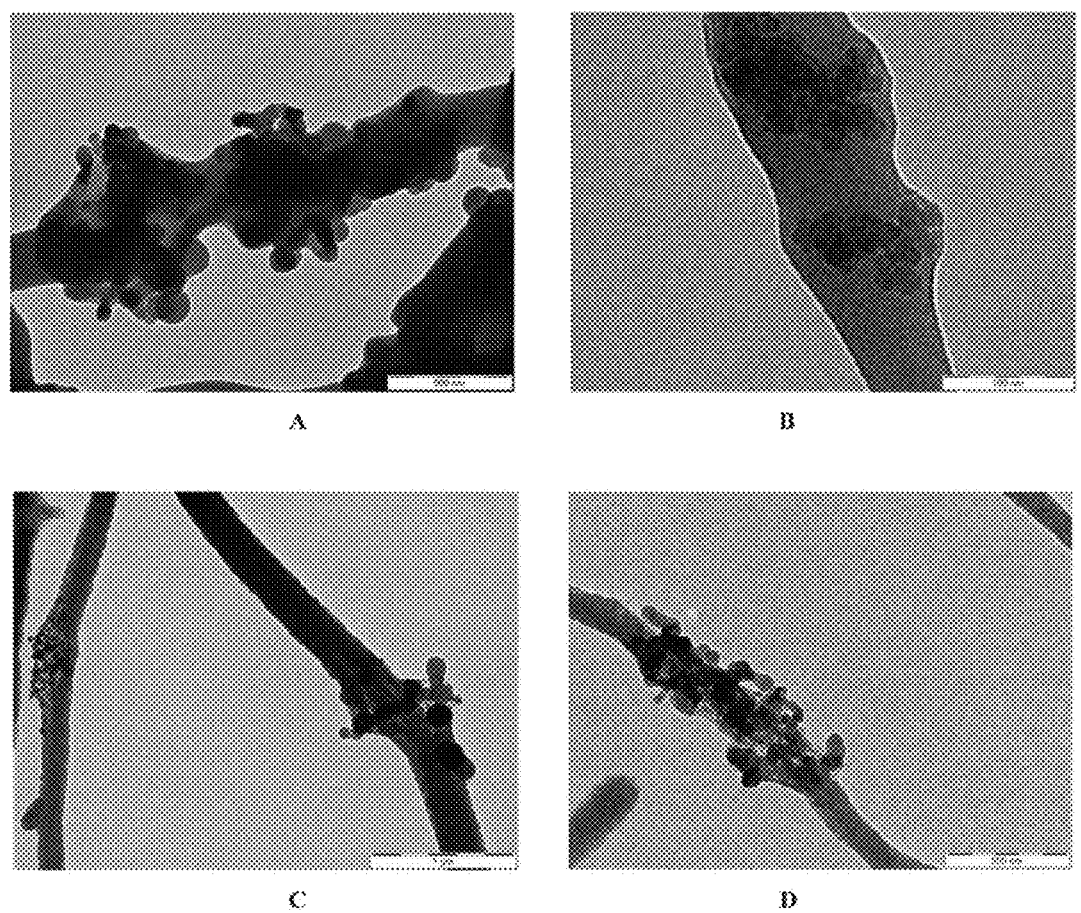
FIG. 22 illustrates certain nanofibers prepared by electrospinning a fluid stock comprising polymer and nanoparticles without a gas-assisted process.

FIG. 4 and FIG. 5 illustrate nanofibers prepared by electrospinning a fluid stock comprising polymer and nanoparticles with a gas-assisted (e.g., coaxially gas assisted) process described herein. FIG. 22 illustrates certain nanofibers prepared by electrospinning a fluid stock comprising polymer and nanoparticles without a gas-assisted process described herein. FIG. 5 and FIG. 6 illustrate non-aggregation of nanoparticles within the matrix/backbone material, whereas FIG. 22 illustrates aggregation of nanoparticles within the matrix material.

In some embodiments, the domains are uniformly distributed and/or are non-aggregated within the nanofiber matrix. In some instances, the standard deviation of the distances between a given domain and the nearest domain to the given domain is about 50%, about 60%, about 70%, about 80%, about 100%, about 120%, about 140%, about 200%, and the like of the average of the distances (i.e., uniform distribution). In some instances, the standard deviation of the distances between a given domain and the nearest domain to the given domain is at most 50%, at most 60%, at most 70%, at most 80%, at most 100%, at most 120%, at most 140%, at most 200%, and the like of the average of the distances (i.e., uniform distribution).

In some embodiments, the domains (e.g., nanoparticles) are non-aggregated. In specific embodiments, less than 40% of the domains (e.g., nanoparticles) are aggregated (e.g., as measured in any suitable manner, such as by TEM). In specific embodiments, less than 30% of the domains are aggregated. In more specific embodiments, less than 25% of the domains are aggregated. In yet more specific embodiments, less than 20% of the domains are aggregated. In still more specific embodiments, less than 10% of the domains are aggregated. In more specific embodiments, less than 5% of the domains are aggregated.

The domains, nanostructures, or nanoparticles described herein have any suitable shape. In some embodiments, the domains comprise spheres, ovoids, ovals, cubes, cylinders, cones, layers, polyhedrons (e.g., a three dimensional geometry with any number of flat faces and straight edges), channels, geometric shapes, non-geometric shapes, or any combination thereof.

In some embodiments, the domains of high energy material have a uniform shapes (morphology), e.g., they are mostly all spheres, mostly all cubes, and the like. In some embodiments, substantially uniform shapes include at least 50%, at least 60%, at least 70%, at least 80%, at least 90%, at least 95%, or at least 99% of the pores are a given shape. In some instances, a domain deviates from an ideal sphere by a certain amount and still be considered a "sphere", for example. In some instances, the deviation is by as much as 1%, 5%, 10%, 20%, or 50% for example (e.g., the diameter of a spherical domain when measured in one direction may be 20% greater than the diameter of the domain when measured in a second direction and still be considered a "sphere"). In some embodiments, the domains comprise a plurality of shapes including without limitation a mixture of 2, 3, 4, or 5 shapes.

The high energy capacity material (e.g., domains of high energy capacity material) comprise any suitable volume of the nanofiber. In some instances, the domains comprise about 10%, about 20%, about 30%, about 40%, about 50%, about 60%, about 70%, about 80%, about 90%, and the like of the volume of the nanofiber. In some instances, the domains comprise at least 10%, at least 20%, at least 30%, at least 40%, at least 50%, at least 60%, at least 70%, at least 80%, at least 90%, and the like of the volume of the nanofiber. In some instances, the domains comprise at most 10%, at most 20%, at most 30%, at most 40%, at most 50%, at most 60%, at most 70%, at most 80%, at most 90%, and the like of the volume of the nanofiber.

The high energy capacity material (e.g., domains of high energy capacity material) comprise any suitable mass of the nanofiber. In some instances, the high energy capacity material constitutes about 10%, about 20%, about 30%, about 40%, about 50%, about 60%, about 70%, about 80%, about 90%, and the like of the mass of the nanofiber. In some instances, the high energy capacity material constitutes at least 10%, at least 20%, at least 30%, at least 40%, at least 50%, at least 60%, at least 70%, at least 80%, at least 90%, and the like of the mass of the nanofiber. In some instances, the domains comprise at most 10%, at most 20%, at most 30%, at most 40%, at most 50%, at most 60%, at most 70%, at most 80%, at most 90%, and the like of the mass of the nanofiber. In specific embodiments, e.g., wherein the nanofiber comprises a continuous matrix of a high-energy capacity material, the nanofiber comprises at least 65% by weight of the high-energy capacity material. In more specific embodiments, e.g., wherein the nanofiber comprises a continuous matrix of a high-energy capacity material, the nanofiber comprises at least 75% by weight of the high-energy capacity material. In still more specific embodiments, e.g., wherein the nanofiber comprises a continuous matrix of a high-energy capacity material, the nanofiber comprises at least 85% by weight of the high-energy capacity material. In yet specific embodiments, e.g., wherein the nanofiber comprises a continuous matrix of a high-energy capacity material, the nanofiber comprises at least 90% by weight of the high-energy capacity material. In specific embodiments, e.g., wherein the nanofiber comprises a continuous matrix of a high-energy capacity material, the nanofiber comprises at least 95% by weight of the high-energy capacity material. In specific embodiments, e.g., wherein the nanofiber comprises a continuous matrix of a high-energy capacity material, the nanofiber comprises at least 98% by weight of the high-energy capacity material. In some embodiments, e.g., wherein the nanofiber comprises a continuous matrix of a first material (e.g., carbon) and domains (e.g., discrete domain, such as non-aggregated nanoparticles) of high-energy capacity material, the nanofiber comprises at least 30% by weight of the high-energy capacity material. In specific embodiments wherein the nanofiber comprises a continuous matrix of a first material and domains of high-energy capacity material, the nanofiber comprises at least 50% by weight of the high-energy capacity material. In more specific embodiments wherein the nanofiber comprises a continuous matrix of a first material and domains of high-energy capacity material, the nanofiber comprises at least 60% by weight of the high-energy capacity material. In yet more specific embodiments wherein the nanofiber comprises a continuous matrix of a first material and domains of high-energy capacity material, the nanofiber comprises at least 70% by weight of the high-energy capacity material. In still more specific embodiments wherein the nanofiber comprises a continuous matrix of a first material and domains of high-energy capacity material, the nanofiber comprises at least 75% by weight of the high-energy capacity material. In more specific embodiments wherein the nanofiber comprises a continuous matrix of a first material and domains of high-energy capacity material, the nanofiber comprises at least 80% by weight of the high-energy capacity material. In specific embodiments wherein the nanofiber comprises a continuous matrix of a first material and domains of high-energy capacity material, the nanofiber comprises 70% to 90% by weight of the high-energy capacity material.

Figure 14:
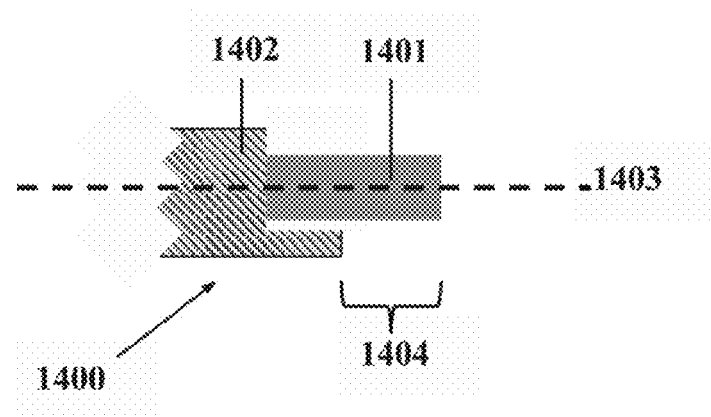
FIG. 14 illustrates co-axial electrospinning needle apparatus.

In some embodiments, gas assisted electrospinning processes or apparatus described herein providing or providing a device configured to provide a flow of gas along the same axis as an electrospun fluid stock. In some instances, that gas (or gas needle) is provided along the same axis with the fluid stock (or fluid stock needle) (e.g., and adjacent thereto). In specific instances, the gas (or gas needle) is provided coaxially with the fluid stock (or fluid stock needle). FIG. 14 illustrates co-axial electrospinning apparatus 1400. The coaxial needle apparatus comprises an inner needle 1401 and an outer needle 1402, both of which needles are coaxially aligned around a similar axis 1403 (e.g., aligned with 5 degrees, 3 degrees, 1 degree, or the like). In some embodiments, further coaxial needles may be optionally placed around, inside, or between the needles 1401 and 1402, which are aligned around the axis 1403. In some instances, the termination of the needles is optionally offset 1404.

In some embodiments provided herein is a process (e.g., using a needle as illustrated in FIG. 14) or product prepared by such a process, the process comprising gas assisted electrospinning a fluid stock to form nanofibers, the fluid stock comprising (i) a plurality of nanoparticles, and (ii) a polymer, the nanofibers comprising a continuous polymer matrix with non-aggregated nanoparticles embedded therein. In certain embodiments provided herein is a process (e.g., using a needle as illustrated in FIG. 14) or product prepared by such a process, the process comprising gas assisted electrospinning a fluid stock to form as-spun nanofibers, the fluid stock comprising (i) a plurality of nanoparticles, and (ii) a polymer, and (b) thermally treating the as-spun nanofibers to produce thermally treated nanofibers, the thermally treated nanofibers comprising a continuous matrix (e.g., carbon matrix if thermally treated in an inert environment with no metal precursor present; or a metal, metal oxide, or ceramic matrix if a suitable metal precursor is present in the fluid stock—particularly if this or an additional thermal treatment with air is utilized) with non-aggregated nanoparticles embedded therein. In specific embodiments, the gas assistance is coaxial gas assistance. In some embodiments, the nanoparticles are non-aggregated in the fluid stock. In certain instances, gas assistance of the electrospinning of a nano-particle containing fluid stock increases fluid throughput and reduces or prevents nanoparticle aggregation in the needle apparatus, thereby reducing or preventing nanoparticle aggregation in the as-spun fiber. In specific embodiments, the nanofibers comprises less than 50% of nanoparticles that are aggregated. In specific embodiments, the nanofibers comprises less than 40% of nanoparticles that are aggregated. In specific embodiments, the nanofibers comprises less than 25% of nanoparticles that are aggregated. In specific embodiments, the nanofibers comprises less than 10% of nanoparticles that are aggregated. In specific embodiments, the nanofibers comprises less than 5% of nanoparticles that are aggregated.

FIG. 58 (Panel A) illustrates a nanocomposite nanofiber 5800 comprising (i) a hollow core, (ii) discrete domains of high energy capacity material (e.g., silicon) 5801 in the sheath layer, and (ii) a continuous core matrix 5802 in the sheath layer. As illustrated in the cross-sectional view 5803, the discrete domains of high energy capacity material 5804 may penetrate into the core 5805 of the nanocomposite nanofiber. FIG. 58 (Panel B) illustrates a nanocomposite nanofiber 5806 comprising (i) discrete domains of high energy capacity material (e.g., silicon) 5807 in/on a (ii) a continuous core matrix 5808 layer. As illustrated in the cross-sectional view 5809, the discrete domains of high energy capacity material 5810 may penetrate into the core 5811 of the nanocomposite nanofiber. In some instances, the nanocomposite nanofibers comprise high energy capacity material on the surface of the nanofiber. And in some instances, the nanofibers comprise or further comprise discrete domains of high energy capacity material completely embedded within the core matrix material. In certain embodiments, the continuous matrix also forms a coating layer over the domains.

In some embodiments, a majority of the nanoparticles or discrete domains comprise a surface that is at least 50% coated with the matrix material (e.g., carbon). In specific embodiments, a majority of the nanoparticles or discrete domains comprise a surface that is at least 75% coated with the matrix material (e.g., carbon). In more specific embodiments, a majority of the nanoparticles or discrete domains comprise a surface that is at least 85% coated with the matrix material (e.g., carbon). In still more specific embodiments, a majority of the nanoparticles or discrete domains comprise a surface that is at least 90% coated with the matrix material (e.g., carbon). In yet more specific embodiments, a majority of the nanoparticles or discrete domains comprise a surface that is at least 95% coated with the matrix material (e.g., carbon). In some specific embodiments, at least 50%, at least 60%, at least 70%, at least 80%, at least 90%, or at least 95% of the nanoparticles or discrete domains comprise a surface that is at least 50%, at least 75%, at least 85%, at least 90%, or at least 95% coated with the matrix material (e.g., carbon).

In certain embodiments, continuous matrix materials of any nanocomposite nanofiber described herein is continuous over at least a portion of the length of the nanocomposite nanofiber. In some embodiments, the continuous matrix material runs along at least 10% the length of the nanofiber (e.g., on average for a plurality of nanofibers). In more specific embodiments, the continuous matrix material runs along at least 25% the length of the nanofiber (e.g., on average for a plurality of nanofibers). In still more specific embodiments, the continuous matrix runs along at least 50% the length of the nanofiber (e.g., on average for a plurality of nanofibers). In yet more specific embodiments, the continuous matrix runs along at least 75% the length of the nanofiber (e.g., on average for a plurality of nanofibers). In some embodiments, the continuous matrix is found along at least 50%, at least 60%, at least 70%, at least 80%, at least 90%, at least 95%, at least 98%, or at least 99% the length of the nanofiber (e.g., on average for a plurality of nanofibers). In some embodiments, the continuous matrix material runs along at least 1 micron of the length of the nanofiber (e.g., on average for a plurality of nanofibers). In more specific embodiments, the continuous matrix material runs along at least 10 microns of the length of the nanofiber (e.g., on average for a plurality of nanofibers). In still more specific embodiments, the continuous matrix runs along at least 100 microns of the length of the nanofiber (e.g., on average for a plurality of nanofibers). In yet more specific embodiments, the continuous matrix runs along at least 1 mm of the length of the nanofiber (e.g., on average for a plurality of nanofibers).

In some embodiments, a nanocomposite nanofiber provide herein comprises discrete domains within the nanocomposite nanofiber. In specific embodiments, the discrete domains comprise a silicon material. In other embodiments, the discrete domains comprise a tin material, or a germanium material. In yet other embodiments, the discrete domains comprise a lithium material. In certain embodiments, the discrete domains are non-aggregated. In some embodiments, the non-aggregated domains are dispersed, e.g., in a substantially uniform manner, along the length of the nanofiber.

In certain embodiments, the nanocomposite nanofibers provided herein do not comprise a concentration of domains in one segment (e.g., a 500 nm, 1 micron, 1.5 micron, 2 micron) that is over 10 times (e.g., 20 times, 30 times, 50 times, or the like) as concentrated as an immediately adjacent segment. In some embodiments, the segment size for such measurements is a defined length (e.g., 500 nm, 1 micron, 1.5 micron, 2 micron). In other embodiments, the segment size is a function of the average domain (e.g., particle) size (e.g., the segment 5 times, 10 times, 20 times, 100 times the average domain size). In some embodiments, the domains have a (average) size 1 nm to 1000 nm, 1 nm to 500 nm, 1 nm to 200 nm, 1 nm to 100 nm, 20 nm to 30 nm, 1 nm to 20 nm, 30 nm to 90 nm, 40 nm to 70 nm, 15 nm to 40 nm, or the like.

In some embodiments, the nanocomposite nanofibers comprise a plurality of segments (e.g., 0.5 micron, 1 micron, 1.5 micron, 2 micron, or the like) comprising discrete domains (e.g., nanoparticles) described herein, the plurality of segments having an average concentration of discrete domains therein (i.e., domains/particles per segment). In specific embodiments, a majority of the plurality of segments having a concentration of discrete domains within 80% of the average. In more specific embodiments, a majority of the plurality of segments having a concentration of discrete domains within 60% of the average. In yet more specific embodiments, a majority of the plurality of segments having a concentration of discrete domains within 50% of the average. In still more specific embodiments, a majority of the plurality of segments having a concentration of discrete domains within 40% of the average. In in more specific embodiments, a majority of the plurality of segments having a concentration of discrete domains within 30% of the average. In still more specific embodiments, a majority of the plurality of segments having a concentration of discrete domains within 20% of the average. In still more specific embodiments, at least 30%, at least 50%, at least 60%, at least 70%, at least 80%, or at least 90% of the plurality of segments having a concentration of discrete domains within 90%, 80%, 60%, 50%, 40%, 30%, or 20% of the average.

In some embodiments, the nanofibers comprise a hollow core. In some embodiments, the nanofibers comprise a core comprising a highly conductive material. In some embodiments, the highly conductive material is a metal.

Nanofiber Characteristics

The nanofibers have any suitable diameter. In some embodiments, a collection of nanofibers comprises nanofibers that have a distribution of fibers of various diameters. In some embodiments, a single nanofiber has a diameter that varies along its length. In some embodiments, fibers of a population of nanofibers or portions of a fiber accordingly exceed or fall short of the average diameter. In some embodiments, the nanofiber has on average a diameter of about 20 nm, about 30 nm, about 40 nm, about 50 nm, about 60 nm, about 70 nm, about 80 nm, about 90 nm, about 100 nm, about 130 nm, about 150 nm, about 200 nm, about 250 nm, about 300 nm, about 400 nm, about 500 nm, about 600 nm, about 700 nm, about 800 nm, about 900 nm, about 1,000 nm, about 1,500 nm, about 2,000 nm and the like. In some embodiments, the nanofiber has on average a diameter of at most 20 nm, at most 30 nm, at most 40 nm, at most 50 nm, at most 60 nm, at most 70 nm, at most 80 nm, at most 90 nm, at most 100 nm, at most 130 nm, at most 150 nm, at most 200 nm, at most 250 nm, at most 300 nm, at most 400 nm, at most 500 nm, at most 600 nm, at most 700 nm, at most 800 nm, at most 900 nm, at most 1,000 nm, at most 1,500 nm, at most 2,000 nm and the like. In some embodiments, the nanofiber has on average a diameter of at least 20 nm, at least 30 nm, at least 40 nm, at least 50 nm, at least 60 nm, at least 70 nm, at least 80 nm, at least 90 nm, at least 100 nm, at least 130 nm, at least 150 nm, at least 200 nm, at least 250 nm, at least 300 nm, at least 400 nm, at least 500 nm, at least 600 nm, at least 700 nm, at least 800 nm, at least 900 nm, at least 1,000 nm, at least 1,500 nm, at least 2,000 nm and the like. In yet other embodiments, the nanofiber has on average a diameter between about 50 nm and about 300 nm, between about 50 nm and about 150 nm, between about 100 nm and about 400 nm, between about 100 nm and about 200 nm, between about 500 nm and about 800 nm, between about 60 nm and about 900 nm, and the like.

Generally, the aspect ratio of a nanofiber is the length of a nanofiber divided by its diameter. In some embodiments, aspect ratio refers to a single nanofiber. In some embodiments, aspect ratio is applied to a plurality of nanofibers and reported as a single average value, the aspect ratio being the average length of the nanofibers of a sample divided by their average diameter. Diameters and/or lengths are measured by microscopy in some instances. The nanofibers have any suitable aspect ratio. In some embodiments the nanofiber has an aspect ratio of about 10, about $10^2$, about $10^3$, about $10^4$, about $10^5$, about $10^6$, about $10^7$, about $10^8$, about $10^9$, about $10^{10}$, about $10^{11}$, about $10^{12}$, and the like. In certain embodiments the nanofiber has an aspect ratio of at least 10, at least $10^2$, at least $10^3$, at least $10^4$, at least $10^5$, at least $10^6$, at least $10^7$, at least $10^8$, at least $10^9$, at least $10^{10}$, at least $10^{11}$, at least $10^{12}$, and the like. In other embodiments, the nanofiber is of substantially infinite length and has an aspect ratio of substantially infinity.

In some embodiments, the nanocomposite nanofiber is crosslinked. In specific instances, the second material (e.g., non-silicon containing second material) of the nanocomposite nanofiber provided herein is crosslinked with the second material of one or more adjacent nanofiber.

In some embodiments, nanofibers provided herein comprise (e.g., on average) at least 99%, at least 98%, at least 97%, at least 96%, at least 95%, at least 90%, at least 80%, or the like of metal, oxygen and carbon, when taken together, by mass (e.g., elemental mass). In specific embodiments, nanofibers (e.g., on average) provided herein comprise at least 99%, at least 98%, at least 97%, at least 96%, at least 95%, at least 90%, at least 80%, or the like of metal and oxygen, when taken together, by mass (e.g., elemental mass). In some embodiments, nanofibers provided herein comprise (e.g., on average) at least 99%, at least 98%, at least 97%, at least 96%, at least 95%, at least 90%, at least 80%, or the like of high energy capacity material, oxygen and carbon, when taken together, by mass (e.g., elemental mass). In specific embodiments, nanofibers (e.g., on average) provided herein comprise at least 99%, at least 98%, at least 97%, at least 96%, at least 95%, at least 90%, at least 80%, or the like of high energy capacity material and carbon, when taken together, by mass (e.g., elemental mass).

In some embodiments, nanofibers provided herein are porous. In some embodiments, the porous nanofibers comprise high energy capacity material. In some embodiments, the anode comprises porous nanofibers, the nanofibers comprising Si, Ge, Sn, Co, Cu, Fe, any oxidation state thereof, or any combination thereof. In some embodiments, the cathode comprises porous nanofibers, the nanofibers comprising a lithium-containing material described herein (e.g., comprising a continuous matrix of $LiCoO_2$, $LiCo_xNi_yMn_zO_2$, $LiMn_xNi_y Co_zV_aO_4$, $LiFe_xNi_y Co_zV_aPO_4$, any oxidation state thereof, or any combination thereof).

In some embodiments, the porous nanofibers comprise any one or more of: (a) a surface area of at least 10 it r h, wherein r is the radius of the nanofiber and h is the length of the nanofiber; (b) a specific surface area of at least 100 m$^2$/g; (c) a porosity of at least 20% and a length of at least 50 µm; (d) a porosity of at least 35%, wherein the nanofiber is substantially contiguous; (e) a porosity of at least 35%, wherein the nanofiber is substantially flexible or non-brittle; (f) a plurality of pores with an average diameter of at least 1 nm; (g) a plurality of pores, wherein the pores have a substantially uniform shape; (h) a plurality of pores, wherein the pores have a substantially uniform size; and (i) a plurality of pores, wherein the pores are distributed substantially uniformly throughout the nanofiber. In some embodiments, the nanofibers comprise mesoporous pores.

In various embodiments, nanofibers provided herein have a high surface area and methods are described for making nanofibers having a high surface area. In some instances, ordering of the pores results in a high surface area and/or specific surface area (e.g., surface area per mass of nanofiber and/or surface area per volume of nanofiber) in some instances. In some embodiments, the porous nanofibers have a specific surface area of about 50 m$^2$/g, about 100 m$^2$/g, about 200 m$^2$/g, about 500 m$^2$/g, about 1,000 m$^2$/g, about 2,000 m$^2$/g, about 5,000 m$^2$/g, about 10,000 m$^2$/g, and the like. In some embodiments, the porous nanofibers have a specific surface area of at least 10 m$^2$/g, at least 50 m$^2$/g, at least 100 m$^2$/g, at least 200 m$^2$/g, at least 500 m$^2$/g, at least 1,000 m$^2$/g, at least 2,000 m$^2$/g, at least 5,000 m$^2$/g, at least 10,000 m$^2$/g, and the like. In some embodiments, nanofibers that have a high surface area. The "specific surface area" is the surface area of at least one fiber divided by the mass of the at least one fiber. The specific surface area is calculated based on a single nanofiber, or based on a collection of nanofibers and reported as a single average value. Techniques for measuring mass are known to those skilled in the art. In some embodiments, the surface area is measured by physical or chemical methods, for example by the Brunauer-Emmett, and Teller (BET) method where the difference between physisorption and desorption of inert gas is utilized to determine the surface area or by titrating certain chemical groups on the nanofiber to estimate the number of groups on the surface, which is related to the surface area by a previously determined titration curve. Those skilled in the art of chemistry will be familiar with methods of titration.

In some embodiments, the porous nanofibers are cylindrical. Neglecting the area of the two circular ends of a cylinder, the area of the cylinder is estimated to be two times the mathematical constant pi (π) times the radius of the cross section of the cylinder (r) times the length of the nanofiber (h), (i.e., 2 π r h). In some embodiments, the surface area of the porous nanofiber is greater than 2 π r h. In some embodiments, the surface area of the porous nanofiber is about 4 π r h, about 10 π r h, about 20 π r h, about 50 π r h, about 100 n r h, and the like. In some embodiments, the surface area of the porous nanofiber is at least 4 π r h, at least 10 π r h, at least 20 π r h, at least 50 π r h, at least 100 π r h, and the like.

In one aspect, described herein are nanofibers having a high porosity. Also described herein are methods for making nanofibers with a high porosity. "Porosity" is used interchangeably with "void fraction" and is a measure of the porous spaces in a material. Porosity is the fraction of the sum total volume of the pores divided by the total volume. In some embodiments, the total volume used in the calculation of porosity is the volume occupied by a collection of porous nanofibers (e.g., fibers arranged as a filter mat). In some embodiments, the total volume used in the calculation of porosity is the volume defined by the outer perimeter of a porous nanofiber. For example, the total volume of a cylindrical nanofiber is estimated to be the mathematical constant pi (π) times the square of the radius of the cross section of the cylinder (r$^2$) times the length of the nanofiber (h), (i.e., π r$^2$ h). Porosity is represented as a percentage ranging from 0% to 100%.

The porosity of the nanofibers described herein is any suitable value. In some embodiments, the porosity is about 1%, about 5%, about 10%, about 20%, about 25%, about 30%, about 35%, about 40%, about 45%, about 50%, about 55%, about 60%, about 70%, about 80%, and the like. In some embodiments, the porosity is at least 1%, at least 5%, at least 10%, at least 20%, at least 25%, at least 30%, at least 35%, at least 40%, at least 45%, at least 50%, at least 55%, at least 60%, at least 70%, at least 80%, and the like.

Described herein are nanofibers and methods for making nanofibers that have a plurality of pores. The pores may be of any suitable size or shape. In some embodiments the pores are "mesopores", having a diameter of less than 100 nm (e.g., between 2 and 50 nm, on average). In some embodiments, the pores are "ordered", such as having a substantially uniform shape, a substantially uniform size and/or are distributed substantially uniformly through the nanofiber. In some embodiments, nanofibers described herein have a high surface area and/or specific surface area (e.g., surface area per mass of nanofiber and/or surface area per volume of nanofiber). In some embodiments, nanofibers described herein comprise ordered pores, e.g., providing substantially flexible and/or non-brittleness.

In one aspect, described herein is a method for producing an ordered mesoporous nanofiber, the method comprising: (a) coaxially electrospinning a first fluid stock with a second fluid stock to produce a first nanofiber, the first fluid stock comprising at least one block co-polymer and a silicon component (e.g., silicon precursor), the second fluid stock comprising a coating agent, and the first nanofiber comprising a first layer (e.g., core) and a second layer (e.g., coat) that at least partially coats the first layer; (b) annealing the first nanofiber; (c) optionally removing the second layer from the first nanofiber to produce a second nanofiber comprising the block co-polymer; and (d) selectively removing at least part of the block co-polymer from the first nanofiber or the second nanofiber (e.g. thereby producing an ordered mesoporous nanofiber). Additional coaxial layers are optional— e.g., comprising a precursor and block copolymer for an additional mesoporous layer, or a precursor and a polymer as described herein for a non-mesoporous layer.

In some embodiments, the block co-polymer comprises a polyisoprene (PI) block, a polylactic acid (PLA) block, a polyvinyl alcohol (PVA) block, a polyethylene oxide (PEO) block, a polyvinylpyrrolidone (PVP) block, polyacrylamide (PAA) block or any combination thereof (i.e., thermally or chemically degradable polymers). In some embodiments, the block co-polymer comprises a polystyrene (PS) block, a poly(methyl methacrylate) (PMMA) block, a polyacrylonitrile (PAN) block, or any combination thereof. In some embodiments, the coating layer and at least part of the block co-polymer (concurrently or sequentially) is selectively removed in any suitable manner, such as, by heating, by ozonolysis, by treating with an acid, by treating with a base, by treating with water, by combined assembly by soft and hard (CASH) chemistries, or any combination thereof. Additionally, U.S. Application Ser. No. 61/599,541 and International Application Ser. No. PCT/US13/26060, filed Feb. 14, 2013, is incorporated herein by reference for disclosures related to such techniques.

Batteries and Electrodes

In one aspect, the nanofiber has a high porosity and is long. Methods for measuring the length of a nanofiber include, but are not limited to microscopy, optionally transmission electron microscopy ("TEM") or scanning electron microscopy ("SEM"). The nanofiber has any suitable length. A given collection of nanofibers comprises nanofibers that have a distribution of fibers of various lengths. Therefore, certain fibers of a population accordingly exceed or fall short of the average length. In some embodiments, the nanofiber has an average length of about 20 µm, about 50 µm, about 100 µm, about 500 µm, about 1,000 µm, about 5,000 µm, about 10,000 µm, about 50,000 µm, about 100,000 µm, about 500,000 µm, and the like. In some embodiments, the nanofiber has an average length of at least about 10 µm, at least about 20 µm, at least about 50 µm, at least about 100 µm, at least about 500 µm, at least about 1,000 µm, at least about 5,000 µm, at least about 10,000 µm, at least about 50,000 µm, at least about 100,000 µm, at least about 500,000 µm, and the like. The nanofiber optionally has any of these (or other suitable) lengths in combination with any of the porosities described herein (e.g., 20%).

In one aspect, the nanofiber has a high porosity and is substantially contiguous. A nanofiber is substantially contiguous if when following along the length of the nanofiber, fiber material is in contact with at least some neighboring fiber material over substantially the entire nanofiber length. "Substantially" the entire length means that at least 80%, at least 90%, at least 95%, or at least 99% of the length of the nanofiber is contiguous. The nanofiber is optionally substantially contiguous in combination with any of the porosities described herein (e.g., 35%).

In one aspect, the nanofiber has a high porosity and is substantially flexible or non-brittle. Flexible nanofibers are able to deform when a stress is applied and optionally return to their original shape when the applied stress is removed. A substantially flexible nanofiber is able to deform by at least 5%, at least 10%, at least 20%, at least 50%, and the like in various embodiments. A non-brittle nanofiber does not break when a stress is applied. In some embodiments, the nanofiber bends (e.g., is substantially flexible) rather than breaks. A substantially non-brittle nanofiber is able to deform by at least 5%, at least 10%, at least 20%, at least 50%, and the like without breaking in various embodiments. The nanofiber is optionally substantially flexible or non-brittle in combination with any of the porosities described herein (e.g., 35%).

In some embodiments, described herein are nanofibers comprising ordered pores. In certain embodiments, ordered pores have a substantially uniform shape, a substantially uniform size, are distributed substantially uniformly in the nanofiber, or any combination thereof. In one aspect, ordered pores provide a nanofiber having a higher surface area, a more contiguous nanofiber, a more flexible nanofiber and/or less brittle nanofiber when compared with a nanofiber lacking pores, or lacking ordered pores.

The pores optionally have any suitable shape. Exemplary shapes include spheres, ovoids, ovals, cubes, cylinders, cones, polyhedrons (e.g., a three dimensional geometry with any number of flat faces and straight edges), layers, channels, geometric shapes, non-geometric shapes, or any combination thereof. In some embodiments, the pore(s) form a helical channel in a cylindrical nanofiber such that the nanofiber is a helical nanofiber. Additional exemplary shapes include axially aligned concentric cylinders and radially aligned stacked donuts.

Various shaped pores can have various "characteristic dimensions". For example, one characteristic dimension of a sphere is its diameter (i.e., any straight line segment that passes through the center of the spherical pore and whose endpoints are on the edges of the pore). Other characteristic dimensions of a sphere optionally include its radius, circumference, and the like.

Since nanofibers having pores of any shape and methods for making nanofibers with pores of any shape are described here, in some embodiments, the characteristic dimension are other than a diameter. Exemplary characteristic dimensions include the width, thickness, or length of the pore. In some embodiments, the characteristic distance is the longest distance passing through the center of the pore or the shortest distance passing through the center of the pore. The characteristic dimension is any suitable measurement represented in units of length.

In some embodiments, the pores have an average characteristic dimension of about 0.1 nm, about 0.5 nm, about 1 nm, about 2 nm, about 5 nm, about 10 nm, about 25 nm, about 50 nm, about 100 nm, about 200 nm, about 500 nm, and the like. In some embodiments, the pores have an average characteristic dimension of at least 0.1 nm, at least 0.5 nm, at least 1 nm, at least 2 nm, at least 5 nm, at least 10 nm, at least 25 nm, at least 50 nm, at least 100 nm, at least 200 nm, at least 500 nm, and the like. In some embodiments, the pores have an average characteristic dimension of at most 0.1 nm, at most 0.5 nm, at most 1 nm, at most 2 nm, at most 5 nm, at most 10 nm, at most 25 nm, at most 50 nm, at most 100 nm, at most 200 nm, at most 500 nm, and the like.

In some embodiments, the nanofibers have pores with a substantially uniform shape, e.g., they are mostly all spheres, mostly all cubes, and the like. In some embodiments, substantially uniform shapes include at least 50%, at least 60%, at least 70%, at least 80%, at least 90%, at least 95%, or at least 99% of the pores are a given shape. In some instances, a pore deviates from an ideal sphere by a certain amount and still be considered a "sphere", for example. The deviation may be by as much as 1%, 5%, 10%, 20%, or 50% for example (e.g., the diameter of a spherical pore when measured in one direction may be 20% greater than the diameter of the pore when measured in a second direction and still be considered a "sphere"). In some embodiments, the pores optionally have a plurality of shapes including without limitation a mixture of 2, 3, 4, or 5 shapes.

In some embodiments, the pores have a substantially uniform size. The plurality of pores have a characteristic dimension as described herein. In some embodiments, the pores are of a substantially uniform size when the standard deviation of the characteristic dimension is about 5%, about 10%, about 15%, about 20%, about 30%, about 50%, about 100%, and the like of the average value of the characteristic dimension. In some embodiments, the pores are of a substantially uniform size when the standard deviation of the characteristic dimension is at most 5%, at most 10%, at most 15%, at most 20%, at most 30%, at most 50%, at most 100%, and the like of the average value of the characteristic dimension. In some embodiments, the pores do not have a substantially uniform size.

In some embodiments, the pores are distributed substantially uniformly throughout the nanofiber. Each pore of the plurality of pores will be separated from its nearest neighboring pore by a certain distance (i.e., "separation distance"). The separation distance is optionally measured from the center of one pore to the center of the nearest pore, from the center of one pore to the nearest boundary edge of the nearest pore, from the edge of one pore to the nearest boundary edge of the nearest pore, and the like. A plurality of pores will have a plurality of these "separation distances". In some embodiments, the pores are distributed substantially uniformly throughout the nanofiber when the standard deviation of the separation distances is about 5%, about 10%, about 15%, about 20%, about 30%, about 50%, about 100%, and the like of the average separation distance. In some embodiments, the pores are distributed substantially uniformly throughout the nanofiber when the standard deviation of the separation distances is at most 5%, at most 10%, at most 15%, at most 20%, at most 30%, at most 50%, at most 100%, and the like of the average separation distance.

Process

In one aspect, described herein is a process for producing an electrode or nanofiber that comprises electrospinning a fluid stock to form nanofibers, the fluid stock comprising a high energy capacity material or precursor thereof and a polymer.

In one aspect, a process is described for producing nanofibers, such as high energy capacity nanofibers, lithium-containing nanofibers, high anodic energy capacity nanofibers, nanofibers with high lithium uptake capability, high performance separator nanofibers, and the like.

In some embodiments the process comprises: (a) electrospinning a fluid stock to form nanofibers, the fluid stock comprising (i) a metal precursor (e.g., lithium precursor, silicon precursor, tin precursor, germanium precursor, or the like) or nanostructures (e.g., nanoparticles) (e.g., comprising lithium metal oxide—for cathode nanofibers, silicon—for anode nanofibers, clay—for separator nanofibers, ceramic—for separator nanofibers, or the like) and (ii) a polymer; and (b) thermally treating the nanofibers. In some embodiments, electrospinning of the fluid stock is gas assisted (e.g., coaxially gas assisted). In further embodiments, a lithium ion battery electrode or separator is optionally formed using such nanofibers (or smaller nanofibers, such as fragments produced by sonication of the thermally treated nanofibers—any disclosure of nanofibers herein is intended to include such nanofibers as well).

In specific embodiments, a process for producing lithium containing nanofibers comprises (a) electrospinning a fluid stock to form as-spun nanofibers, the fluid stock comprising lithium precursor, a second metal precursor, and a polymer; and (b) thermally treating the as-spun nanofibers to produce the lithium containing nanofibers. In more specific embodiments, the process further comprises chemically treating (e.g., oxidizing, such as with air) the nanofibers. In certain embodiments, the chemical treatment occurs simultaneously with step (b). In other embodiments, the chemical treatment step occurs after step (b) (e.g., wherein step (b) occurs under inert conditions, such as under argon atmosphere). In certain embodiments, the electrospinning is gas assisted. In specific embodiments, the electrospinning is coaxially gas assisted. In some embodiments, the fluid stock is aqueous. In specific embodiments, the polymer is a water soluble polymer, such as polyvinyl alcohol (PVA).

In specific embodiments, a process for producing lithium containing nanofibers comprises (a) electrospinning a fluid stock to form as-spun nanofibers, the fluid stock comprising a plurality of nanoparticles and a polymer, the plurality of nanoparticles comprising a lithium material; and (b) thermally treating the as-spun nanofibers to produce the lithium containing nanofibers. In certain embodiments, the thermal treatment occurs under inert conditions (e.g., in an argon atmosphere). In certain embodiments, the electrospinning is gas assisted. In specific embodiments, the electrospinning is coaxially gas assisted. In some embodiments, the fluid stock is aqueous. In specific embodiments, the polymer is a water soluble polymer, such as polyvinyl alcohol (PVA). In other embodiments, fluid is a solvent based solution. In some embodiments, the polymer is a solvent soluble polymer, such as polyacrylonitrile (PAN).

In specific embodiments, a process for producing anodic nanofibers (e.g., lithium ion battery anodic nanofibers) comprises (a) electrospinning a fluid stock to form as-spun nanofibers, the fluid stock comprising high energy capacity precursor (e.g., a metal precursor of a high specific capacity (mAh/g) lithium ion battery anodic material) and polymer; and (b) thermally treating the as-spun nanofibers (e.g., to produce the anodic nanofibers or a precursor thereof—e.g., thermal treatment may produce $SiO_2$ nanofiber, which is a precursor to Si nanofiber). In more specific embodiments, the process further comprises chemically treating (e.g., reducing, such as with a reducing agent (e.g., $H_2$) or a sacrificial oxidizing agent) the nanofibers. In certain embodiments, the chemical treatment occurs simultaneously with step (b). In other embodiments, the chemical treatment step occurs after step (b). In certain embodiments, the electrospinning is gas assisted. In specific embodiments, the electrospinning is coaxially gas assisted. In some embodiments, the fluid stock is aqueous. In specific embodiments, the polymer is a water soluble polymer, such as polyvinyl alcohol (PVA).

In specific embodiments, a process for producing anodic nanofibers comprises (a) electrospinning a fluid stock to form as-spun nanofibers, the fluid stock comprising a plurality of nanoparticles and a polymer, the plurality of nanoparticles comprising a high energy capacity anodic material (e.g., a high specific capacity (mAh/g)—such as higher than carbon or greater than 500 mAh/g at 0.1 C—for example Si nanoparticles) (or a precursor thereof—e.g., $SiO_2$ as a precursor for Si); and (b) thermally treating the as-spun nanofibers (e.g., to produce the anodic containing nanofibers, or a precursor thereof). In certain embodiments, the thermal treatment occurs under inert conditions (e.g., in an argon atmosphere). In certain embodiments, the electrospinning is gas assisted. In specific embodiments, the electrospinning is coaxially gas assisted. In some embodiments, the fluid stock is aqueous. In specific embodiments, the polymer is a water soluble polymer, such as polyvinyl alcohol (PVA). In other embodiments, fluid is a solvent based solution. In some embodiments, the polymer is a solvent soluble polymer, such as polyacrylonitrile (PAN) (e.g., soluble in DMF).

In specific embodiments, a process for producing (e.g., polymer-clay or polymer-ceramic) nanocomposite nanofibers (e.g., for use as battery separators—such as lithium ion battery separators) comprises electrospinning a fluid stock to form as-spun nanofibers, the fluid stock comprising a plurality of nanostructures and a polymer, the plurality of nanostructures comprising a clay, a ceramic, or a combination thereof. In some embodiments, the process further comprises annealing the nanofibers. In certain embodiments, the thermal treatment occurs under inert conditions (e.g., in an argon atmosphere). In further or alternative embodiments, the process further comprise compressing the nanofibers (e.g., electrospinning or assembling a non-woven mat of nanofibers and subsequently compressing the non-woven mat). In certain embodiments, the electrospinning is gas assisted. In specific embodiments, the electrospinning is coaxially gas assisted. In other embodiments, fluid is a solvent based solution. In some embodiments, the polymer is a solvent soluble polymer, such as polyacrylonitrile (PAN) (e.g., soluble in DMF), or a polyolefin (e.g., polyethylene (PE) or polypropylene (PP)).

In some embodiments, the treatment process comprises (a) thermal treatment; (b) chemical treatment (also, if concurrent with a thermal treatment may be referred to herein as treating with a calcination reagent); or (c) a combination thereof. In specific embodiments, treatment of the as-spun nanocomposite nanofiber comprises thermally treating the as-spun nanocomposite nanofiber under oxidative conditions (e.g., air). In other specific embodiments, treatment of the as-spun nanocomposite nanofiber comprises thermally treating the as-spun nanocomposite nanofiber under inert conditions (e.g., argon). In still other specific embodiments, treatment of the as-spun nanocomposite nanofiber comprises thermally treating the as-spun nanocomposite nanofiber under reducing conditions (e.g., hydrogen, or a hydrogen/argon blend). In certain embodiments, the as-spun nanofiber is heated to a temperature of about 100° C. to about 2000° C., about 500 to 2000 C, at least 900° C., at least 1000° C., or the like. In specific embodiments, the as-spun nanofiber is heated to a temperature of about 1000° C. to about 1800° C., or about 1000° C. to about 1700° C. In specific embodiments, the thermal treatment step is at 600° C. to 1200° C. In more specific embodiments, the thermal treatment step is at 700° C. to 1100° C. In still more specific embodiments, the thermal treatment step is at 800° C. to 1000° C. (e.g., in an inert or reducing atmosphere).

In one aspect, the process has a high yield (e.g., which is desirable for embodiments in which the precursor is expensive). In some embodiments, the metal atoms in the nanofiber are about 3%, about 10%, about 20%, about 30%, about 33%, about 40%, about 50%, about 60%, about 70%, about 80%, about 90%, about 95%, about 98%, or about 100% of the number of (e.g., in moles) metal (i.e., silicon and other metal) molecules in the fluid stock.

In some embodiments, the fluid stock uniform or homogenous. In specific embodiments, the process described herein comprises maintaining fluid stock uniformity or homogeneity. In some embodiments, fluid stock uniformity and/or homogeneity is achieved or maintained by any suitable mechanism, e.g., by agitating, heating, or the like. Methods of agitating include, by way of non-limiting example, mixing, stirring, shaking, sonicating, or otherwise inputting energy to prevent or delay the formation of more than one phase in the fluid stock.

Any suitable method for electrospinning is used. For example, elevated temperature electrospinning is described in U.S. Pat. No. 7,326,043 filed on Oct. 18, 2004; U.S. patent application Ser. No. 13/036,441 filed on Feb. 28, 2011; and U.S. Pat. No. 7,901,610 filed on Jan. 10, 2008.

In some embodiments, the electrospinning step comprises co-axially electrospinning the fluid stock with a second fluid. Co-axial electrospinning is described in PCT Patent Application PCT/US11/24894 filed on Feb. 15, 2011.

In some embodiments, the second fluid is a gas (i.e., the electrospinning is gas assisted). Gas-assisted electrospinning is described in PCT Patent Application PCT/US11/24894 filed on Feb. 15, 2011, which is incorporated herein for such disclosure. Briefly, gas-assisted electrospinning comprises expelling a stream of gas at high velocity along with the fluid stock (e.g., as a stream inside the fluid stock or surrounding the fluid stock), which can increase the through-put of an electrospinning process. In some embodiments, the fluid stock surrounds the gas stream. In some embodiments, the nanofibers comprise a hollow core (e.g., when electrospun with an inner gas stream).

In some embodiments, the nanofibers are porous. Without limitation, porous nanofibers have a high surface area, which increases the rate of intercalation and deintercalation of lithium ions. Methods for producing ordered porous nanofibers are described in U.S. Provisional Patent Application No. 61/599,541 filed on Feb. 16, 2012. As described therein, co-axially electrospinning a fluid stock comprising a block co-polymer surrounded by a coating, then annealing to allow the blocks of the block co-polymer to assembled ordered phase elements, followed by selective removal of at least one of the phases produces ordered porous nanofibers. As described herein, in some embodiments, the second fluid comprises a coating agent, wherein the second fluid surrounds the fluid stock (i.e., forming a coated nanofiber, for example that retains its morphology when heated to assemble the blocks of a block co-polymer into ordered phase elements).

In some embodiments, the nanofibers comprise a core material. In some embodiments, the core material is highly conductive. In some embodiments, the highly conductive material is a metal. In one aspect, described herein are methods for producing nanofibers, the nanofibers comprising a core material, optionally a highly conductive core material, optionally a metal core. In some embodiments, the second fluid comprises a material having a high electrical conductivity, wherein the polymer solution surrounds the second fluid (i.e., forming a nanofiber having a highly conductive core). Any method for producing a nanofiber having a highly conductive core is suitable.

Fluid Stocks

In various embodiments described herein nanofibers (e.g., for use as various components in batteries) are prepared according to processes described herein and using fluid stocks provided herein. In some embodiments, the fluid stock is well mixed. In some embodiments, nanofiber precursor molecules are distributed evenly on the polymer in the fluid stock.

In certain embodiments, fluid stocks provided for various processes described herein comprise a polymer. In specific embodiments, the polymer is a polymer that it suitable for electrospinning (e.g., as a melt, an aqueous solution, or a solvent solution). In some embodiments, the fluid stock further comprises an additional component, such as a metal precursor and/or a metal (including silicon), metal oxide (including lithium metal oxide), ceramic, or clay (such as a nanoparticle or nanostructure—which terms are used interchangeably herein—thereof).

In some embodiments, the fluid stock comprises an aqueous medium (e.g., water or an aqueous mixture, such as water/alcohol, water/acetic acid, or the like). In other embodiments, the fluid stock comprises a solvent (e.g., DMF). In still other embodiments, the fluid stock comprises melted polymer (without water or non-aqueous solvent).

In some embodiments, a polymer in a process, fluid stock or nanofiber described herein is an organic polymer. In some embodiments, polymers used in the compositions and processes described herein are hydrophilic polymers, including water-soluble and water swellable polymers. In some aspects, the polymer is soluble in water, meaning that it forms a solution in water. In other embodiments, the polymer is swellable in water, meaning that upon addition of water to the polymer the polymer increases its volume up to a limit. Exemplary polymers suitable for the present methods include but are not limited to polyvinyl alcohol ("PVA"), polyvinyl acetate ("PVAc"), polyethylene oxide ("PEO"), polyvinyl ether, polyvinyl pyrrolidone, polyglycolic acid, hydroxyethylcellulose ("HEC"), ethylcellulose, cellulose ethers, polyacrylic acid, polyisocyanate, and the like. In some embodiments, the polymer is isolated from biological material. In some embodiments, the polymer is starch, chitosan, xanthan, agar, guar gum, and the like. In other instances, e.g., wherein silicon nanoparticles are utilized as the silicon component, other polymers, such as polyacrylonitrile ("PAN") are optionally utilized (e.g., with DMF as a solvent). In other instances, a polyacrylate (e.g., polyalkacrylate, polyacrylic acid, polyalkylalkacrylate, such as poly(methyl methacrylate) (PMMA), or the like), or polycarbonate is optionally utilized. In some instances, the polymer is polyacrylonitrile (PAN), polyvinyl alcohol (PVA), a polyethylene oxide (PEO), polyvinylpyridine, polyisoprene (PI), polyimide, polylactic acid (PLA), a polyalkylene oxide, polypropylene oxide (PPO), polystyrene (PS), a polyarylvinyl, a polyheteroarylvinyl, a nylon, a polyacrylate (e.g., poly acrylic acid, polyalkylalkacrylate— such as polymethylmethacrylate (PMMA), polyalkylacrylate, polyalkacrylate), polyacrylamide, polyvinylpyrrolidone (PVP) block, polyacrylonitrile (PAN), polyglycolic acid, hydroxyethylcellulose (HEC), ethylcellulose, cellulose ethers, polyacrylic acid, polyisocyanate, or a combination thereof.

In some embodiments, a polymer described herein (e.g., in a process, precursor nanofiber, a fluid stock, or the like) is a polymer (e.g., homopolymer or copolymer) comprising a plurality of reactive sites. In certain embodiments, the reactive sites are nucleophilic (i.e., a nucleophilic polymer) or electrophilic (i.e., an electrophilic polymer). For example, in some embodiments, a nucleophilic polymer described herein comprises a plurality of alcohol groups (such as polyvinyl alcohol—PVA—or a cellulose), ether groups (such as polyethylene oxide—PEO—or polyvinyl ether—PVE), and/or amine groups (such as polyvinyl pyridine, ((di/mono)alkylamino)alkyl alkacrylate, or the like).

In certain embodiments, the polymer is a nucleophilic polymer (e.g., a polymer comprising alcohol groups, such as PVA). In some embodiments, the polymer is a nucleophilic polymer and a silicon and/or optional metal precursor is an electrophilic precursor (e.g., a metal acetate, metal chloride, or the like). In specific embodiments, the nucleophilic polymer and the precursor form a precursor-polymer association in the fluid stock and/or the as-spun nanocomposite nanofiber and that association is a reaction product between a nucleophilic polymer and electrophilic precursor(s).

In other embodiments, the polymer is an electrophilic polymer (e.g., a polymer comprising chloride or bromide groups, such as polyvinyl chloride). In some embodiments, the polymer is an electrophilic polymer and a precursor (e.g., silicon and/or optional metal precursor) is a nucleophilic precursor (e.g., metal-ligand complex comprising "ligands" with nucleophilic groups, such as alcohols or amines). In specific embodiments, the nucleophilic polymer and the precursor form a precursor-polymer association in the fluid stock and/or the as-spun nanocomposite nanofiber and that association is a reaction product between an electrophilic polymer and a nucleophilic first precursor.

For the purposes of this disclosure metal precursors include both preformed metal-ligand associations (e.g., salts, metal-complexes, or the like) (e.g., reagent precursors, such as metal acetates, metal halides, or the like) and/or metal-polymer associations (e.g., as formed following combination of reagent precursor with polymer in an aqueous fluid).

Polymers of any suitable molecular weight may be utilized in the processes and nanofibers described herein. In some instances, a suitable polymer molecular weight is a molecular weight that is suitable for electrospinning the polymer as a melt or solution (e.g., aqueous solution or solvent solution—such as in dimethyl formamide (DMF) or alcohol). In some embodiments, the polymer utilized has an average atomic mass of 1 kDa to 1,000 kDa (or more). In specific embodiments, the polymer utilized has an average atomic mass of 10 kDa to 500 kDa. In more specific embodiments, the polymer utilized has an average atomic mass of 10 kDa to 250 kDa. In still more specific embodiments, the polymer utilized has an average atomic mass of 50 kDa to 200 kDa.

In some embodiments, metal precursor comprise alkali metal salts or complexes, alkaline earth metal salts or complexes, transition metal salts or complexes, or the like. In specific embodiments, the metal precursor comprises lithium precursor, silicon precursor, iron precursor, a nickel precursor, a cobalt precursor, a manganese precursor, a vanadium precursor, a titanium precursor, a ruthenium precursor, a rhenium precursor, a platinum precursor, a bismuth precursor, a lead precursor, a copper precursor, an aluminum precursor, a combination thereof, or the like. In specific embodiments, the optional or additional metal precursor comprises a molybdenum precursor, niobium precursor, tantalum precursor, tungsten precursor, iron precursor, nickel precursor, copper precursor, cobalt precursor, manganese precursor, titanium precursor, vanadium precursor, chromium precursor, zirconium precursor, yttrium precursor, germanium precursor, tin precursor, or a combination thereof. In specific embodiments, metal (silicon, lithium, and other metals) precursors include metal salts or complexes, wherein the metal is associated with any suitable ligand or radical, or anion or other Lewis Base, e.g., a carboxylate (e.g., —$OCOCH_3$ or another —OCOR group, wherein R is an alkyl, substituted alkyl, aryl, substituted aryl, or the like, such as acetate), an alkoxide (e.g., a methoxide, ethoxide, isopropyl oxide, t-butyl oxide, or the like), a halide (e.g., chloride, bromide, or the like), a diketone (e.g., acetylacetone, hexafluoroacetylacetone, or the like), a nitrates, amines (e.g., $NR'_3$, wherein each R" is independently R or H or two R", taken together form a heterocycle or heteroaryl), and combinations thereof.

In specific embodiments, (e.g., for the preparation of a cathode material) the fluid stock comprises a lithium precursor and at least one additional metal precursor, wherein the metal precursor comprises an iron precursor, a nickel precursor, a cobalt precursor, a manganese precursor, a vanadium precursor, a titanium precursor, a ruthenium precursor, a rhenium precursor, a platinum precursor, a bismuth precursor, a lead precursor, a copper precursor, an aluminum precursor, a combination thereof, or the like. In more specific embodiments, the additional metal precursor comprises an iron precursor, a nickel precursor, a cobalt precursor, a manganese precursor, a vanadium precursor, an aluminum precursor, or a combination thereof. In still more specific embodiments, the additional metal precursor comprises an iron precursor, a nickel precursor, a cobalt precursor, a manganese precursor, an aluminum precursor, or a combination thereof. In yet more specific embodiments, the additional metal precursor comprises a nickel precursor, a cobalt precursor, a manganese precursor, or a combination thereof. In still more specific embodiments, the additional metal precursor comprises at least two metal precursors from the group consisting of: a nickel precursor, a cobalt precursor, and a manganese precursor. In more specific embodiments, the additional metal precursor comprises a nickel precursor, a cobalt precursor, and a manganese precursor.

In some embodiments, (e.g., where metal precursors are utilized, such as a silicon or lithium precursor and one or more additional metal precursor) the weight ratio of the metal component(s) (including silicon or lithium and other metal components, such as silicon and metal precursors) to polymer is at least 1:5, at least 1:4, at least 1:3, at least 1:2, at least 1:1, at least 1.25:1, at least 1.5:1, at least 1.75:1, at least 2:1, at least 3:1, or at least 4:1. In some instances, wherein the metal, silicon, clay or ceramic component of a process, nanofiber, fluid stock, or battery component described herein is a nanostructure or nanoparticle, the component to polymer weight ratio is at least 1:5, at least 1:4, at least 1:3, at least 1:2, or the like. In some instances, wherein the metal or silicon component of a process described herein is a metal (including silicon) precursor, the silicon component to polymer ratio is at least 1:3, at least 1:2, at least 1:1, or the like. In some embodiments, the monomeric residue (i.e., repeat unit) concentration of the polymer in the fluid stock is at least 100 mM. In specific embodiments, the monomeric residue (i.e., repeat unit) concentration of the polymer in the fluid stock is at least 200 mM. In more specific embodiments, the monomeric residue (i.e., repeat unit) concentration of the polymer in the fluid stock is at least 400 mM. In still more specific embodiments, the monomeric residue (i.e., repeat unit) concentration of the polymer in the fluid stock is at least 500 mM. In some embodiments, the fluid stock comprises at least about 0.5 weight %, at least about 1 weight %, at least about 2 weight %, at least about 5 weight %, at least about 10 weight %, at least about 20 weight %, or at least 30 weight % polymer.

In some embodiments, the polymers described herein (e.g., hydrophilic or nucleophilic polymers) associate (e.g., through ionic, covalent, metal complex interactions) with metal precursors described herein when combined in a fluid stock. Thus, in certain embodiments, provided herein is a fluid stock that comprises (a) at least one polymer; (b) a metal precursor (e.g., a metal acetate or metal alkoxide), or is prepared by combining (i) at least one polymer; (ii) a metal precursor. In certain embodiments, upon electrospinning of such a fluid stock, a nanofiber comprising a polymer associated with the metal precursors is produced. For example, provided in specific embodiments herein is a fluid stock comprising PVA in association with a lithium precursor and at least one additional metal precursor. In some embodiments, this association is present in a fluid stock or in a nanofiber. In specific embodiments, the association having the formula: —(CH$_2$—CHOM$^1$)$_{n1}$-. In specific embodiments, each M is independently selected from H, a metal ion, and a metal complex (e.g., a metal halide, a metal carboxylate, a metal alkoxide, a metal diketone, a metal nitrate, a metal amine, or the like).

In further embodiments, provided herein is a polymer (e.g., in a fluid stock or nanofiber) having the following formula: $(A_dR^1{}_n$—$BR^1{}_mR^2)_a$. In some embodiments, each of A and B are independently selected from C, O, N, or S. In certain embodiments, at least one of A or B is C. In some embodiments, each R$^1$ is independently selected from H, halo, CN, OH, NO$_2$, NH$_2$, NH(alkyl) or N(alkyl)(alkyl), SO$_2$alkyl, CO$_2$-alkyl, alkyl, heteroalkyl, alkoxy, S-alkyl, cycloalkyl, heterocycle, aryl, or heteroaryl. In certain embodiments, the alkyl, alkoxy, S-alkyl, cycloalkyl, heterocycle, aryl, or heteroaryl is substituted or unsubstituted. In some embodiments, R$^2$ is M$^1$, OM$^1$, NHM$^1$, or SM$^1$, as described above. In specific embodiments, if R$^1$ or R$^2$ is M$^1$, the A or B to which it is attached is not C. In some embodiments, any alkyl described herein is a lower alkyl, such as a C$_1$-C$_6$ or C$_1$-C$_3$ alkyl. In certain embodiments, each R$^1$ or R$^2$ is the same or different. In certain embodiments, d is 1-10, e.g., 1-2. In certain embodiments, n is 0-3 (e.g., 1-2) and m is 0-2 (e.g., 0-1). In some embodiments, a is 100-1,000,000. In specific embodiments, a substituted group is optionally substituted with one or more of H, halo, CN, OH, NO$_2$, NH$_2$, NH(alkyl) or N(alkyl)(alkyl), SO$_2$alkyl, CO$_2$-alkyl, alkyl, heteroalkyl, alkoxy, S-alkyl, cycloalkyl, heterocycle, aryl, or heteroaryl. In certain embodiments, the block co-polymer is terminated with any suitable radical, e.g., H, OH, or the like.

In specific embodiments, at least 5% of M$^1$ are Li$^+$. In more specific embodiments, at least 10% of M$^1$ are Li$^+$. In more specific embodiments, at least 15% of M$^1$ are Li$^+$. In still more specific embodiments, at least 20% of M$^1$ are Li$^+$. In more specific embodiments, at least 40% of M$^1$ are Li$^+$. In further embodiments, at least 10% of M$^1$ are a non-lithium metal complex (e.g., iron acetate, cobalt acetate, manganese acetate, nickel acetate, aluminum acetate, or a combination thereof). In more specific embodiments, at least 15% of M$^1$ are non-lithium metal complex. In still more specific embodiments, at least 20% of M$^1$ are non-lithium metal complex. In more specific embodiments, at least 40% of M$^1$ are non-lithium metal complex. In various embodiments, n1 is any suitable number, such as 1,000 to 1,000,000.

In some embodiments, the polymer is suitable for electrospinning. In some embodiments, the polymer is water soluble. In some embodiments, the polymer is polyvinyl alcohol (PVA), polyacrylonitrile (PAN), polyethylene oxide (PEO), polyvinyl pyrrolidone (PVP), poly(phenylene oxide) (PPO), polystyrene (PS), poly(methyl methacrylate) (PMMA), polycarbonate (PC), cellulose, or any combination thereof.

In some embodiments, the polymer is a block co-polymer. Without limitation, use of block co-polymers to produce porous nanofibers is described in U.S. Provisional Patent Application No. 61/599,541 filed on Feb. 16, 2012. As described therein, co-axially electrospinning a fluid stock comprising a block co-polymer surrounded by a coating, then annealing to allow the blocks of the block co-polymer to assembled ordered phase elements, followed by selective removal of at least one of the phases produces ordered porous nanofibers.

In some embodiments, the polymer is a co-polymer (i.e., is a polymer derived from two or more monomeric species, as opposed to a homopolymer where only one monomer is used). Co-polymers comprising incompatible monomer species (i.e., immiscible in each other) microphase separate to form periodic nanostructures (i.e., phase elements) in some embodiments. Generally, microphase separation is understood to be distinct from phase separation (e.g., phase separation of oil and water) because the incompatible monomers are covalently bound to each other in the co-polymer and therefore cannot macroscopically de-mix. In contrast to macroscopic de-mixing, the monomers form small structures (i.e., phase elements).

In some embodiments, the co-polymer is a graft co-polymer. Graft co-polymers are a type of branched co-polymer where the side chains are structurally distinct from the main chain. In some embodiments, the main chain is a homo-polymer or a co-polymer. The side chain(s) are homo-polymer(s) or co-polymer(s). Any arrangement of main chain(s) and side chain(s) is suitable for forming ordered phase elements and/or nanofibers having ordered pores.

Another suitable type of co-polymer is a "block co-polymer". Block co-polymers are made up of blocks of different polymerized monomers. For example, PS-b-PMMA is short for polystyrene-b-poly(methyl methacrylate) and is usually made by first polymerizing styrene, and then subsequently polymerizing MMA from the reactive end of the polystyrene chains. This polymer is a "diblock copolymer" because it contains two different chemical blocks. Triblocks, tetrablocks, multiblocks, etc. are also suitable. Diblock co-polymers can be made using living polymerization techniques, such as atom transfer free radical polymerization (ATRP), reversible addition fragmentation chain transfer (RAFT), ring-opening metathesis polymerization (ROMP), and living cationic or living anionic polymerizations for example. Another suitable technique is chain shuttling polymerization. Another strategy for preparing block co-polymers is the chemoselective stepwise coupling between polymeric precursors and heterofunctional linking agents. In some instances, this method is used to produce more complex structures such as tetrablock quarterpolymers for example. Any suitable method for producing block co-polymers is used to produce the ordered porous nanofibers described herein.

In some embodiments, the block co-polymer comprises at least two types of monomeric species designated "A" and "B". In some embodiments, the blocks of the block co-polymer have a particular size (e.g., number of polymerized "A" monomers per block of "A" and/or number of polymerized "B" monomers per block of "B"). The "A" block and/or "B" block can have a distribution of sizes, or can be monodisperse (i.e., all "A" blocks have 20 polymerized "A" monomers within a suitably low standard deviation (e.g., 5%, 10%, 20% or 50%)).

In some embodiments, the block co-polymer comprises 3 types of monomeric species designated "A", "B" and "C". For example the PI and PLA blocks of a PS-b-PI-b-PLA tri-block co-polymer are removed, resulting in a nanofiber that is about 70% porous. In some embodiments, greater numbers of monomeric species are used to incorporate various materials (i.e., hybrid nanofibers) and/or create more complex structures.

Depending on the relative size of each block, several morphologies are obtained. In diblock copolymers, sufficiently different block lengths lead to nanometer-sized spheres of one block in a matrix of the second (for example PMMA in polystyrene). Using less different block lengths, a "hexagonally packed cylinder" geometry is obtained. In some embodiments, blocks of similar length form layers (i.e., lamellar phase). In some embodiments, a gyroid phase forms at block lengths intermediate between the cylindrical and lamellar phase. The sizes of the blocks of the block co-polymer are varied in any suitable manner to form phase elements and/or nanofiber pores having a desired geometry. In some embodiments, the block co-polymer is amphiphilic (e.g., has at least one hydrophobic block and at least one hydrophilic block).

In one aspect, the method comprises selectively removing at least part of the block co-polymer from the nanofiber (e.g., thereby producing an ordered mesoporous nanofiber). In some embodiments, selectively removing at least part of the block co-polymer comprises selectively degrading and/or removing one block of the block co-polymer. In some embodiments, the block co-polymer comprises a degradable block and/or a removable block. For example, the degradable block is chemically degradable, thermally degradable, or any combination thereof. Examples of thermally or chemically degradable blocks include polyimide (PI), polylactic acid (PLA), polyvinyl alcohol (PVA), polyethylene oxide (PEO), polyvinylpyrrolidone (PVP), and polyacrylamide (PAA).

In some embodiments, the block co-polymer further comprises a block that does not degrade under conditions suitable for degrading and/or removing the degradable and/or removable block. In some embodiments, the block co-polymer comprises a thermally stable block and/or a chemically stable block. Examples of thermally or chemically stable blocks include polystyrene (PS), poly(methyl methacrylate) (PMMA), and polyacrylonitrile (PAN).

Exemplary block co-polymers suitable for use in the methods described herein comprise PI-b-PS, PS-b-PLA, PMMA-b-PLA, PI-b-PEO, PAN-b-PEO, PVA-b-PS, PEO-b-PPO-PEO, PPO-b-PEO-PPO, or any combination thereof. The notation "-b-" indicates that the polymer is a block co-polymer comprising the indicated blocks before and after the "-b-".

High Energy Capacity Material

In one aspect, described herein are lithium-ion batteries comprising an electrode and methods for making a lithium ion battery comprising an electrode. In some embodiments, the electrode comprises a plurality of nanofibers, the nanofibers comprising domains of a high energy capacity material. In some embodiments, the electrode comprises porous nanofibers, the nanofibers comprising a high energy capacity material.

In another aspect, described herein is a method is described for producing an electrode. In some embodiments the method comprises electrospinning a fluid stock to form nanofibers, the fluid stock comprising a high energy capacity material or precursor thereof and a polymer. In another aspect, a method is described comprising adding high energy capacity (e.g., nanoparticles) to nanofibers.

In some embodiments, the high energy capacity material is any material capable of intercalating and deintercalating lithium ions. The high energy capacity material is in any suitable form in the electrodes and methods described herein. In some embodiments, the high energy capacity material comprises a powder or granules. In some embodiments, the high energy capacity material comprises nanoparticles of the high energy capacity material. In some embodiments, the nanoparticles comprise Si, Ge, Sn, Ni, Co, Cu, Fe, any oxidation state thereof, or any combination thereof.

In some embodiments, the fluid stock comprises a high energy capacity material (e.g., in the form of a nanoparticle), or a precursor thereof. In some embodiments, the high energy capacity material is a metal. In some embodiments, the precursor of the high energy capacity material are metal acetates, metal nitrates, metal acetylacetonates, metal chlorides, metal hydrides, hydrates thereof, or any combination thereof.

In some embodiments, the high energy capacity material is a ceramic (e.g., $Al_2O_3$, $ZrO_2$, $TiO_2$), Si (e.g., amorphous silicon), Ge, Sn, metal (e.g., Fe, Cu, Co, Ag, Ni, Au), any oxidation state thereof, or any combination thereof. In some embodiments, the high energy capacity material comprises Si, Ge, Sn, Fe, Co, Cu, Ni, $LiCo_xNi_yMn_zO_2$, $LiMn_xNi_y$ $Co_zV_aO_4$, S, sulfur encapsulated in carbon, $Li_2S$, $Fe_xNi_y$ $Co_zV_aPO_4$, $LiFe_xNi_y$ $Co_zV_aPO_4$, any oxidation state thereof, or any combination thereof. Here, the subscript variables (e.g., x, y, z, a) are any suitable integer or fraction.

Chemical Treatment/Thermal Treatment/Annealing

In one aspect, a method is described for producing an electrode. In some embodiments the method comprises: (a) electrospinning a fluid stock to form nanofibers, the fluid stock comprising a high energy capacity material or precursor thereof and a polymer; (b) heating the nanofibers; and (c) assembling the nanofibers into an electrode.

The heating step performs any suitable function. In some embodiments, the heating step carbonizes the polymer. In some embodiments, the heating step removes the polymer. In some embodiments, the heating step selectively removes a polymer phase. In some embodiments, removing (e.g., selectively) the polymer and/or polymer phase results in porous nanofibers. In some embodiments, the heating step crystallizes the precursors and/or nanoparticles (e.g., producing domains of high energy capacity material). In some embodiments, the heating step determines the oxidation state of the high energy capacity material, precursors thereof and/or nanoparticles thereof, or any combination thereof.

In some embodiments, the nanofibers are heated in the presence of air, nitrogen, nitrogen/$H_2$ (e.g., 95%/5%), argon, argon/$H_2$ (e.g., 96%/4%), or any combination thereof.

In some embodiments, heating removes the polymer from the electrospun fluid stock. In some embodiments, the polymer is removed by chemical means, including solubilizing the polymer, chemically degrading the polymer, and the like. The polymer is degraded in a strong acid or base for example.

In some embodiments, the heating converts the precursors to a nanofiber. The conversion of precursors to nanofiber occurs simultaneously with the removal of the polymer, or optionally occurs at different times.

In some embodiments, the heating is performed in a gaseous environment. If one does not want certain reactions such as oxidation reactions to proceed in the calcination step, one chooses an inert environment consisting of non-reactive gases in some embodiments. The noble gases are particularly unreactive, so are suitable. The noble gases include helium (He), neon (Ne), argon (Ar), krypton (Kr), xenon (Xe), radon (Rn), or mixtures thereof. While not a noble gas, another inert gas suitable for the present invention is nitrogen ($N_2$) gas, which constitutes the majority of our atmosphere and is generally non-reactive.

Alternatively, in some instances certain chemical reactions occur upon heating, optionally oxidation reactions. Oxidation converts metal precursors to metal oxide or ceramic nanofibers for example. Oxidative conditions are performed in an oxygen-rich environment, such as air. In one particular example where the nanofiber is a ceramic nanofiber, calcination is performed in air at about 600° C. for about 2 hours.

Reduction is the gain of electrons, which is the opposite reaction from oxidation. In some instances, such as in the production of pure metal nanofibers, reducing environments are employed. In this case, the reductive environment prevents the conversion of metal precursors to metal oxides. A mixture of inert gas and hydrogen gas ($H_2$) is one example of a reductive environment. The strength of the reductive environment is varied by blending with an inert gas in some embodiments. The present disclosure encompasses hydrogen-nitrogen mixtures and the like. Another reductive environment is any environment in which oxidation is prevented, such as an environment substantially devoid of oxygen. In some embodiments, the heating is performed under vacuum.

In one particular instance, heating is performed under a mixture of argon and hydrogen at about 800° C. for about 2 hours to produce a metal nanofiber.

In some instances, heating is performed in a liquid environment. The liquid environment is aqueous in some instances. In other instances heating is performed in a different solvent than water, such as an organic solvent. Oxidative, reductive, or inert conditions are created in liquid environments. An exemplary liquid-based reducing environment is a solution of NaOH or $NaBH_4$. An exemplary oxidizing solution comprises hydrogen peroxide $H_2O_2$.

Heating is performed at any suitable temperature or time. Higher temperature heating generally produce nanofibers of a smaller diameter. Without being bound by theory, the temperature and/or duration of heating governs the size and type of crystals in the nanofiber. Low temperature and/or short time generates small crystal domains in amorphous metal or metal oxides, while high temperature calcination generally leads to nanofibers with pure metal or pure metal oxide crystals. Without being bound by theory, crystal size is thought to govern properties such as electric conductivity or magnetic properties. In general, low temperature heating of magnetically active metal or metal oxides generates superparamagnetic nanofibers. In general, high temperature heating produces metal nanofibers with increased electric conductivity.

In some embodiments, heating is performed at about 100° C., about 150° C., about 200° C., about 300° C., about 400° C., about 500° C., about 600° C., about 700° C., about 800° C., about 900° C., about 1,000° C., about 1,500° C., about 2,000° C., and the like. In some embodiments, heating is performed at a temperature of at least 100° C., at least 150° C., at least 200° C., at least 300° C., at least 400° C., at least 500° C., at least 600° C., at least 700° C., at least 800° C., at least 900° C., at least 1,000° C., at least 1,500° C., at least 2,000° C., and the like. In some embodiments, heating is performed at a temperature of at most 100° C., at most 150° C., at most 200° C., at most 300° C., at most 400° C., at most 500° C., at most 600° C., at most 700° C., at most 800° C., at most 900° C., at most 1,000° C., at most 1,500° C., at most 2,000° C., and the like. In some embodiments, heating is performed at a temperature of between about 300° C. and 800° C., between about 400° C. and 700° C., between about 500° C. and 900° C., between about 700° C. and 900° C., between about 800° C. and 1,200° C., and the like.

Heating is performed at a constant temperature, or the temperature is changed over time. In one embodiment, the temperature increases from a first temperature, optionally the temperature of the electrospinning process, optionally room temperature, to a second temperature. Heating then proceeds for a given time at the second temperature, or the temperature continues to vary. The rate of increase in temperature during heating is varied in some embodiments. Any suitable rate of increase is permissible and disclosed herein, whereby a nanofiber of the desired properties is obtained. In certain embodiments, the rate of temperature increase is about 0.1° C./min, about 0.3° C./min, about 0.5° C./min, about 0.7° C./min, about 1.0° C./min, about 1.5° C./min, about 2° C./min, about 2.5° C./min, about 3° C./min, about 4° C./min, about 5° C./min, about 10° C./min, about 20° C./min, and the like. In certain embodiments, the rate of temperature increase is at least about 0.1° C./min, at least about 0.3° C./min, at least about 0.5° C./min, at least about 0.7° C./min, at least about 1.0° C./min, at least about 1.5° C./min, at least about 2° C./min, at least about 2.5° C./min, at least about 3° C./min, at least about 4° C./min, at least about 5° C./min, at least about 10° C./min, at least about 20° C./min, and the like. In certain embodiments, the rate of temperature increase is at most about 0.1° C./min, at most about 0.3° C./min, at most about 0.5° C./min, at most about 0.7° C./min, at most about 1.0° C./min, at most about 1.5° C./min, at most about 2° C./min, at most about 2.5° C./min, at most about 3° C./min, at most about 4° C./min, at most about 5° C./min, at most about 10° C./min, at most about 20° C./min, and the like. In yet other embodiments, the rate of temperature increase is between about 0.1° C./min and 0.5° C./min, between about 0.5° C./min and 2° C./min, between about 2° C./min and 10° C./min, between about 0.1° C./min and 2° C./min, and the like.

Heating is performed for any suitable amount of time necessary to arrive at a nanofiber with the desired properties. In certain embodiments, the time and temperature of heating are related to each other. For example, choice of a higher temperature reduces, in some instances, the amount of time needed to produce a nanofiber with a given property. In some instances, the converse is also be true; increasing the time of calcination reduces the necessary temperature. In some instances, this is advantageous if the nanofiber includes temperature-sensitive materials for example. In some embodiments, heating is performed for about 5 minutes, about 15 minutes, about 30 minutes, about 1 hour, about 2 hours, about 3 hours, about 4 hours, about 8 hours, about 12 hours, about 1 day, about 2 days, and the like. In some embodiments, heating is performed for at least 5 minutes, at least 15 minutes, at least 30 minutes, at least 1 hour, at least 2 hours, at least 3 hours, at least 4 hours, at least 8 hours, at least 12 hours, at least 1 day, at least 2 days, and the like. In some embodiments, heating is performed for at most 5 minutes, at most 15 minutes, at most 30 minutes, at most 1 hour, at most 2 hours, at most 3 hours, at most 4 hours, at most 8 hours, at most 12 hours, at most 1 day, at most 2 days, and the like. In yet other embodiments, heating is performed for between about 10 minutes and 60 minutes, between about 1 hour and about 5 hours, between about 5 hours and 1 day, and the like.

In some embodiments, the nanofibers are heated in the presence of a sacrificial oxidizer, thereby oxidizing the sacrificial oxidizer and reducing (and/or not oxidizing) the high energy capacity material. In some embodiments, the sacrificial oxidizer comprises a material that is more readily oxidized than the high energy capacity material (e.g., Mg when the high energy capacity material is Si).

Calcination Reagents

In some embodiments, the fluid stock further comprises a calcination reagent. In further or alternative embodiments, after electrospinning, the nanofibers are thermally treated in combination with a calcination reagent (e.g., air, or a reducing agent, such as hydrogen or a sacrificial oxidation reagent like Mg). In certain embodiments, the calcination reagent is a phosphorus reagent (e.g., for preparing lithium metal phosphates or phosphides upon thermal treatment/calcination of a nanofiber spun from a fluid stock comprising lithium and at least one additional metal precursors), a silicon reagent (e.g., for preparing lithium metal silicates upon thermal treatment/calcination of a nanofiber spun from a fluid stock comprising lithium and at least one additional metal precursors), a sulfur reagent (e.g., for preparing lithium metal sulfides or sulfates upon thermal treatment/calcination of a nanofiber spun from a fluid stock comprising lithium and at least one additional metal precursors), or a boron reagent (e.g., for preparing lithium metal borates upon thermal treatment/calcination of a nanofiber spun from a fluid stock comprising lithium and at least one additional metal precursors). In some embodiments, the reagent is elemental material (e.g., phosphorus, sulfur) or any other suitable chemical compound. In some embodiments, the calcination reagent has the formula: $X^1R^1_q$, wherein $X^1$ is a non-metal (or metalloid), such as S, P, N, B, Si, or Se; each $R^1$ is independently H, halo, CN, OH (or O—), $NO_2$, $NH_2$, —NH(alkyl) or —N(alkyl)(alkyl), —$SO_2$alkyl, —$CO_2$-alkyl, alkyl, heteroalkyl, alkoxy, —S-alkyl, cycloalkyl, heterocycle, aryl, heteroaryl, oxide (=O); and q is 0-10 (e.g., 0-4). In certain embodiments, the alkyl, alkoxy, S-alkyl, cycloalkyl, heterocycle, aryl, or heteroaryl is substituted or unsubstituted. In specific embodiments, q is 0. In some embodiments, R1 is alkoxy (e.g., wherein the calcination reagent is triethylphosphite). In some embodiments wherein metal oxides are prepared, an oxygen reagent is air, which is provided in the atmosphere (e.g., which can react upon sufficient thermal conditions with the metal precursors or calcined metals). In certain embodiments, wherein metal carbides are prepared, a carbon reagent (or carbon source) is the organic polymer material (e.g., which can react upon sufficient thermal conditions with the metal precursor(s)).

In some embodiments, the method comprises heating the nanofibers in the presence of a calcining reagent, such as a sacrificial oxidizer, wherein the sacrificial oxidizer becomes oxidized. In some embodiments, the method further comprises removing the oxidized sacrificial oxidizer (e.g., Mg) from the nanofibers.

The sacrificial oxidizer is removed in any suitable manner. In some embodiments, the nanofibers are contacted with a solution comprising a strong acid. The acid is an acid vapor in some embodiments. The acid is an aqueous solution in some embodiments. The contacting is performed for any suitable amount of time. The concentration of the acid is any suitable concentration.

The acid is any acid suitable for removing the sacrificial oxidizer from the nanofibers. In some embodiments, the acid is a weak acid such as acetic acid. In some embodiments, the acid is a strong acid. In some embodiments, the acid comprises hydrochloric acid (HCl). In some embodiments, the acid comprises hydrofluoric acid (HF).

In one aspect, the electrodes described herein comprise porous nanofibers. In some embodiments, removing the oxidized sacrificial oxidizer increases the porosity of the nanofibers.

In some embodiments, the method further comprises reacting and/or coating the nanofibers such that the nanofibers are not capable of being oxidized. Methods for coating include dipping, spraying, electrodepositing, and co-axial electrospinning. The method includes reacting and/or coating with any material suitable for protecting the nanofibers from oxidation.

Electrodes

Without limitation, the batteries described herein comprise electrodes (e.g., anode and cathode) comprising nanofibers. Described herein are the batteries, the electrodes, the nanofibers, methods for making the batteries, methods for making the electrodes, methods for making the nanofibers, and the like.

In one aspect, a method is described for producing an electrode. In some embodiments the method comprises: (a) electrospinning a fluid stock to form nanofibers, the fluid stock comprising a high energy capacity material or precursor thereof and a polymer; (b) treating (e.g., thermally and/or chemically) the nanofibers; and (c) assembling the nanofibers into an electrode. In certain embodiments, a process of assembling an electrode herein comprises assembling any nanofiber described herein into an electrode.

In some instances, provided herein is any electrode described herein (e.g., in a battery, system or method herein). Further, in some embodiments, such electrodes are lithium ion battery electrodes. In some instances, such electrodes are thinner and lighter than those currently commercially available (e.g., carbon electrodes). In some embodiments, an electrode described herein comprises a porous nanofiber (e.g., ceramic, metal, silicon, or hybrid thereof). In further or alternative embodiments, electrodes provided herein comprising domains of high energy capacity material. In certain embodiments, such electrodes comprise further domains, such as those that allow expansion of the nanofiber without pulverization, degradation, or the like.

Any method for assembling the nanofibers into an electrode is suitable. In some embodiments, assembling the nanofibers into an electrode comprises aligning the nanofibers. The nanofibers are aligned in any suitable orientation. The nanofibers are disposed on any suitable surface in some embodiments. In some instances, the nanofibers are encapsulated in any suitable matrix material. The nanofibers are assembled into an electrode such that lithium ions are capable of intercalating and deintercalating from the high energy capacity material, optionally at a high rate. In some instances, the nanofibers are assembled into an electrode such that operation of the battery delivers electricity to its intended application (e.g., an electronic device such as a mobile phone, an electric automobile, and the like).

System

In one aspect, described herein is a lithium ion battery system, the system comprising: (a) an electrolyte; (b) an anode in a first chamber, the anode comprising a plurality of first nanofibers, the first nanofibers comprising a plurality of domains of a first high energy capacity material, a plurality of nanoparticles comprising the first high energy capacity material, a plurality of pores, a core of high conductivity material, or any combination thereof; (c) a cathode in a second chamber, the cathode comprising a plurality of second nanofibers, the second nanofibers comprising a plurality of domains of a second high energy capacity material, a plurality of nanoparticles comprising the second high energy capacity material, a plurality of pores, a core of high conductivity material, or any combination thereof; and (d) a separator between the first chamber and the second chamber, the separator comprising a plurality of third nanofibers, the third nanofibers comprising a polymer, and the separator allowing ion transfer between the first chamber and second chamber in a temperature dependent manner.

In one aspect, described herein is a system for producing nanofibers for a lithium ion battery, the system comprising: (a) a fluid stock comprising a polymer and inorganic precursors or nanoparticles; (b) an electrospinner suitable for electrospinning the fluid stock into nanofibers; (c) a heater suitable for heating the nanofibers; and (d) optionally a module suitable for contacting the nanofibers with an acid.

Figure 15:
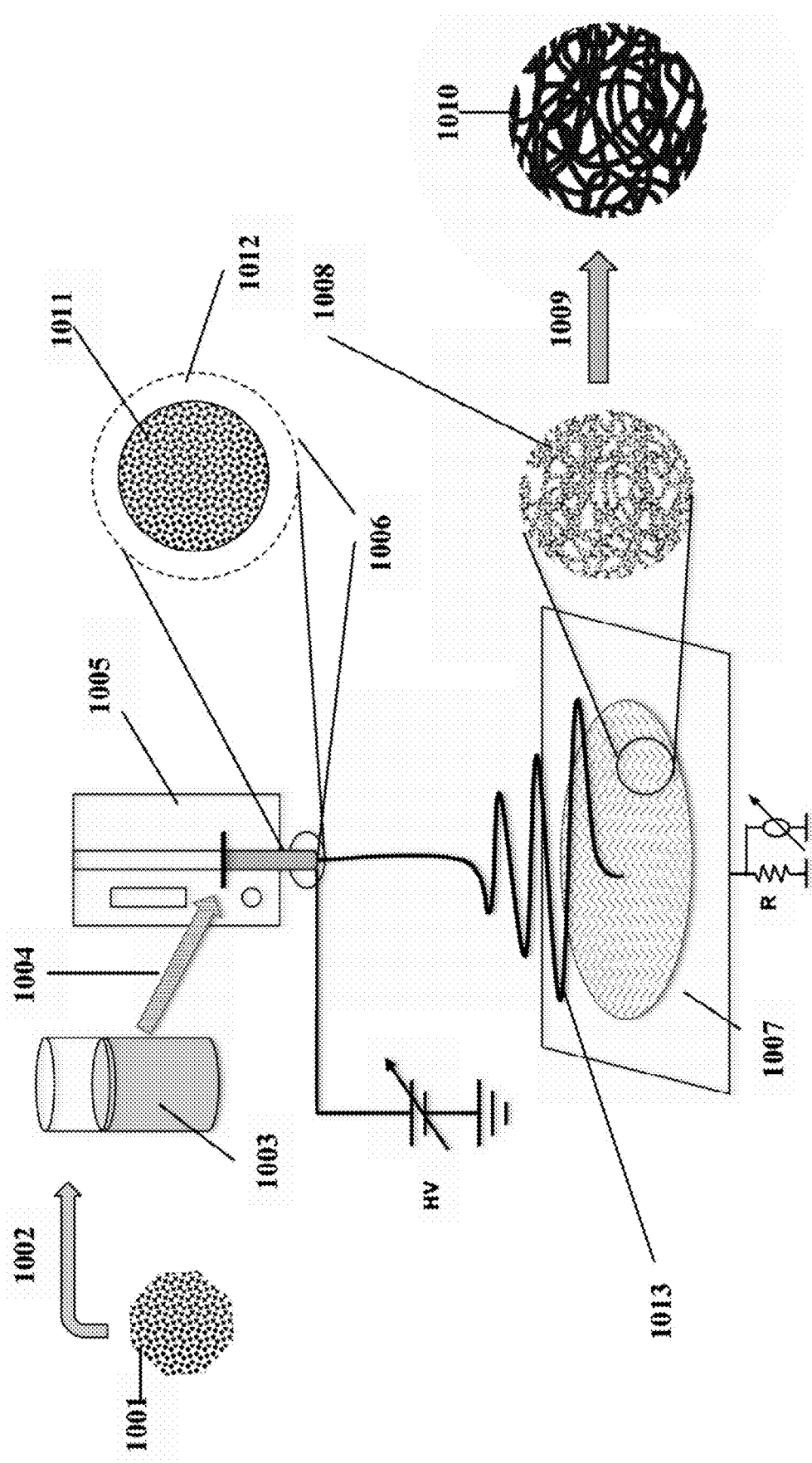
FIG. 15 illustrates a schematic of an exemplary process or system for preparing nanofibers provided herein.

In some embodiments, electrospinning (e.g., with an aid of gas stream—gas assisted) allows for the high throughput generation of nanomaterials. Further, in some instances, gas assisted electrospinning provides an ability to control the structure of resultant as-spun nanofibers and calcined nanofibers (e.g., the crystal structure thereof). In some embodiments, purely inorganic or organic/inorganic hybrid (composite) nanofibers are generated by inclusion of various metal/ceramic precursors (metal nitrate, acetate, acetylacetonate, etc.) or preformed nanoparticles (Si, Ge, Sn, $Fe_3O_4$, etc.) within a polymer (PVA, PAN, PEO, etc.) solution, as shown in the schematic in FIG. 15. More specifically, FIG. 15 illustrates one example of a process of preparing nanofibers herein, beginning with the preparation of a fluid stock 1003 by combining 1002 polymer (e.g., PVA, PAN, PEO, or the like) with a composite (e.g., metal, clay, ceramic) component 1001, such as inorganic precursors (e.g., metal nitrate, acetate, acetylacetonate, or the like) and/or pre-made nanoparticles (such as Si, Ge, Sn, $Fe_3O_4$, or the like, or a nanoclay, or a ceramic). The fluid stock 1003 is prepared for electrospinning by any suitable process 1004, e.g., heating, mixing, or the like. The fluid stock is provided to an electrospinning apparatus 1005 (or prepared therein). The fluid stock is electrospun through an electrospinning needle apparatus 1006 (e.g., the fluid is provided to the tip of the needle whereupon a voltage is applied, overcoming the surface tension of the fluid and providing an electrospun jet 1013). The needle apparatus 1006 is optionally monoaxial or coaxial. A coaxial needle apparatus 1006 is illustrated with an inner needle 1011 and outer needle 1012. In certain instances, the outer needle provides a gas during electrospinning, providing for coaxial gas assisted electrospinning of the fluid stock. The gas (e.g., air) is provided to the needle from any suitable source, such as a pump or gas canister (not shown). In other instances, the inner needle 1011 provides a first fluid stock (e.g., from a first syringe) and the outer needle 1012 provides a second fluid stock (e.g., from a second syringe). The electrospun jet 1013 is then collected on a collector 1007 as an as-spun nanofiber 1008. In some instances, the as-spun nanofiber is collected in an aligned or non-woven manner. In some instances (e.g., in the preparation for anode or cathode nanofibers provided herein) as-spun nanofiber 1008 is then thermally treated to remove organics (e.g., polymer and/or precursor ligands), calcine metal precursors, crystallize inorganics, and/or combinations thereof. In other instances, thermal treatment may be at a lower temperature, e.g., to anneal the polymer component of the nanofiber. In certain instances, the produced nanofibers have controlled porosity, conductivity, etc.

In some embodiments, thermal treatment is of as-spun nanofibers is used to carbonize polymers, remove polymers, selectively remove a single polymer phase, and/or crystallize included precursors or nanoparticles with controlled oxidation state. In some embodiments, the morphology of resulting nanofibers, as shown by TEM images and inlaid XRD patterns in FIGS. 1-3, vary from single-phase high-capacity material (Si) to a high-capacity secondary material in a nanofiber matrix (e.g., Ge in $Al_2O_3$) as controlled by the number, type and concentration of precursors and/or nanoparticles included in the initial solutions and the thermal treatment procedure used. In some instances, the use of a matrix increases cycle capability by optimizing the concentration of high-capacity material to increase capacity and decrease the impingement of multiple crystals on each other during the volume expansion associated with intercalation or alloying the high-capacity material with lithium. In some embodiments, porosity in the nanofibers is controlled by the removal of a polymer domain during thermal treatment, as demonstrated in FIGS. 10-12 for mesoporous Si nanofibers, e.g., for anode applications and FIGS. 30, 31, 33, 34, 36, 38, 39, 42-46 for lithium containing nanofibers, e.g., for cathode application. In some instances, this allows for greater surface area to volume ratio and/or greater electrolyte contact increasing ion transfer, while accommodating volume expansion during lithiation and de-lithiation processes. In some instances, nanofiber electrical conductivity is controlled by precursor selection for the substrate as well as the core. Increased electrical conductivity allows for greater electrical transfer and thus increased power density in some embodiments. In some instances, core structures increase mechanical stability and/or allow high capacity over many charge/discharge cycles. In some embodiments, electrospun polymer nanofibers (PVA, PAN, PEO, PVP, etc.) are used as the temperature sensitive separator between the anode and cathode allowing for electrolyte and ion transfer while limiting transfer at higher temperatures when temperature overcomes polymer melting temperature and results in nanofiber morphology collapsing.

In other embodiments, provided herein are systems comprising any lithium ion battery described herein. In some instances, such systems include a battery described herein with a device or system operated and/or powered by a battery. In some instances, such a device is an electric vehicle. In some instances, an electric vehicle comprising a battery described herein is capable of travelling at least 300 miles, at least 400 miles, at least 500 miles, or more on a single charge (or without needing to recharge the battery).

Certain Definitions

The articles "a", "an" and "the" are non-limiting. For example, "the method" includes the broadest definition of the meaning of the phrase, which can be more than one method.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The term "alkyl" as used herein, alone or in combination, refers to an optionally substituted straight-chain, or optionally substituted branched-chain saturated or unsaturated hydrocarbon radical. Examples include, but are not limited to methyl, ethyl, n-propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, n-butyl, isobutyl, sec-butyl, t-butyl, n-pentyl, isopentyl, neopentyl, tert-amyl and hexyl, and longer alkyl groups, such as heptyl, octyl and the like. Whenever it appears herein, a numerical range such as "$C_1$-$C_6$ alkyl," means that: in some embodiments, the alkyl group consists of 1 carbon atom; in some embodiments, 2 carbon atoms; in some embodiments, 3 carbon atoms; in some embodiments, 4 carbon atoms; in some embodiments, 5 carbon atoms; in some embodiments, 6 carbon atoms. The present definition also covers the occurrence of the term "alkyl" where no numerical range is designated. In certain instances, "alkyl" groups described herein include linear and branched alkyl groups, saturated and unsaturated alkyl groups, and cyclic and acyclic alkyl groups.

The term "aryl" as used herein, alone or in combination, refers to an optionally substituted aromatic hydrocarbon radical of six to about twenty ring carbon atoms, and includes fused and non-fused aryl rings. A fused aryl ring radical contains from two to four fused rings, where the ring of attachment is an aryl ring, and the other individual rings are alicyclic, heterocyclic, aromatic, heteroaromatic or any combination thereof. Further, the term aryl includes fused and non-fused rings containing from six to about twelve ring carbon atoms, as well as those containing from six to about ten ring carbon atoms. A non-limiting example of a single ring aryl group includes phenyl; a fused ring aryl group includes naphthyl, phenanthrenyl, anthracenyl, azulenyl; and a non-fused bi-aryl group includes biphenyl.

The term "heteroaryl" as used herein, alone or in combination, refers to optionally substituted aromatic monoradicals containing from about five to about twenty skeletal ring atoms, where one or more of the ring atoms is a heteroatom independently selected from among oxygen, nitrogen, sulfur, phosphorous, silicon, selenium and tin but not limited to these atoms and with the proviso that the ring of the group does not contain two adjacent O or S atoms. Where two or more heteroatoms are present in the ring, in some embodiments, the two or more heteroatoms are the same as each another; in some embodiments, some or all of the two or more heteroatoms are be different from the others. The term heteroaryl includes optionally substituted fused and non-fused heteroaryl radicals having at least one heteroatom. The term heteroaryl also includes fused and non-fused heteroaryls having from five to about twelve skeletal ring atoms, as well as those having from five to about ten skeletal ring atoms. In some embodiments, bonding to a heteroaryl group is via a carbon atom; in some embodiments, via a heteroatom. Thus, as a non-limiting example, an imidiazole group is attached to a parent molecule via any of its carbon atoms (imidazol-2-yl, imidazol-4-yl or imidazol-5-yl), or its nitrogen atoms (imidazol-1-yl or imidazol-3-yl). Further, in some embodiments, a heteroaryl group is substituted via any or all of its carbon atoms, and/or any or all of its heteroatoms. A fused heteroaryl radical contains from two to four fused rings, where the ring of attachment is a heteroaromatic ring. In some embodiments, the other individual rings are alicyclic, heterocyclic, aromatic, heteroaromatic or any combination thereof. A non-limiting example of a single ring heteroaryl group includes pyridyl; fused ring heteroaryl groups include benzimidazolyl, quinolinyl, acridinyl; and a non-fused bi-heteroaryl group includes bipyridinyl. Further examples of heteroaryls include, without limitation, furanyl, thienyl, oxazolyl, acridinyl, phenazinyl, benzimidazolyl, benzofuranyl, benzoxazolyl, benzothiazolyl, benzothiadiazolyl, benzothiophenyl, benzoxadiazolyl, benzotriazolyl, imidazolyl, indolyl, isoxazolyl, isoquinolinyl, indolizinyl, isothiazolyl, isoindolyloxadiazolyl, indazolyl, pyridyl, pyridazyl, pyrimidyl, pyrazinyl, pyrrolyl, pyrazinyl, pyrazolyl, purinyl, phthalazinyl, pteridinyl, quinolinyl, quinazolinyl, quinoxalinyl, triazolyl, tetrazolyl, thiazolyl, triazinyl, thiadiazolyl and the like, and their oxides, such as for example pyridyl-N-oxide.

The term "heteroalkyl" as used herein refers to optionally substituted alkyl structure, as described above, in which one or more of the skeletal chain carbon atoms (and any associated hydrogen atoms, as appropriate) are each independently replaced with a heteroatom (i.e. an atom other than carbon, such as though not limited to oxygen, nitrogen, sulfur, silicon, phosphorous, tin or combinations thereof), or heteroatomic group such as though not limited to —O—O—, —S—S—, —O—S—, —S—O—, =N—N—, —N=N—, —N=N—NH—, —P(O)$_2$—, —O—P(O)$_2$—, —P(O)$_2$—O—, —S(O)—, —S(O)$_2$—, —SnH2- and the like.

The term "heterocyclyl" as used herein, alone or in combination, refers collectively to heteroalicyclyl groups. Herein, whenever the number of carbon atoms in a heterocycle is indicated (e.g., C1-C6 heterocycle), at least one non-carbon atom (the heteroatom) must be present in the ring. Designations such as "C1-C6 heterocycle" refer only to the number of carbon atoms in the ring and do not refer to the total number of atoms in the ring. Designations such as "4-6 membered heterocycle" refer to the total number of atoms that are contained in the ring (i.e., a four, five, or six membered ring, in which at least one atom is a carbon atom, at least one atom is a heteroatom and the remaining two to four atoms are either carbon atoms or heteroatoms). For heterocycles having two or more heteroatoms, in some embodiments, those two or more heteroatoms are the same; in some embodiments, they are different from one another. In some embodiments, heterocycles are substituted. Non-aromatic heterocyclic groups include groups having only three atoms in the ring, while aromatic heterocyclic groups must have at least five atoms in the ring. In some embodiments, bonding (i.e. attachment to a parent molecule or further substitution) to a heterocycle is via a heteroatom; in some embodiments, via a carbon atom.

EXAMPLES

Example 1—Tin Oxide Matrix

A first composition is prepared by combining 0.5 g PVA (79 kDa, 88% hydrolyzed) with 4.5 g water. The first composition is heated to 95 C for at least 8 hours. A second composition is prepared by combining 1 g water, 0.5 g acetic acid, 3 drops x-100 surfactant, tin acetate. The second composition is mixed for at least 4 hours. The first and second compositions are combined and mixed for at least 2 hours to form a fluid stock.

The fluid stock is electrospun in a coaxial gas assisted manner, using a flow rate of 0.005 to 0.02 mL/min, a voltage of 10-20 kV and a tip to collector distance of 10-20 cm. Electrospinning of the fluid stock prepares an as-spun precursor nanofiber, which is subsequently thermally treated at a temperature of 500 C-1000 C in air.

FIG. 1 illustrates an SEM image of a nanofiber comprising a continuous matrix of (crystalline) $SnO_2$ (panel A).

Example 2—Germanium Matrix

A fluid stock is prepared according to Example 1, using germanium acetate in place of tin acetate. Electrospinning and thermal treatment are as set forth in Example 1, with the exception that thermal treatment occurs under inert or reducing conditions. FIG. 1 illustrates an SEM image of a nanofiber comprising a continuous matrix of Ge (panel B).

Example 3—Silicon Matrix

A fluid stock is prepared according to Example 1, using germanium acetate in place of tin acetate. Electrospinning and thermal treatment are as set forth in Example 1. The resultant nanofibers comprise a continuous matrix of silica, which are treated with Mg (sacrificial oxidizing agent) under vacuum, followed by treatment with HCl (to remove Mg oxide). FIG. 10 illustrates SEM (a-b) and TEM (c-e) images of the nanofibers including images of (a) the as-spun fiber, (b) fiber heated in air, (c) fiber heated in air, (d) fiber heated under vacuum with Mg, and (e) HCl treated fiber. FIG. 11 illustrates the schematic of the synthetic process. FIG. 12 illustrates X-Ray Diffraction of the nanofibers at various stages of the synthetic process. Table 1 demonstrates the specific capacities of the pre- and post-HCl treated fibers.

TABLE 1

| | Si/MgO @400 mA/g (mAh/g) | Si/MgO @1000 mA/g (mAh/g) | Pure Si @400 mA/g (mAh/g) | Pure Si @1000 mA/g (mAh/g) |
|---|---|---|---|---|
| 1 | 995.9 | 826.6 | 4352.2 | 3529.4 |
| 2 | 711.7 | 605.9 | 3156.3 | 2515.7 |
| 3 | 588.3 | 491.1 | 2398.9 | 1882.6 |
| 4 | 491.5 | 238.0 | 1901.5 | 1492.0 |
| 5 | 409.3 | 178.2 | 1550.4 | 1232.3 |
| 6 | 325.0 | 145.0 | 1305.9 | 1030.6 |
| 7 | 268.0 | 134.1 | 1104.8 | 885.7 |
| 8 | 222.4 | 130.7 | 953.0 | 773.1 |
| 9 | 193.7 | 128.6 | 818.9 | 681.7 |
| 10 | 179.3 | 127.5 | 702.6 | 609.4 |

TABLE 1-continued

| | Si/MgO @400 mA/g (mAh/g) | Si/MgO @1000 mA/g (mAh/g) | Pure Si @400 mA/g (mAh/g) | Pure Si @1000 mA/g (mAh/g) |
|---|---|---|---|---|
| 11 | 171.3 | 127.3 | 614.1 | 549.1 |
| 12 | 166.1 | 127.0 | 540.7 | 488.6 |
| 13 | 162.6 | 127.0 | 486.7 | 429.1 |
| 14 | 159.1 | 127.3 | 441.5 | 394.6 |
| 15 | 156.5 | 127.5 | 411.5 | 362.0 |
| 16 | 155.2 | 127.3 | 390.7 | 343.7 |
| 17 | 153.3 | 128.0 | 369.6 | 324.6 |
| 18 | 152.2 | 128.0 | 355.2 | 310.6 |
| 19 | 150.9 | 128.0 | 343.7 | 294.9 |
| 20 | 150.4 | 128.0 | 333.7 | 286.3 |
| 21 | 150.0 | 128.0 | 323.7 | 276.9 |
| 22 | 149.1 | 128.2 | 315.6 | 271.7 |
| 23 | 148.7 | 128.0 | 308.1 | 266.3 |
| 24 | 147.8 | 127.5 | 301.1 | 259.4 |
| 25 | 147.2 | 127.5 | 294.8 | 254.3 |
| 26 | 146.3 | 127.3 | 290.0 | 247.4 |
| 27 | 146.1 | 126.8 | 284.1 | 244.0 |
| 28 | 145.4 | 127.0 | 280.0 | 237.1 |
| 29 | 144.6 | 126.8 | 275.6 | 231.1 |
| 30 | 142.6 | 126.6 | 271.1 | 226.3 |

Example 4—Tin in Tin Matrix

A fluid stock is prepared according to Example 1, also including tin nanoparticles in the second composition. Electrospinning and thermal treatment are as set forth in Example 1, with the exception that thermal treatment occurs under inert or reducing conditions, followed by thermal treating in air (to remove carbon). FIG. 2 illustrates an SEM image of a nanofiber comprising (crystalline) Sn in a continuous matrix of (amorphous) Sn (panel A).

Example 5—Tin in Carbon Matrix

A fluid stock is prepared according to Example 4, excluding the tin acetate in the second composition. Electrospinning and thermal treatment are as set forth in Example 1, with the exception that thermal treatment occurs under inert or reducing conditions. FIG. 2 illustrates an SEM image of a nanofiber comprising (crystalline) Sn in a continuous matrix carbon (panel B).

Example 6—Tin in Alumina Matrix

A fluid stock is prepared according to Example 1, including tin nanoparticles and aluminum acetate (instead of tin acetate) in the second composition. Electrospinning and thermal treatment are as set forth in Example 1. FIG. 2 illustrates an SEM image of a nanofiber comprising (crystalline) Sn in a continuous matrix of alumina ($Al_2O_3$) (panel C).

Example 7—Tin in Zirconia Matrix

A fluid stock is prepared according to Example 1, including tin nanoparticles and zirconium acetate (instead of tin acetate) in the second composition. Electrospinning and thermal treatment are as set forth in Example 1. FIG. 2 illustrates an SEM image of a nanofiber comprising (crystalline) Sn in a continuous matrix of zirconia ($ZrO_2$) (panel D).

Example 8—Germanium in Carbon Matrix

A fluid stock is prepared according to Example 1, including polyacrylonitrile (PAN) in dimethylformamide (DMF)

instead of PVA/water in the first composition and germanium nanoparticles and DMF (instead of tin acetate/water) in the second composition. Electrospinning and thermal treatment are as set forth in Example 1, with the exception that it is performed under inert or reducing conditions. FIG. 3 illustrates an SEM image of a nanofiber comprising (crystalline) Ge in a continuous matrix of carbon (panel A).

Example 8—Germanium in Alumina Matrix

A fluid stock is prepared according to Example 1, including germanium nanoparticles and aluminum acetate (instead of tin acetate) in the second composition. Electrospinning and thermal treatment are as set forth in Example 1. FIG. 3 illustrates an SEM image of a nanofiber comprising (crystalline) Ge in a continuous matrix alumina ($Al_2O_3$) (panel B).

Example 8—Germanium in Alumina Matrix

A fluid stock is prepared according to Example 1, including germanium nanoparticles and zirconium acetate (instead of tin acetate) in the second composition. Electrospinning and thermal treatment are as set forth in Example 1. FIG. 3 illustrates an SEM image of a nanofiber comprising (crystalline) Ge in a continuous matrix of zirconia ($ZrO_2$) (panel C).

Example 9—Half Cell Performance of Ge- and Sn-Containing Nanofibers

Anode half-cell tests with nanofibers with discrete Ge and Sn crystal domains were performed. FIG. 13 shows energy capacity over many cycles. As seen in FIG. 13, alumina or carbon nanofibers with discrete Sn or Ge crystal domains maintain 40% to 80% of theoretical capacity after 100 cycles, resulting in 800-1100 mAh/g of energy capacity, which is two to three times greater than current carbon with theoretical capacity of 372 mAh/g. This demonstrates the use of the substrate structure with discrete high energy capacity crystal domains can drastically reduce pulverization issues.

Example 10—Preparing a Fluid Stock of Silicon Nanoparticles and PVA 0.5 grams of preformed silicon nanoparticles (100 nm average diameter), the silicon component, is suspended in 20 ml of 1 molar acetic acid solution with X-100 surfactant. The solution is stirred for 2 hours to create a suspension of silicon nanoparticles.

In a second solution, 1 gram of hydrolyzed (e.g., 88% or 99.7%) polyvinyl alcohol (PVA) with an average molecular weight of 79 kDa and polydispersity index of 1.5 is dissolved in 10 ml of de-ionized water. The polymer solution is heated to a temperature of 95° C. and stirred for 2 hours to create a homogenous solution.

The silicon nanoparticle suspension is then combined with the PVA solution to create a fluid stock. In order to distribute the nanoparticles substantially evenly in the fluid stock, the nanoparticle suspension is added gradually to the polymer solution while being continuously vigorously stirred for 2 hours. The mass ratio of nanoparticles to polymer for the fluid feed (based on silicon nanoparticle mass) is 1:4.

Example 11—Preparing Silicon/Polymer and Silicon/Carbon Nanocomposite Nanofiber

The fluid stock is co-axially electrospun with gas using a coaxial needle apparatus similar to the one depicted in FIG. 14 and FIG. 15 (where 1006 illustrates the needle). The center conduit contains silicon suspension fluid stock of Example 10 and the outer conduit contains air. The electrospun hybrid fluid stock is calcinated by heating for 2 hours at 600° C. in an inert atmosphere (e.g., argon).

FIG. 4 illustrates silicon/polymer and silicon/carbon nanocomposite nanofibers prepared according to a method such as set for above. Panel A illustrates an SEM image of the as-spun polymer/Si nanoparticle nanocomposite nanofibers. Panel B illustrates an SEM image of the heat treated carbon/Si nanoparticle nanocomposite nanofibers. Panel C illustrates a TEM image of the heat-treated carbon/Si nanoparticle nanocomposite nanofibers.

Example 12—Silicon Nanocomposite Nanofibers—Thermal Treatment

Fluid stock: 0.5 g PVA (88% hydrolyzed, 78 kDa) was combined with 4.5 g water and heated at 95 C for at least 8 hours. Silicon nanoparticles (purchased from Silicon and Amorphous Materials, Inc., 20-30 nm (actual average size about 50 nm)) added to the polymer solution and sonicated at room temperature for 4 hours. Heated and mixed at 50 C for 4 hours. Silicon nanoparticles are added in ratios of polymer:Si of 2:1.

Nanofibers: the fluid stock is gas-assisted electrospun from a needle apparatus having an inner needle and an outer needle coaxially aligned, the inner needle providing the fluid stock, the outer needle providing the gas. The fluid stock is provided at a flow rate of 0.01 mL/min; the voltage used is 20 kV, the needle apparatus tip to collector distance is 15 cm.

Figure 16:
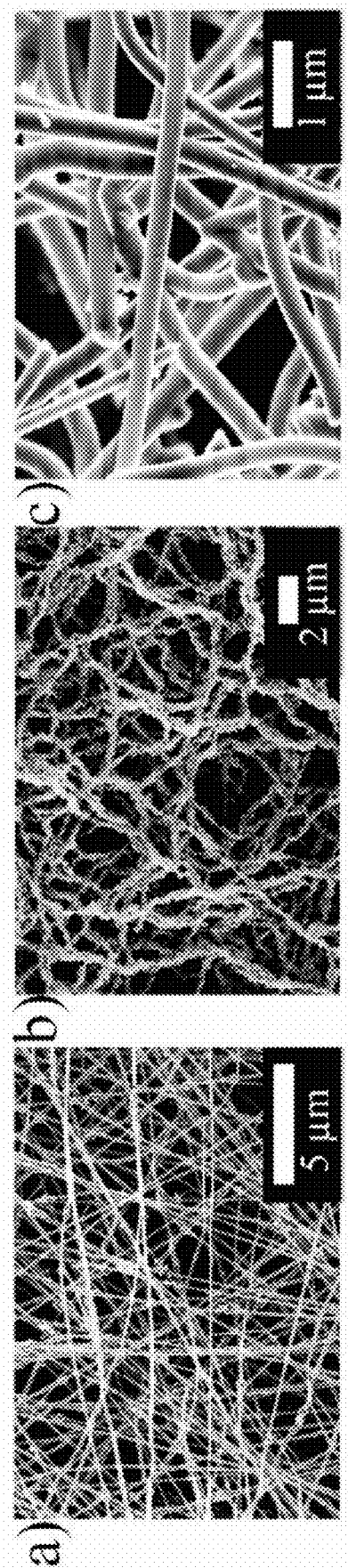
FIG. 16 illustrates an SEM image for a polymer-Si (nanoparticle) nanocomposite nanofiber (Panel A); an SEM image of a silicon/carbon nanocomposite nanofiber prepared by treatment at 900° C. (Panel B); and an SEM image of a silicon/carbon nanocomposite nanofiber prepared by treatment at 1200° C. (Panel C).
Figure 17:
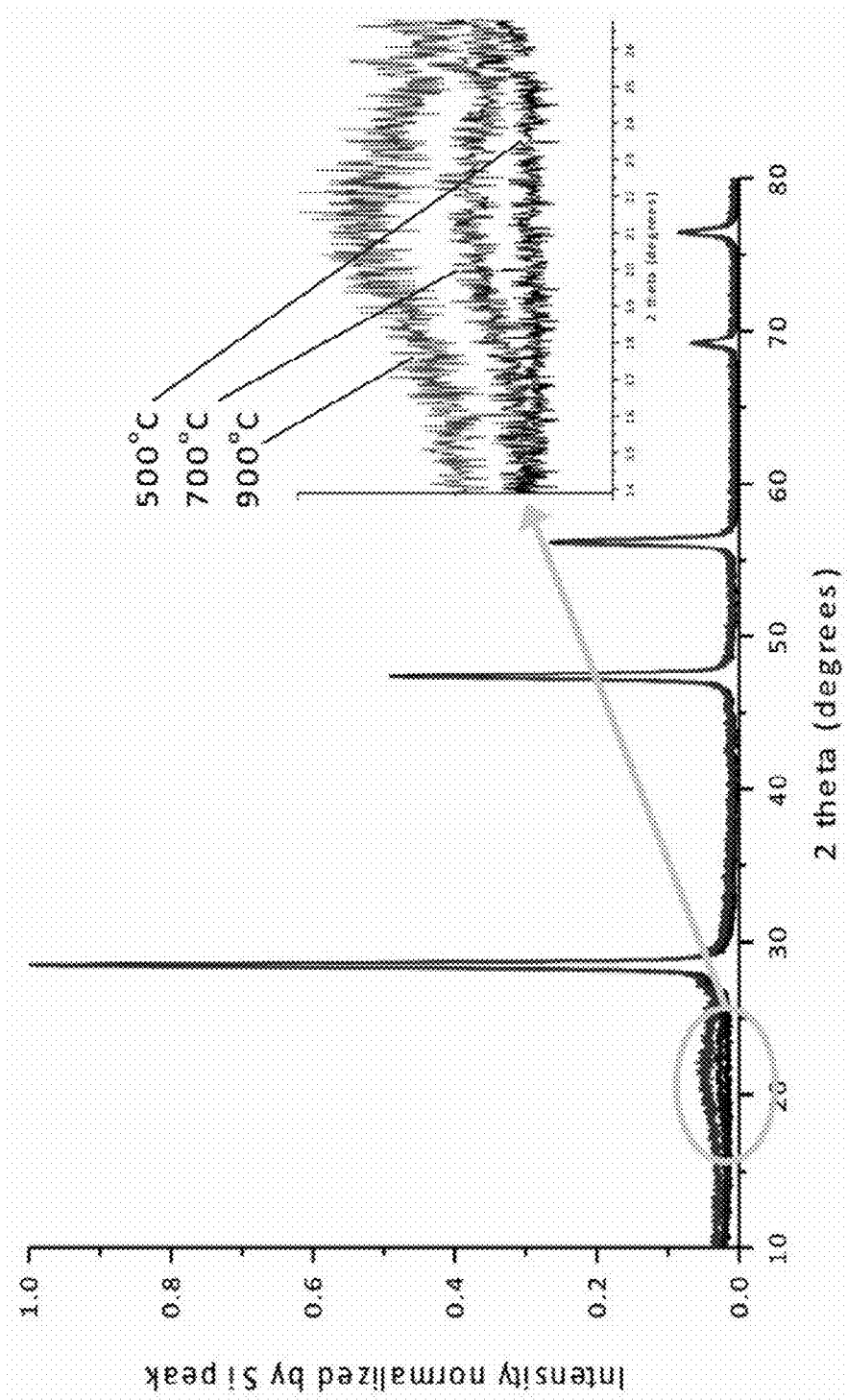
FIG. 17 illustrates normalized XRD peaks for the silicon/carbon nanofibers prepared at 500, 700, and 900° C.
Figure 18:
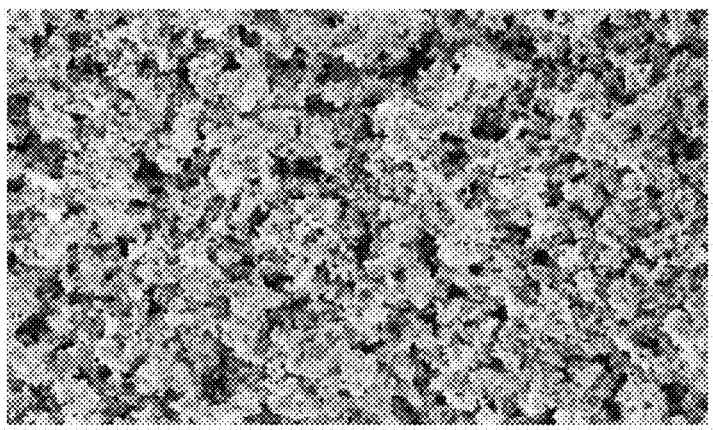
FIG. 18 illustrates SEM images for silicon/carbon nanocomposite nanofibers prepared by treatment at 500° C. (panel A), 700° C. (panel B), and 900° C. (panel C).
Figure 18:
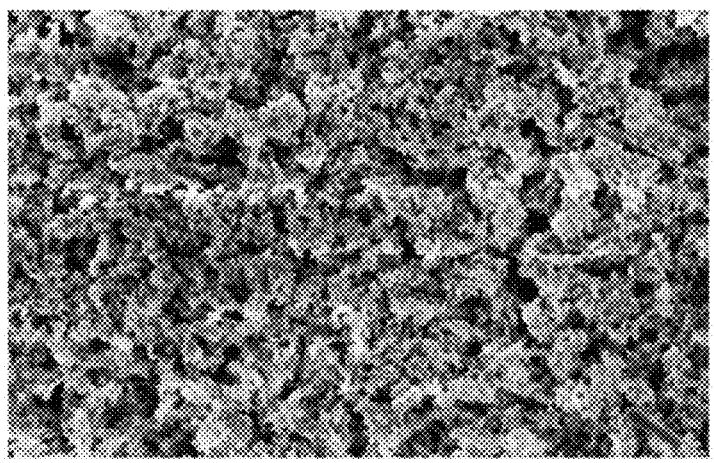
Figure 18:
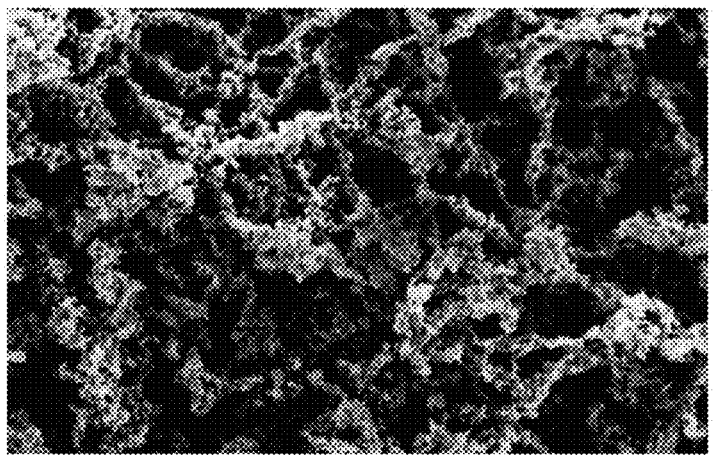
Figure 19:
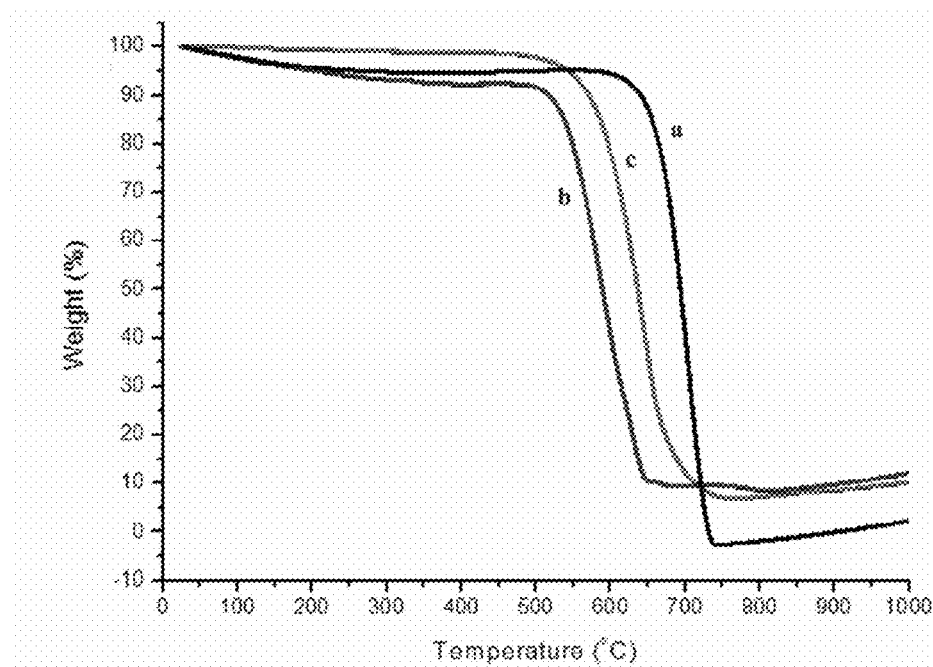
FIG. 19 illustrates TGA curves for Super P (Timcal) carbon (a) compared to silicon/carbon nanocomposite nanofibers prepared by treatment at 900° C. (b) and 1200° C. (c).
Figure 20:
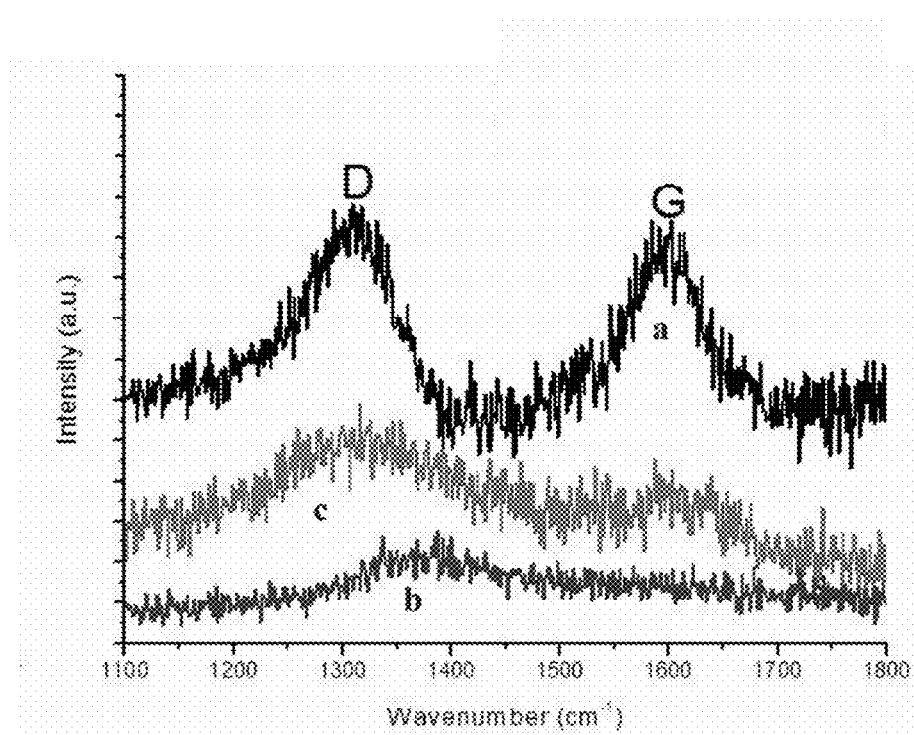
FIG. 20 illustrates Raman spectra for Super P (Timcal) carbon (a) compared to silicon/carbon nanocomposite nanofibers prepared by treatment at 900° C. (b) and 1200° C. (c).

The electrospun nanofiber is a polymer-Si (nanoparticle) nanocomposite nanofiber illustrated in FIG. 16 (Panel A). The nanofibers are then treated with heat under Argon: at 500° C., 700° C., 900° C., and 1200° C. (heat and cool rate of 2° C./minute). FIG. 16 (panel B) illustrates an SEM image of a silicon/carbon nanocomposite nanofiber prepared by treatment at 900° C.; FIG. 16 (panel C) illustrates an SEM image of a silicon/carbon nanocomposite nanofiber prepared by treatment at 1200° C. FIG. 17 illustrates normalized XRD peaks for the nanocomposite nanofibers prepared at 500, 700, and 900° C. FIG. 18 illustrates SEM images for silicon/carbon nanocomposite nanofibers prepared by treatment at 500° C. (panel A), 700° C. (panel B), and 900° C. (panel C). FIG. 5 illustrates a TEM image for silicon/carbon nanocomposite nanofibers prepared by treatment at 900° C. FIG. 19 illustrates TGA curves for Super P (Timcal) carbon (a) compared to silicon/carbon nanocomposite nanofibers prepared by treatment at 900° C. (b) and 1200° C. (c). FIG. 20 illustrates Raman spectra for Super P (Timcal) carbon (a) compared to silicon/carbon nanocomposite nanofibers prepared by treatment at 900° C. (b) and 1200° C. (c).

XRD done using Scintag 2-theta diffractometer; SEM with Leica 440 SEM; TEM with FEI Spirit TEM.

Example 13—Silicon Nanocomposite Nanofibers—Polymer Loading

Fluid stock: 0.5 g PVA (88% hydrolyzed, 78 kDa) was combined with 4.5 g water and heated at 95 C for at least 8 hours. Silicon nanoparticles (purchased from Silicon and Amorphous Materials, Inc., 20-30 nm (actual average size about 50 nm)) added to the polymer solution and sonicated at room temperature for 4 hours. Heated and mixed at 50 C for 4 hours. Silicon nanoparticles are added in ratios of polymer:Si of 20:1, 4:1, 2:1, and 1:1.

Nanofibers: the fluid stock is gas-assisted electrospun from a needle apparatus having an inner needle and an outer needle coaxially aligned, the inner needle providing the fluid stock, the outer needle providing the gas. The fluid stock is provided at a flow rate of 0.01 mL/min; the voltage used is 20 kV, the needle apparatus tip to collector distance is 15 cm.

Figure 21:
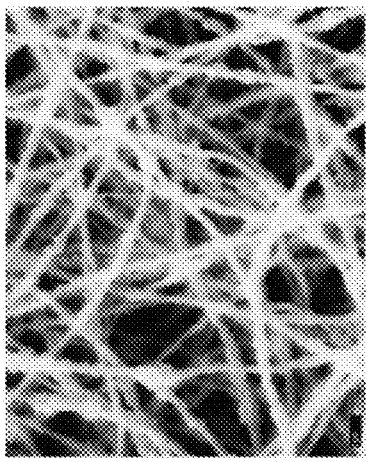
FIG. 21 illustrates SEM images for certain polymer-Si (nanoparticle) nanocomposite nanofibers (panel A for 20:1; panel B for 2:1; panel C for 1:1); and SEM images of certain silicon/carbon nanocomposite after treatment of the polymer-Si nanofibers to 900 C in argon (panel D for the treated 20:1 polymer:Si as-spun fiber, panel E for 2:1, panel F for 1:1).
Figure 21:
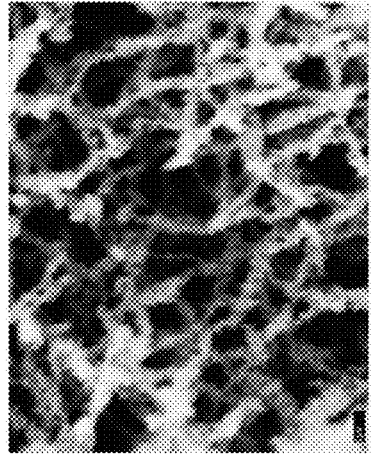
Figure 21:
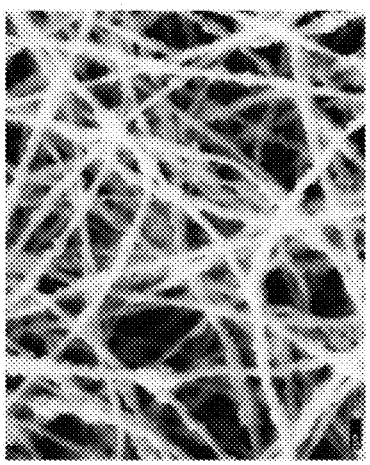
Figure 21:
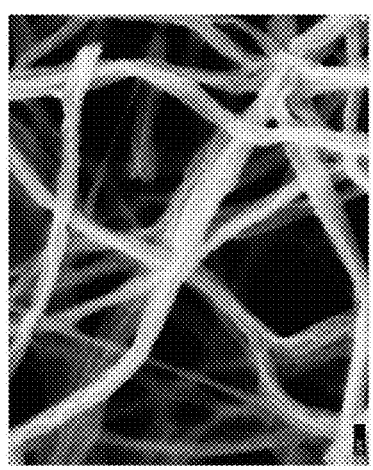
Figure 21:
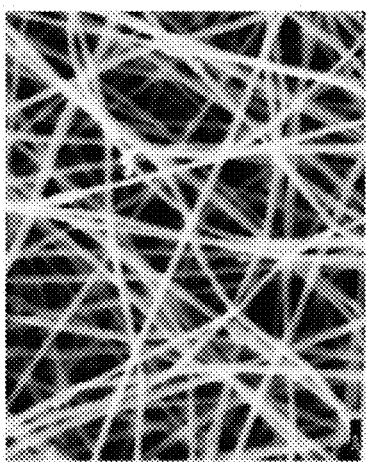
Figure 21:
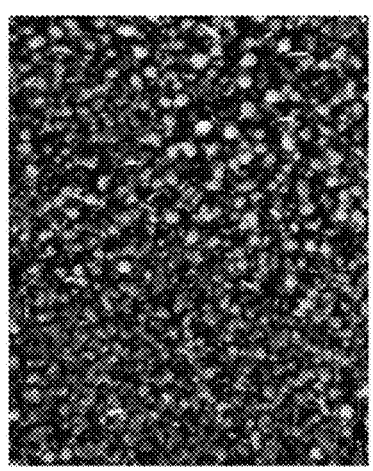

The electrospun nanofiber is a polymer-Si (nanoparticle) nanocomposite nanofiber illustrated in FIG. 21 (panel A for 20:1; panel B for 2:1; panel C for 1:1). The nanofibers are then treated with heat under Argon: at 900° C. (heat and cool rate of 2° C./minute). FIG. 21 also illustrates an SEM image of a silicon/carbon nanocomposite nanofibers prepared by such thermal treatment (panels D for 20:1, panel E for 2:1, panel F for 1:1). Table 2 demonstrates components of the produced nanocomposite nanofibers (as determined by TGA; calculation based on assumption of no Si nanoparticle loss):

TABLE 2

|  | Polymer/Si NC NF | | Si/C NC NF | |
| --- | --- | --- | --- | --- |
|  | PVA | Si | Carbon | Si |
| PVA/Si (1:1) | 50% | 50% | 1.3% | 98.7% |
| PVA/Si (2:1) | 67% | 33% | 14.9% | 85.1% |
| PVA/Si (4:1) | 80% | 20% | 19.3% | 80.7% |
| PVA/Si (20:1) | 95% | 5% | 50.1%* | 49.9%* |

*Nanofiber morphology not observed.

Example 14—Si/C Nanocomposite Nanofibers as Negative Electrode in Lithium Ion Battery Coin cell-typed Li-ion batteries were fabricated by using various Si—C nanofibers. The C-SiNPs nanofibers were blended with Super P (Timcal) and poly(acrylic acid) (PAA, Mw=3,000,000) for 70:15:15 wt % in 1-Methyl-2-pyrrolidinone (NMP, Aldrich) in order to make a homogeneous slurry without breaking the 1-D nanostructures. After the slurries were dropped on a current collector with 9 Lm thickness (Cu foil, MTI), the working electrodes using C-SiNPs nanofibers were dried in the vacuum oven at 80° C. to remove the NMP solvent.

For fabricating the half cells, Li metal was used as a counter electrode and polyethylene (ca. 25 Lm thickness) was inserted as a separator between working electrode and counter electrode. The mass of working electrode was 3~4 mg/cm$^2$. The coin cell-typed Li-ion batteries were assembled in Ar-filled glove box with electrolyte.

The cut off voltage during the galvanostatic tests was 0.01~2.0 V for anode and 2.5~4.2 V by using battery charge/discharge cyclers from MTI. Full cells are prepared in a similar manner, and are composed of C—Si nanofibers as anode and stock-LiCoO$_2$ as cathode. The cut off voltage during the galvanostatic tests was 2.5~4.5 V. The impedance measurements for all battery cells were performed from 1 Hz to 10 kHz frequency under potentiostatic mode at open circuit voltages of the cells.

The electrochemical properties of Si—C nanofibers were characterized by cyclic voltammetry and electrochemical impedance spectroscopy. FIG. 8 (panel A) illustrates cyclic voltammograms of Si nanoparticles and Si—C nanofibers (prepared according to Example 13 using a polymer-to-Si nanoparticle ratio of 2:1). Delithiation is observed at 0.3 V (vs. Li/Li$^+$) and lithiation is observed at 0.15 V (vs. Li/Li$^+$). Charge transport resistance of C—Si nanofibers in the Nyquist plots of FIG. 8 (panel B) obtained from AC impedance, is greatly reduced to about 60Ω, compared with that of Si nanoparticles (about 220Ω). Furthermore, the solution (polarization) resistance in C—Si nanofibers is decrease by 4.1Ω from 7.4Ω of pure silicon nanoparticles.

The cells were cycled for 25 cycles as shown in FIG. 6 and FIG. 7. FIG. 6 (panel A) illustrates that Nancomposite Si—C nanofibers show an initial discharge capacity of 1,844 mAh/g, while SiNPs has an initial discharge capacity of 3,325 mAh/g. The discharge capacity of SiNPs is dramatically decreased to 50 mAh/g after 25 cycles. Si—C nanocomposite nanofibers have a discharge capacity of 1,452 mAh/g after 25 cycles. FIG. 6 (panel B) illustrate that the coulombic efficiencies of Si—C nanocomposite nanofibers are maintained over 90% during 25 cycles. FIG. 7 illustrates that Si—C nanocomposite nanofibers have outstanding cyclabilities from 0.1 to 1 C. Conversely, SiNPs have very low capacities (e.g., about 50 mAh/g at 0.5 C, 0.8 C, and 1 C). The discharge capacities of the prepared Si—C nanocomposite nanofibers are 1,150 mAh/g at 0.5 C and 1,000 mAh/g at 0.8 C.

Table 3 illustrates cycling performance (at 0.1 C) of various Si/C nanocomposite nanofibers prepared according to the Examples.

TABLE 3

|  | Carbon | Specific capacity (mAh/g) | | | | |
| --- | --- | --- | --- | --- | --- | --- |
|  | content (from TGA) | 1st Cycle | 10$^{th}$ Cycle | 20$^{th}$ | 50$^{th}$ | 98$^{th}$ |
| Si NP | 0% | 3,310 | 509 | 131 | 22 | 13 |
| PVA/Si (1:1) | 3% | 2,548 | 1,446 | 1,161 | 908 | 463 |
| PVA/Si (2:1) | 8% | 2,091 | 1,851 | 1,607 | 1,011 | 286 |
| PVA/Si (4:1) | 14% | 1,845 | 1,688 | 1,540 | 1,074 | 411 |

Example 15—Si/C Nanocomposite Nanofibers without Gas Assistance

Using a procedure similar to that set forth in Examples 10 and 11, nanocomposite nanofibers comprising silicon nanofibers were prepared without gas assistance. FIG. 22 (panels A and B) illustrate TEM images of the resultant Si/polymer (PVA) nanocomposite nanofibers.

Example 16—Si/C Nanocomposite Nanofibers from PAN/DMF Stock

Fluid stock: is prepared similar to as set forth in Example 10 and Example 12, using polyacrylonitrile (PAN) as the polymer and dimethylformamide (DMF) as the solvent. Polyacrylonitrile (PAN) is combined with DMF. Silicon nanoparticles are added to the polymer solution, mixed and heated.

Nanofibers: the fluid stock is gas-assisted electrospun from a needle apparatus having an inner needle and an outer needle coaxially aligned, the inner needle providing the fluid stock, the outer needle providing the gas. The fluid stock is provided at a flow rate of 0.01 mL/min; the voltage used is 20 kV, the needle apparatus tip to collector distance is 15 cm.

Example 17—Si/C Nanocomposite Nanofibers without Gas Assistance

Using a procedure similar to that set forth in Example 16, nanocomposite nanofibers comprising silicon nanofibers were prepared without gas assistance. FIG. 22 (panels C and D) illustrate TEM images of the resultant Si/polymer (PAN) nanocomposite nanofibers.

Using a procedure similar to that set forth in Examples 10, 12, and 16, PAN/Si and PVA/Si polymer/Si nanocomposite nanofibers are prepared without gas assistance. The Si nanoparticles utilized in the fluid stock have an average diameter of about 100 nm. Thermal treating to carbonize the polymer is performed at 500 C. Table 4 illustrates the charge capacities of the resultant nanofibers (as lithium ion half cell anodes) at 400 mA/g.

TABLE 4

| Cycle | From PAN/Si (mAh/g) | From PVA/Si (mAh/g) |
|---|---|---|
| 1 | 382.1 | 49.2 |
| 2 | 117.9 | 40.8 |
| 3 | 89.3 | 38.3 |
| 4 | 78.6 | 36.7 |
| 5 | 75.0 | 35.8 |
| 6 | 71.4 | 34.2 |
| 7 | 71.4 | 33.3 |
| 8 | 67.9 | 33.3 |
| 9 | 67.9 | 32.5 |
| 10 | 67.9 | 31.7 |
| 11 | 64.3 | 31.7 |
| 12 | 64.3 | 30.8 |
| 13 | 64.3 | 30.0 |
| 14 | 64.3 | 30.0 |
| 15 | 64.3 | 29.2 |
| 16 | 64.3 | 29.2 |
| 17 | 60.7 | 28.3 |
| 18 | 60.7 | 28.3 |
| 19 | 60.7 | 28.3 |
| 20 | 60.7 | 27.5 |

Example 18—Hollow Si/C Nanocomposite Nanofibers

Fluid stock: is prepared similar to as set forth in Example 10, Example 12, and Example 16 using polyacrylonitrile (PAN) as the polymer and dimethylformamide (DMF) as the solvent. Polyacrylonitrile (PAN) is combined with DMF. Silicon nanoparticles are added to the polymer solution, mixed and heated.

Nanofibers: the fluid stock is gas-assisted electrospun from a needle apparatus having an inner needle and an outer needle coaxially aligned, the inner needle providing air, the outer needle providing the fluid stock. Additional gas assistance surrounding the fluid needle is optionally utilized. The gas and fluid stock is provided at a flow rate of 0.008 mL/min to 0.017 mL/min; the voltage used is 10-15 kV, the needle apparatus tip to collector distance is 10-15 cm.

Figure 24:
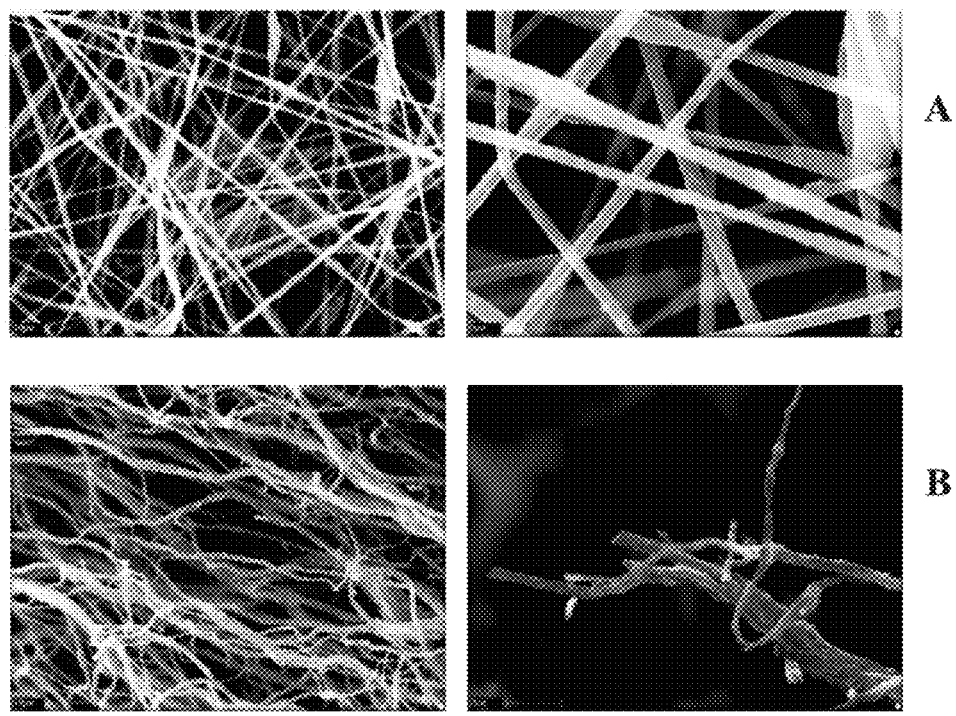
FIG. 24 illustrates SEM images of certain as spun polymer:Si (100 nm nanoparticles) (5:1) nanofibers (Panel A) and the calcined carbon-silicon nanocomposite nanofibers resulting therefrom (Panel B).

FIG. 24 illustrates as spun nanofibers using a polymer:Si nanoparticle ratio of 5:1, and Si nanoparticles having an average diameter of about 100 nm. The as-spun nanofibers are calcined under argon, producing carbon-silicon nanocomposite nanofibers having a carbon:silicon ratio of 1.9:1. Panel A illustrates SEM images of as-spun nanofibers; panel B illustrates SEM images of calcined nanofibers.

Figure 25:
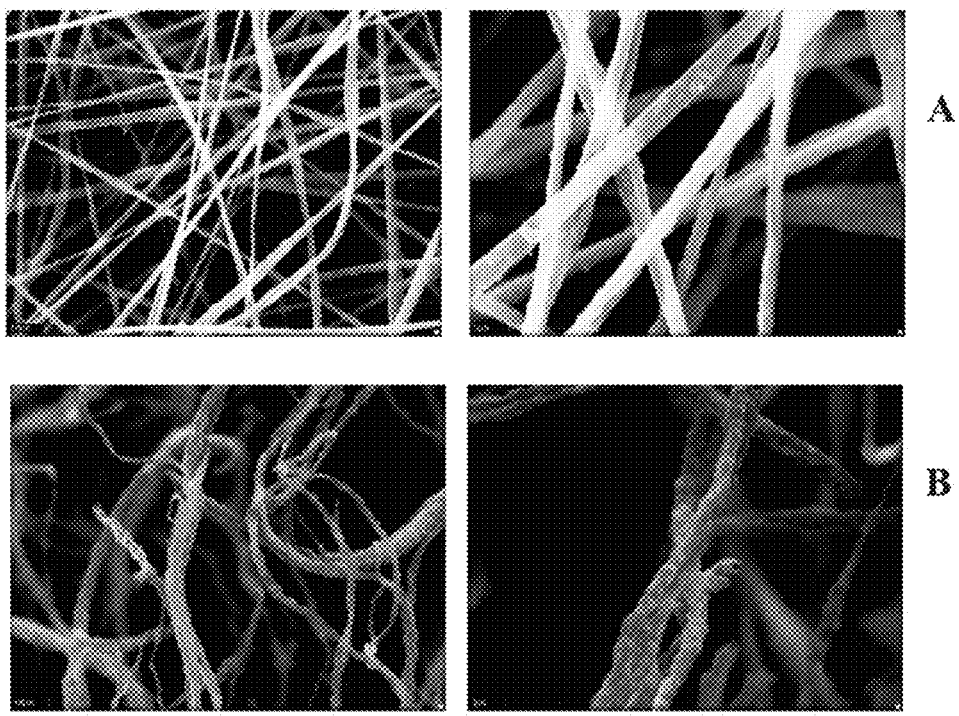
FIG. 25 illustrates SEM images of certain as spun polymer:Si (3.2:1) nanofibers (Panel A) and the calcined carbon-silicon nanocomposite nanofibers resulting therefrom (Panel B).

FIG. 25 illustrates as spun nanofibers using a polymer:Si nanoparticle ratio of 3.2:1, and Si nanoparticles having an average diameter of about 100 nm. The as-spun nanofibers are calcined under argon, producing carbon-silicon nanocomposite nanofibers having a carbon:silicon ratio of 1.2:1. Panel A illustrates SEM images of as-spun nanofibers; panel B illustrates SEM images of calcined nanofibers.

Figure 26:
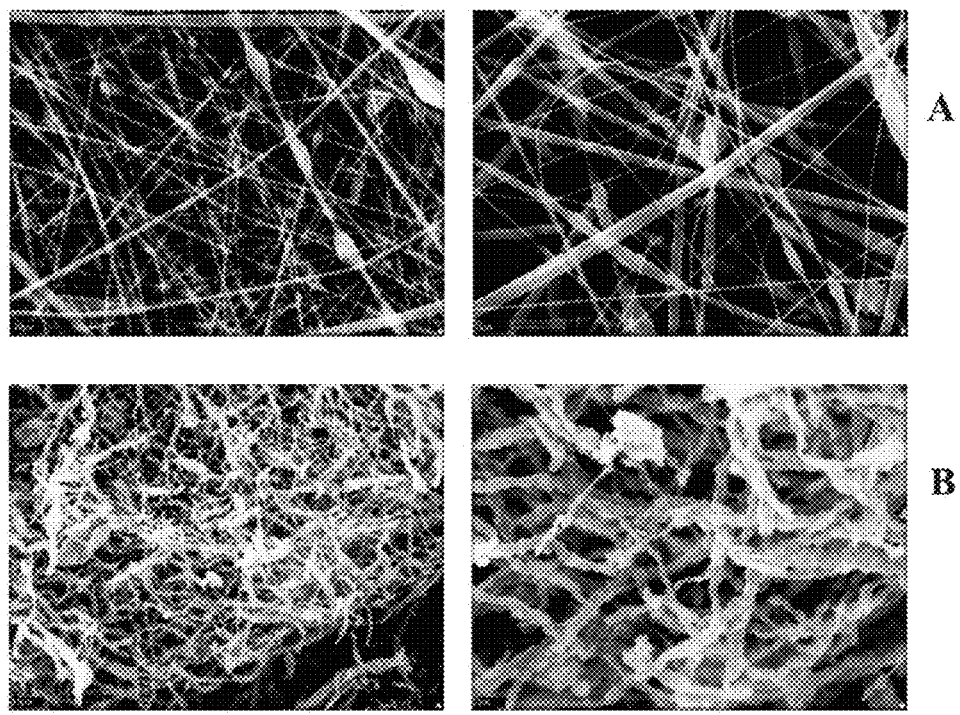
FIG. 26 illustrates SEM images of certain as spun polymer:Si (1.84:1) nanofibers (Panel A) and the calcined carbon-silicon nanocomposite nanofibers resulting therefrom (Panel B).

FIG. 26 illustrates as spun nanofibers using a polymer:Si nanoparticle ratio of 1.84:1, and Si nanoparticles having an average diameter of about 100 nm. The as-spun nanofibers are calcined under argon, producing carbon-silicon nanocomposite nanofibers having a carbon:silicon ratio of 0.7:1. Panel A illustrates SEM images of as-spun nanofibers; panel B illustrates SEM images of calcined nanofibers.

Figure 27:
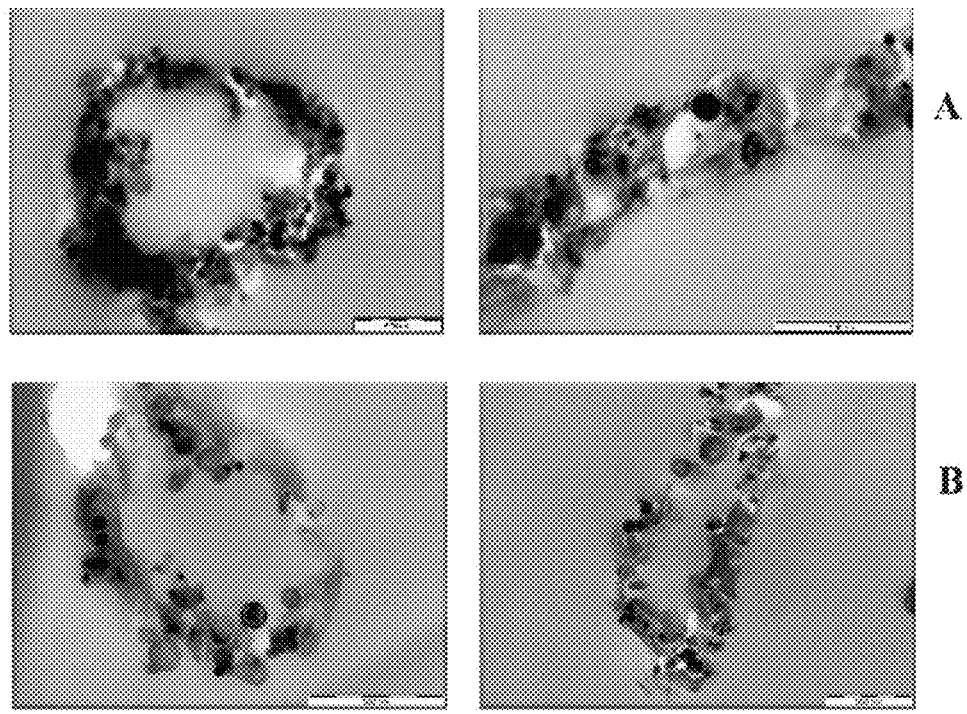
FIG. 27 illustrates a TEM image of microtomed hollow Si/C nanocomposite nanofibers described herein (from Si nanoparticles having an average diameter of 100 nm).

FIG. 27 illustrates a TEM image of microtomed hollow Si/C nanocomposite nanofibers described herein (from Si nanoparticles having an average diameter of 100 nm).

Figure 28:
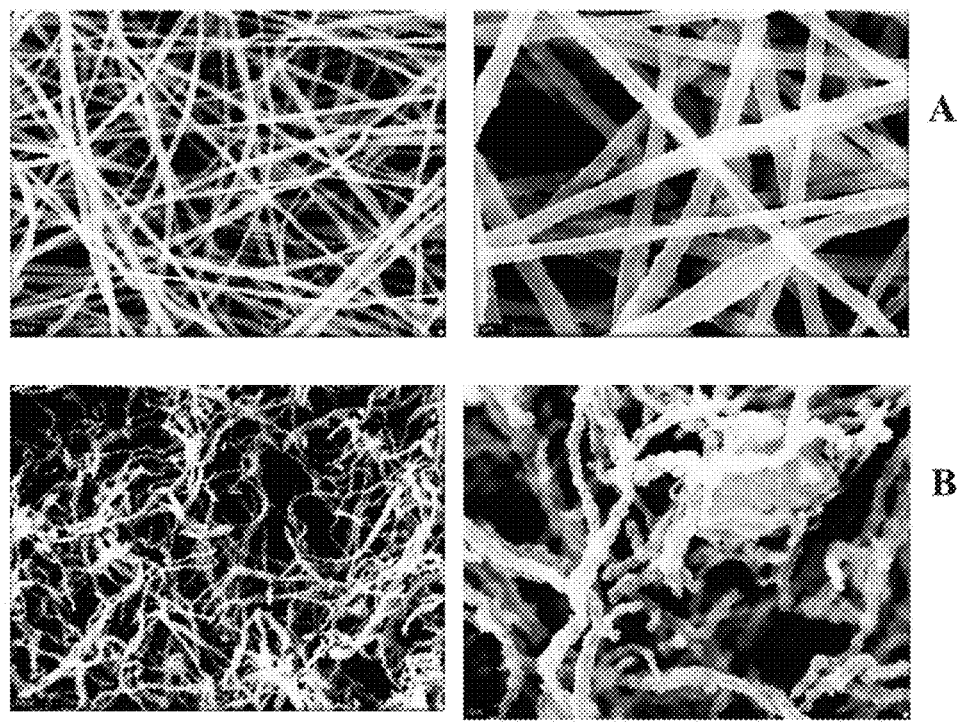
FIG. 28 illustrates SEM images of certain as-spun polymer-Si (50 nm nanoparticles) nanofibers (Panel A), and the calcined carbon-silicon nanocomposite nanofibers resulting therefrom (Panel B).

FIG. 28 illustrates as spun nanofibers using Si nanoparticles having an average diameter of about 50 nm. The as-spun nanofibers are calcined under argon, producing carbon-silicon nanocomposite nanofibers having a carbon:silicon ratio of 1:1. Panel A illustrates SEM images of as-spun nanofibers; panel B illustrates SEM images of calcined nanofibers.

Figure 29:
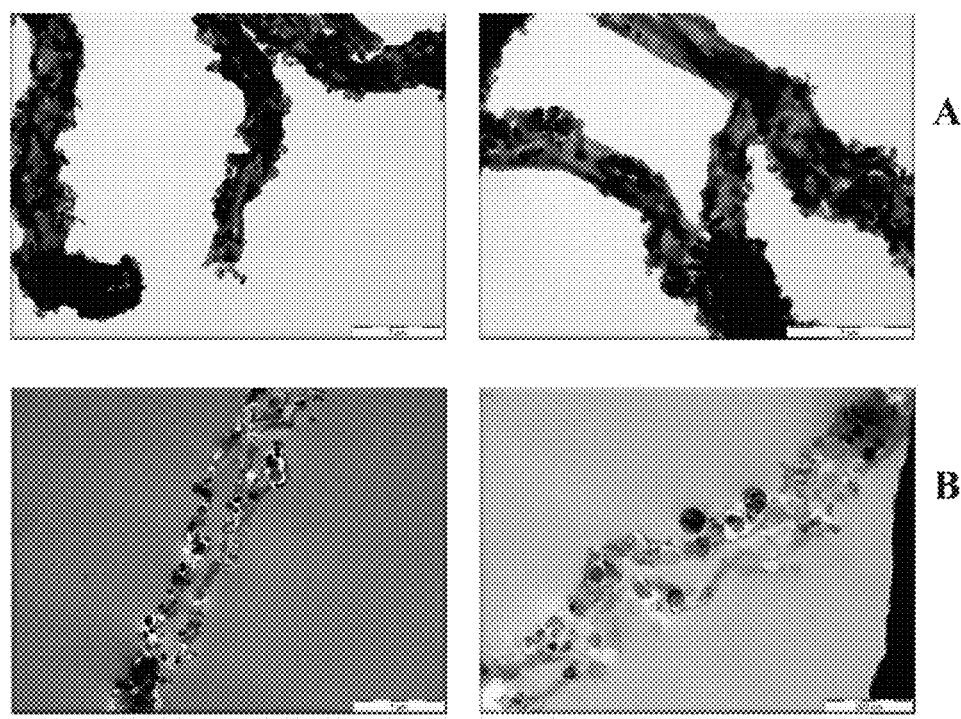
FIG. 29 illustrates TEM images of certain microtomed hollow carbon-Si (50 nm) nanocomposite nanofibers described herein.

FIG. 29 illustrates TEM images of microtomed hollow Si/C nanocomposite nanofibers described herein (from Si nanoparticles having an average diameter of 50 nm).

Hollow nanofibers prepared using Si nanoparticles with an average diameter of 50 nm are described in Table 5 (32 wt % Si in carbon matrix):

TABLE 5

| | All Materials | | Silicon | |
|---|---|---|---|---|
| Cycles | Discharge (mAh/g) | Charge (mAh/g) | Discharge (mAh/g) | Charge (mAh/g) |
| 1 | 1381.4 | 1062.3 | 4256.4 | 3273.3 |
| 2 | 1086.8 | 1045.0 | 3348.7 | 3220.1 |
| 3 | 1104.8 | 1070.8 | 3404.1 | 3299.4 |
| 4 | 1092.0 | 1063.4 | 3364.9 | 3276.7 |
| 5 | 1081.6 | 1059.6 | 3332.6 | 3265.0 |
| 6 | 1082.2 | 1060.3 | 3334.5 | 3267.1 |
| 7 | 1097.8 | 1075.6 | 3382.5 | 3314.4 |
| 8 | 1079.1 | 1056.7 | 3324.9 | 3256.1 |
| 9 | 1175.3 | 1146.1 | 3621.5 | 3531.6 |
| 10 | 1360.0 | 1318.3 | 4190.7 | 4062.1 |
| 11 | 1349.7 | 1315.4 | 4148.7 | 4053.0 |
| 12 | 1316.5 | 1291.8 | 4056.6 | 3980.5 |
| 13 | 1317.9 | 1289.9 | 4060.8 | 3974.7 |
| 14 | 1303.9 | 1271.7 | 4017.6 | 3918.6 |
| 15 | 1295.6 | 1261.1 | 3992.2 | 3885.8 |
| 16 | 1276.9 | 1246.5 | 3934.6 | 3841.0 |

Hollow nanofibers prepared using Si nanoparticles with an average diameter of 100 nm are described in Table 6 (50 wt % Si in carbon matrix):

TABLE 6

| | All materials | | Silicon | |
|---|---|---|---|---|
| Cycles | DChg(mAh/g) | Chg(mAh/g) | DChg(mA/gh) | Chg(mAh/g) |
| 1 | 1171.5 | 878.1 | 2332.7 | 1748.6 |
| 2 | 977.4 | 928.6 | 1946.1 | 1849.0 |
| 3 | 982.9 | 944.3 | 1957.2 | 1880.3 |
| 4 | 989.4 | 958.9 | 1970.1 | 1909.4 |
| 5 | 992.1 | 963.0 | 1975.4 | 1917.6 |
| 6 | 997.0 | 968.9 | 1985.3 | 1929.2 |
| 7 | 993.0 | 973.6 | 1977.4 | 1938.7 |
| 8 | 996.2 | 977.0 | 1983.6 | 1945.4 |
| 9 | 996.4 | 971.1 | 1984.1 | 1933.8 |
| 10 | 994.1 | 973.5 | 1979.5 | 1938.5 |
| 11 | 988.2 | 967.4 | 1967.7 | 1926.4 |
| 12 | 984.1 | 964.0 | 1959.6 | 1919.5 |
| 13 | 975.2 | 954.9 | 1941.9 | 1901.4 |
| 14 | 969.1 | 947.9 | 1929.6 | 1887.5 |
| 15 | 967.6 | 946.0 | 1926.7 | 1883.7 |
| 16 | 958.9 | 934.7 | 1909.4 | 1861.2 |

TABLE 6-continued

| | All materials | | Silicon | |
|---|---|---|---|---|
| Cycles | DChg(mAh/g) | Chg(mAh/g) | DChg(mA/gh) | Chg(mAh/g) |
| 17 | 958.2 | 932.0 | 1908.0 | 1855.9 |
| 18 | 954.3 | 926.7 | 1900.2 | 1845.3 |
| 19 | 947.4 | 920.7 | 1886.6 | 1833.3 |
| 20 | 945.1 | 924.8 | 1881.9 | 1841.4 |
| 21 | 931.7 | 906.7 | 1855.2 | 1805.4 |
| 22 | 926.9 | 902.0 | 1845.6 | 1796.1 |
| 23 | 922.6 | 897.3 | 1837.1 | 1786.7 |
| 24 | 911.4 | 882.4 | 1814.7 | 1757.1 |
| 25 | 901.0 | 875.3 | 1794.0 | 1742.9 |
| 26 | 891.6 | 865.1 | 1775.4 | 1722.5 |
| 27 | 879.7 | 850.9 | 1751.7 | 1694.3 |
| 28 | 870.2 | 842.2 | 1732.7 | 1677.1 |
| 29 | 856.4 | 829.9 | 1705.4 | 1652.5 |
| 30 | 849.1 | 821.7 | 1690.8 | 1636.2 |
| 31 | 837.1 | 805.8 | 1666.9 | 1604.6 |
| 32 | 827.8 | 798.8 | 1648.2 | 1590.6 |

Example 19: Nanofiber Having a Continuous Core Matrix of a Lithium (Metal Oxide)-Containing-Material A first composition is prepared by combining 0.5 g PVA (79 kDa, 88% hydrolyzed) with 4.5 g water. The first composition is heated to 95 C for at least 8 hours. A second composition is prepared by combining 1 g water, 0.5 g acetic acid, 3 drops x-100 surfactant, lithium acetate (hydrate) and one or more metal precursor (e.g., cobalt acetate (hydrate), manganese acetate (hydrate), nickel acetate (hydrate)). The second composition is mixed for at least 4 hours. The first and second compositions are combined and mixed for at least 2 hours to form a fluid stock.

The fluid stock is electrospun in a coaxial gas assisted manner, using a flow rate of 0.01 mL/min, a voltage of 20 kV and a tip to collector distance of 15 cm. The fluid stock is also electrospun without coaxial gas assistance, using a flow rate of 0.005 mL/min, a voltage of 20 kV and a tip to collector distance of 18 cm. Electrospinning of the fluid stock prepares an as-spun precursor nanofiber, which is subsequently thermally treated.

A one step thermal treatment procedure involves treating the as-spun nanofibers in air at about 700 C (with a heat/cool rate of 2 C/min) for 5 hours. A two step thermal treatment procedure involves a first thermal treatment under argon at about 700 C (with a heat/cool rate of 2 C/min) for 5 hours, and a second thermal treatment under air at about 500 C (with a heat/cool rate of 2 C/min).

Example 20: $LiCoO_2$ Nanofibers

Using a gas assisted procedure of Example 19, wherein cobalt acetate is utilized as the metal precursor, lithium cobalt oxide nanofibers are prepared. Nanofibers are prepared using 1:1, 1:1.5, and 1:2 molar ratios of cobalt acetate-to-lithium acetate.

Figure 30:
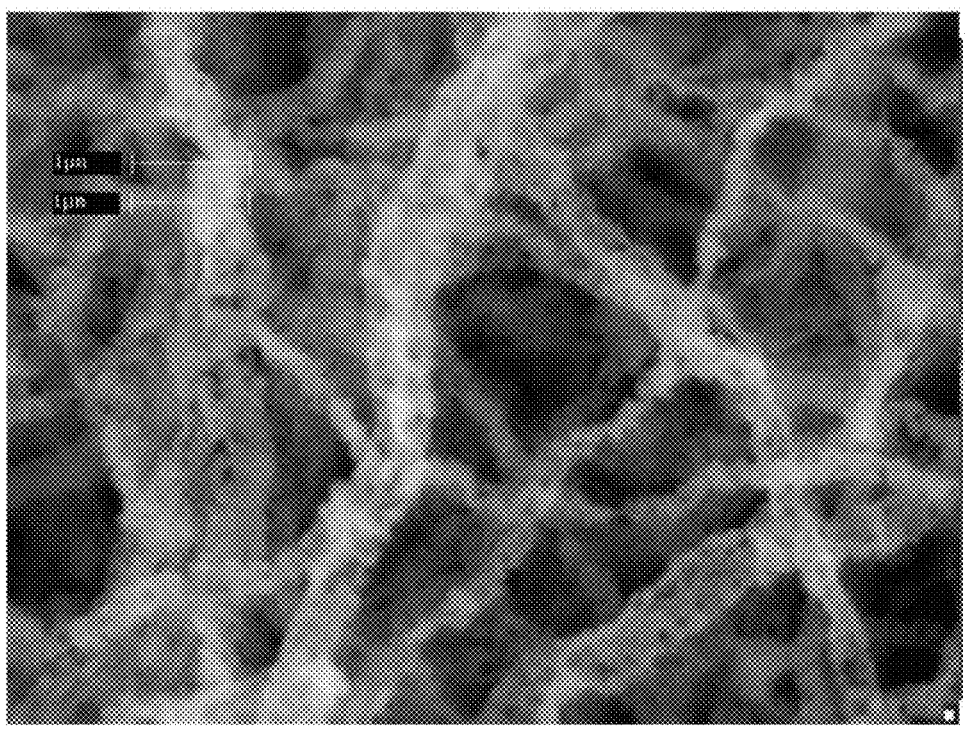
FIG. 30 illustrates an SEM image of lithium cobalt oxide nanofibers (Panel A); and SEM images of lithium cobalt oxide nanofibers prepared using 1:1, 1:1.5, and 1:2 molar ratios of cobalt acetate-to-lithium acetate (Panel B).
Figure 30:
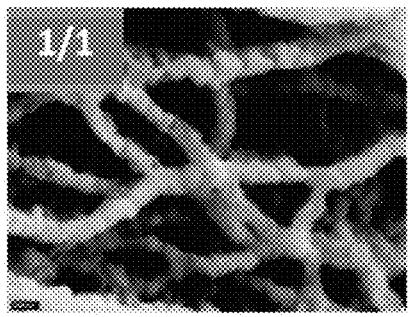
Figure 30:
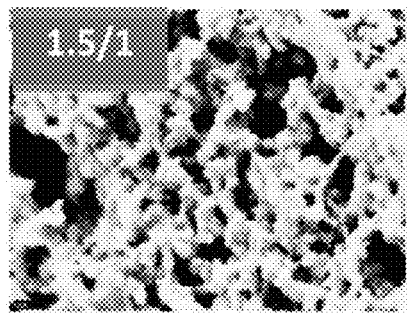
Figure 30:
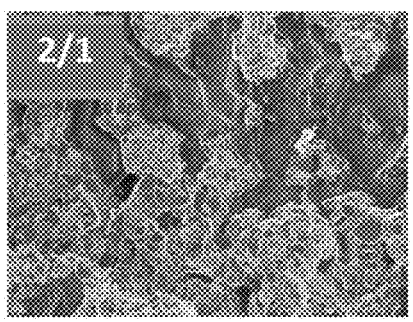
Figure 30:
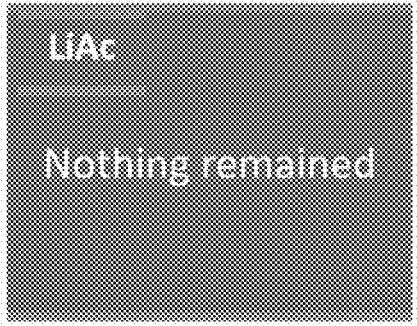
Figure 31:
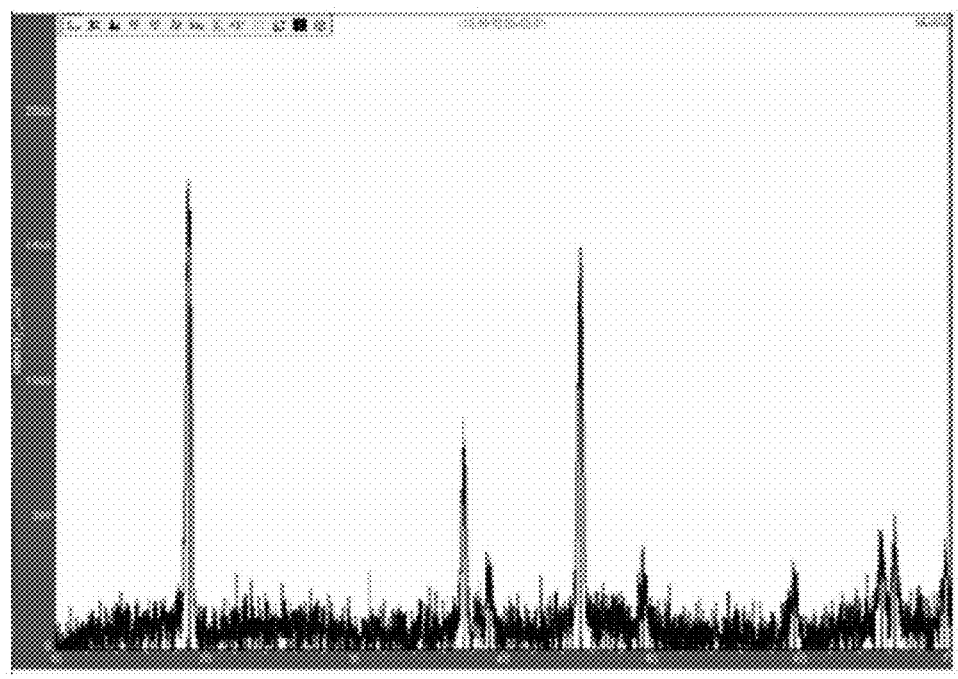
FIG. 31 (panel A) illustrates the XRD pattern for the lithium cobalt oxide nanofibers and illustrates the XRD pattern (panel B) for nanofibers prepared using 1:1, 1:1.5, and 1:2 molar ratios of cobalt acetate-to-lithium acetate.
Figure 31:
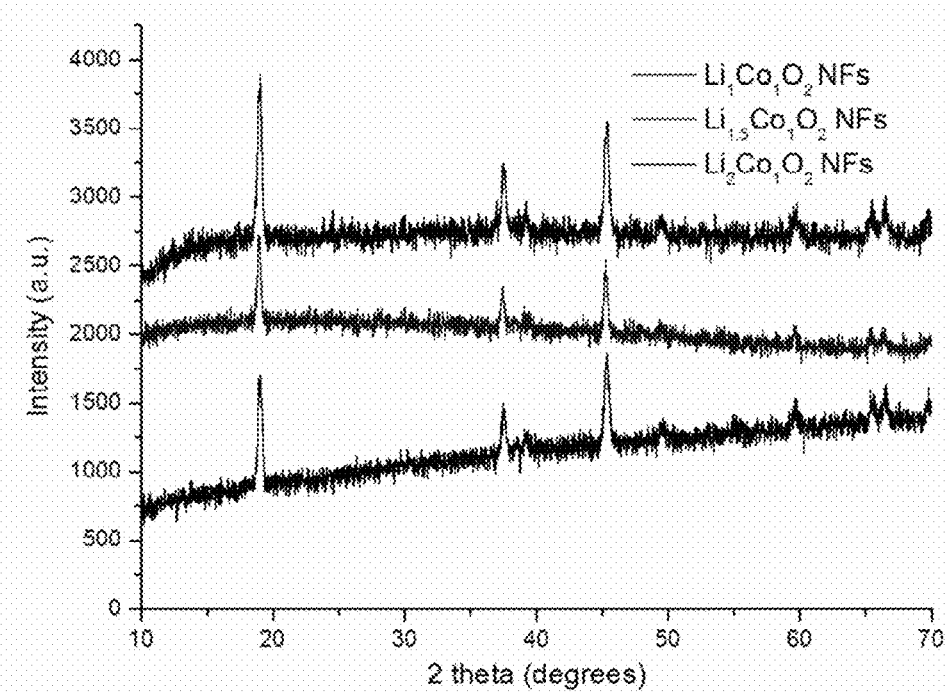

FIG. 30 illustrates an SEM image of such nanofibers (panel A). FIG. 30 (panel B) also illustrates SEM images such nanofibers prepared using 1:1, 1:1.5, and 1:2 molar ratios of cobalt acetate-to-lithium acetate (ratios in the figure are inverted). FIG. 31 (panel A) illustrates the XRD pattern for the lithium cobalt oxide nanofibers and illustrates the XRD pattern (panel B) for nanofibers prepared using 1:1, 1:1.5, and 1:2 molar ratios of cobalt acetate-to-lithium acetate (ratios in the figure are inverted). FIG. 32 illustrates the charge/discharge capacities for lithium cobalt oxide prepared using a one step thermal process (panel A) and a two step thermal process (panel B). The lithium cobalt oxide nanofibers produced is observed to have an initial capacity of about 120 mAh/g at 0.1 C.

Table 7 illustrates charge capacities determined using the various lithium-metal ratios and the one and two step thermal treatment processes.

TABLE 7

| Li:Co (ratio for stock) | Thermal Treatment | Charge capacity (mAh/g) |
|---|---|---|
| 1:1 | 700 C./air | N/A |
| 1.5:1 | 700 C./air | 67 |
| 2:1 | 700 C./air | 89 |
| 2:1 | 1. 700 C./Ar<br>2. 300 C./air | 50 |
| 2:1 | 1. 700 C./Ar<br>2. 700 C./air | 110 |

Example 21: $Li(Ni_xCo_yMn_z)O_2$ Nanofibers

Using a gas assisted procedure of Example 19, wherein nickel acetate, cobalt acetate, and manganese acetate are utilized as the metal precursor, $Li_a(Ni_x Co_yMn_z)O_2$ nanofibers are prepared. Nanofibers are prepared using 1:1, 1:1.5, and 1:2 molar ratios of the combined nickel/cobalt/manganese acetate-to-lithium acetate. Various molar ratios of nickel acetate (x) to cobalt acetate (y) to manganese acetate (z) are utilized.

Figure 33:
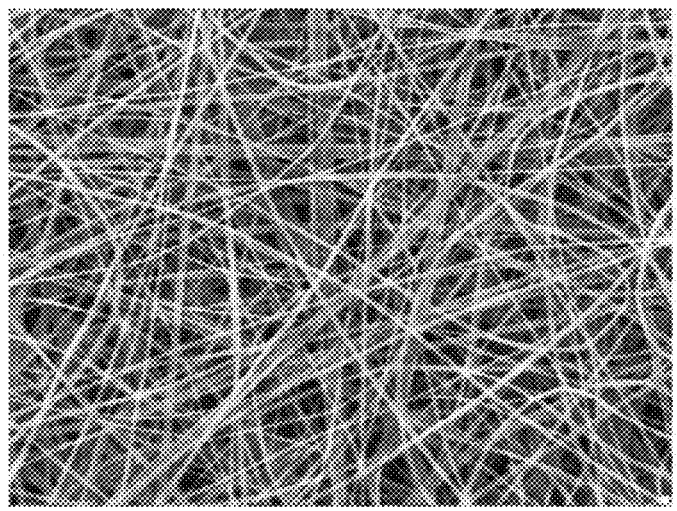
FIG. 33 (panel A) illustrates an SEM image of as-spun nanofibers comprising polymer and metal (lithium, nickel, cobalt, manganese) precursor. Panel B illustrates an SEM image of thermally treated lithium (nickel/cobalt/manganese) oxide nanofibers (treated at 650 C in air). Panel C illustrates a TEM image of the thermally treated nanofibers.
Figure 33:
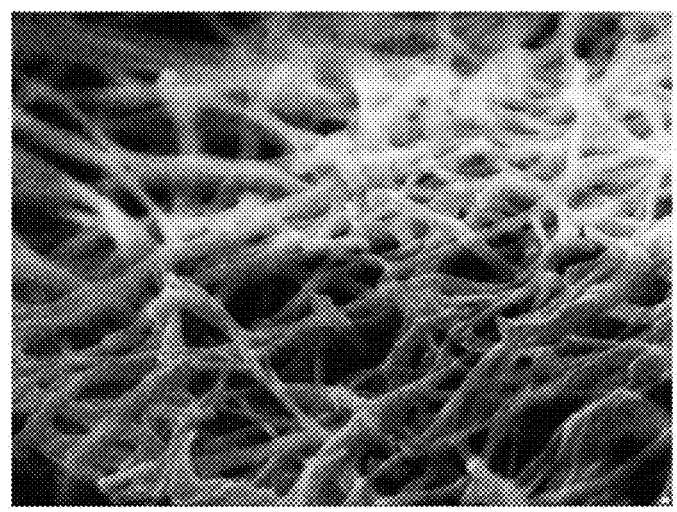
Figure 33:
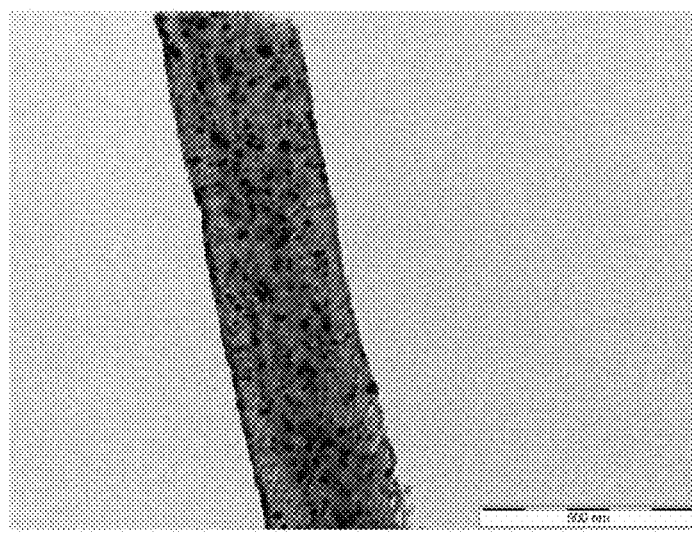
Figure 34:
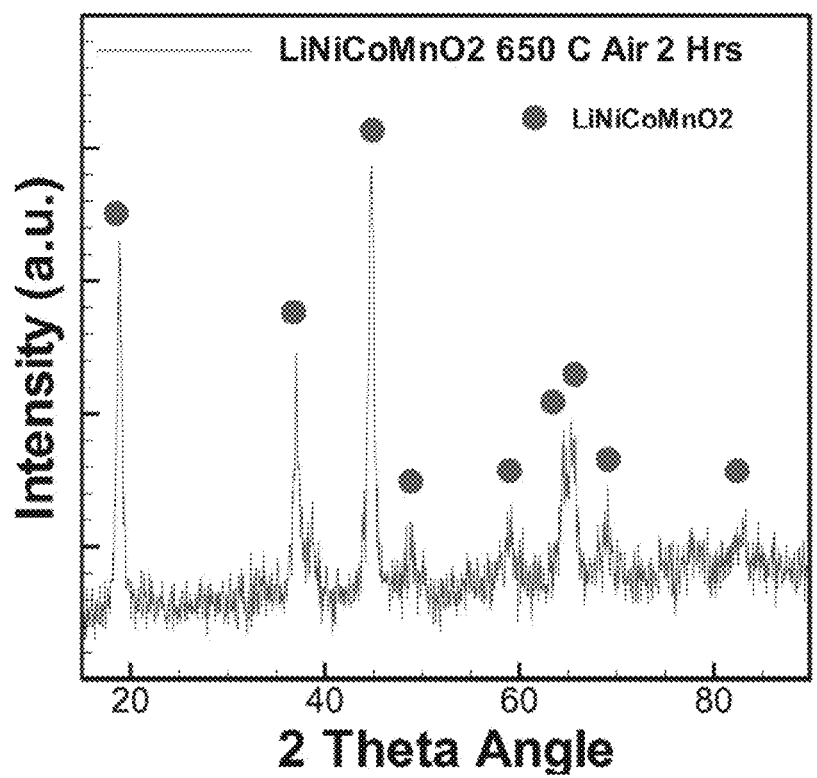
FIG. 34 illustrates the XRD pattern for certain lithium (nickel/cobalt/manganese) oxide nanofibers.
Figure 35:
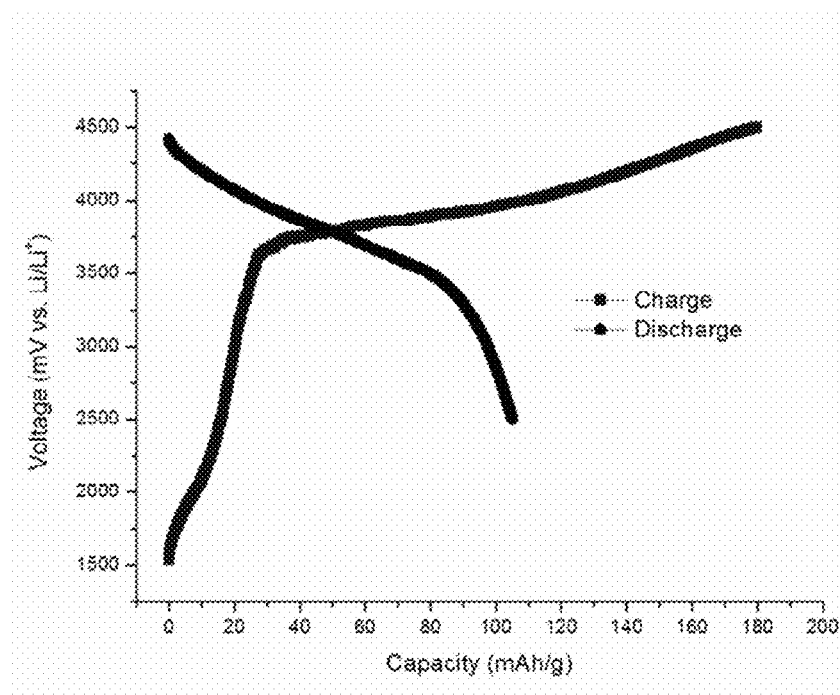
FIG. 35 illustrates the charge/discharge capacities for certain lithium (nickel/cobalt/manganese) oxide nanofibers prepared.

FIG. 33 (panel A) illustrates an SEM image of as-spun nanofibers prepared using a 1:1:1 ratio of x:y:z. Panel B illustrates an SEM image of thermally treated $(Li(N_{1/3} Co_{1/3}Mn_{1/3})O_2)$ nanofibers (treated at 650 C in air). Panel C illustrates a TEM image of the thermally treated nanofibers. FIG. 34 illustrates the XRD pattern for the thermally treated nanofibers. FIG. 35 illustrates the charge/discharge capacities for 1:1:1 (x:y:z) nanofibers prepared. The nanofibers produced is observed to have an initial capacity of about 180 mAh/g at 0.1 C.

Figure 36:
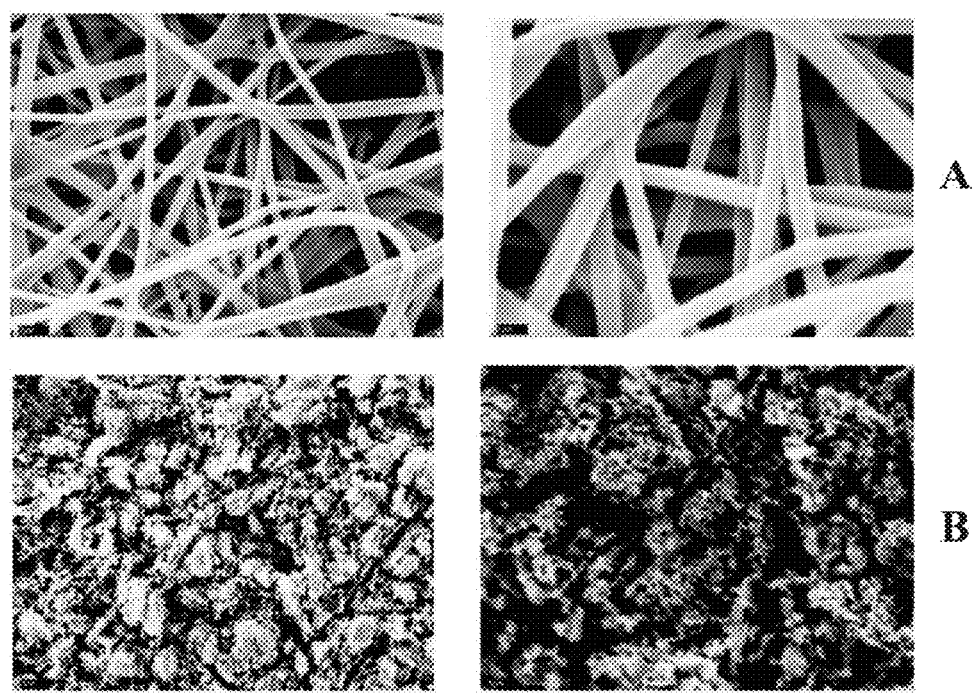
FIG. 36 illustrates SEM images for $Li[Li_{0.2}Mn_{0.56}Ni_{0.16}Co_{0.08}]O_2$ nanofibers (Panel B) and the pre-treatment, as-spun precursor nanofibers therefor (Panel A).
Figure 37:
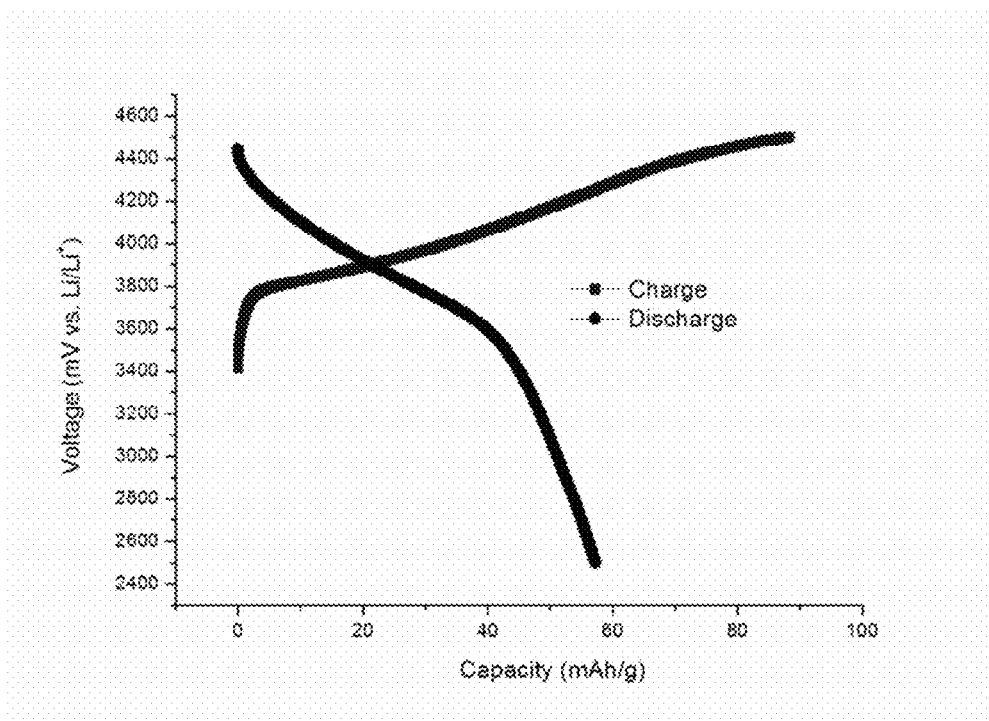
FIG. 37 illustrates the charge/discharge capacities for $Li[Li_{0.2}Mn_{0.56}Ni_{0.16}Co_{0.08}]O_2$ nanofibers.

Using similar procedures, $Li[Li_{0.2}Mn_{0.56}Ni_{0.16} Co_{0.08}]O_2$ nanofibers are also prepared. FIG. 36 illustrates the as-spun and thermally treated (900 C for 5 hours under argon) nanofibers. FIG. 37 illustrates the charge/discharge capacities for nanofibers prepared. The nanofibers produced is observed to have an initial capacity of about 90 mAh/g at 0.1 C.

Figure 38:
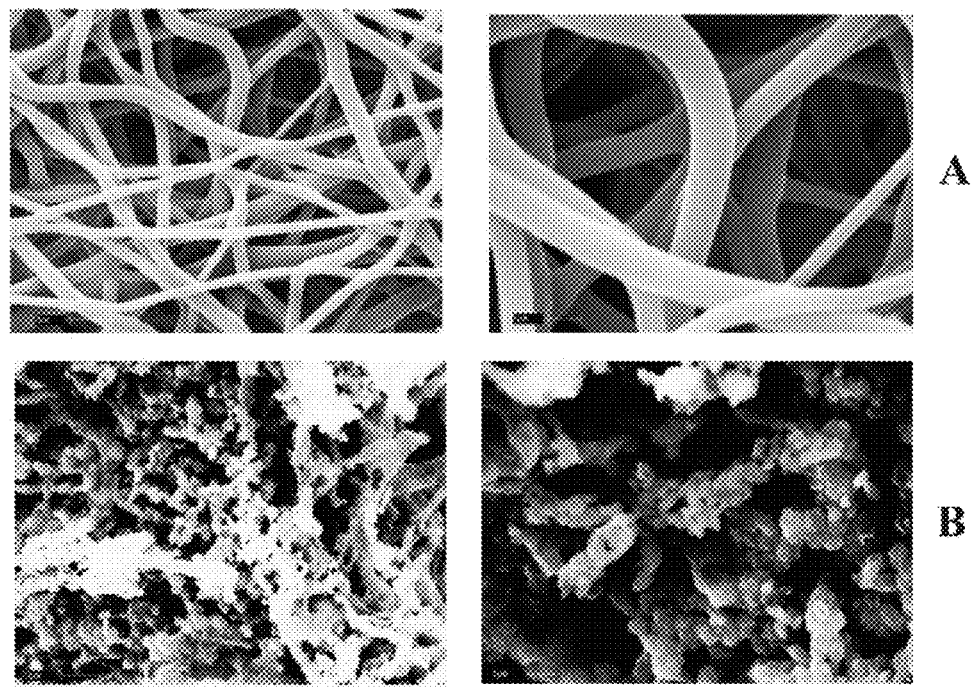
FIG. 38 illustrates SEM images for $Li_{0.8}Mn_{0.4}Ni_{0.4}Co_{0.4}O_2$ nanofibers (Panel B) and the pre-treatment, as-spun precursor nanofibers therefor (Panel A).

Using similar procedures, $Li_{0.8}Mn_{0.4}Ni_{0.4} Co_{0.4}O_2$ nanofibers are prepared. FIG. 38 (panel A) illustrates as-spun nanofibers and (panel B) thermally treated (900 C for 5 hours under argon) nanofibers.

Example 22: $LiMn_2O_4$ Nanofibers

Using a gas assisted procedure of Example 19, wherein manganese acetate is utilized as the metal precursor, $LiMn_2O_4$ nanofibers are prepared. Nanofibers are prepared using 2:1, 3:2 (50% excess lithium acetate), and 1:1 (100% excess lithium acetate) molar ratios of the manganese acetate-to-lithium acetate.

Figure 39:
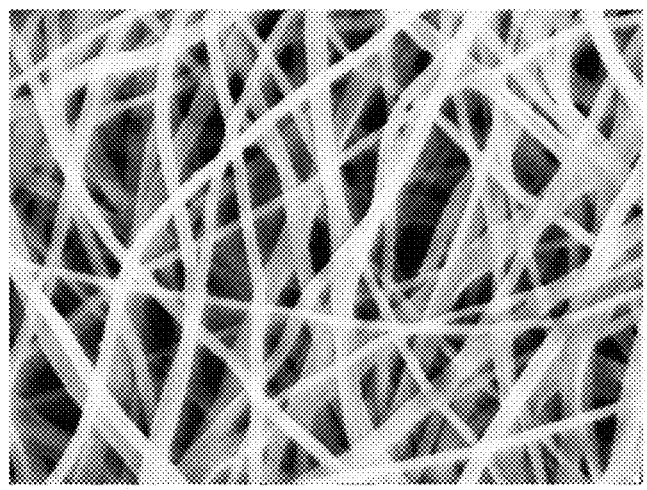
FIG. 39 illustrates SEM images of certain as-spun nanofibers (from a stock prepared by combining polymer, lithium acetate and manganese acetate) (Panel A), and lithium manganese oxide nanofibers (Panel B). Panel C illustrates a TEM image of certain lithium manganese oxide nanofibers.
Figure 39:
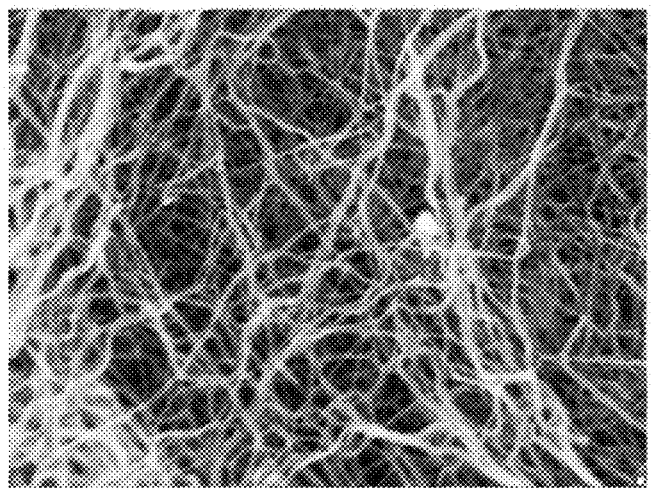
Figure 39:
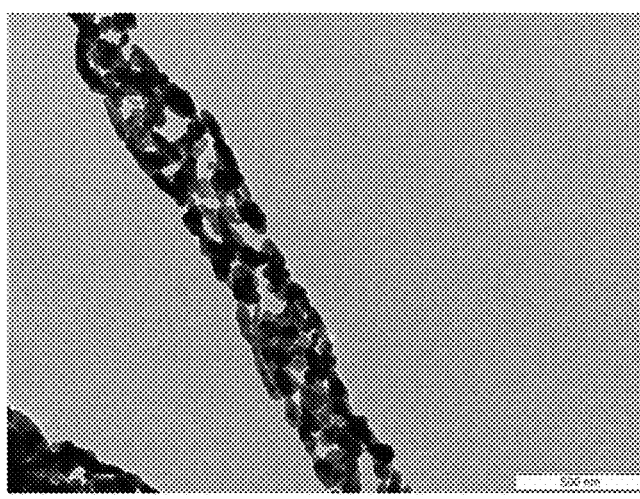
Figure 40:
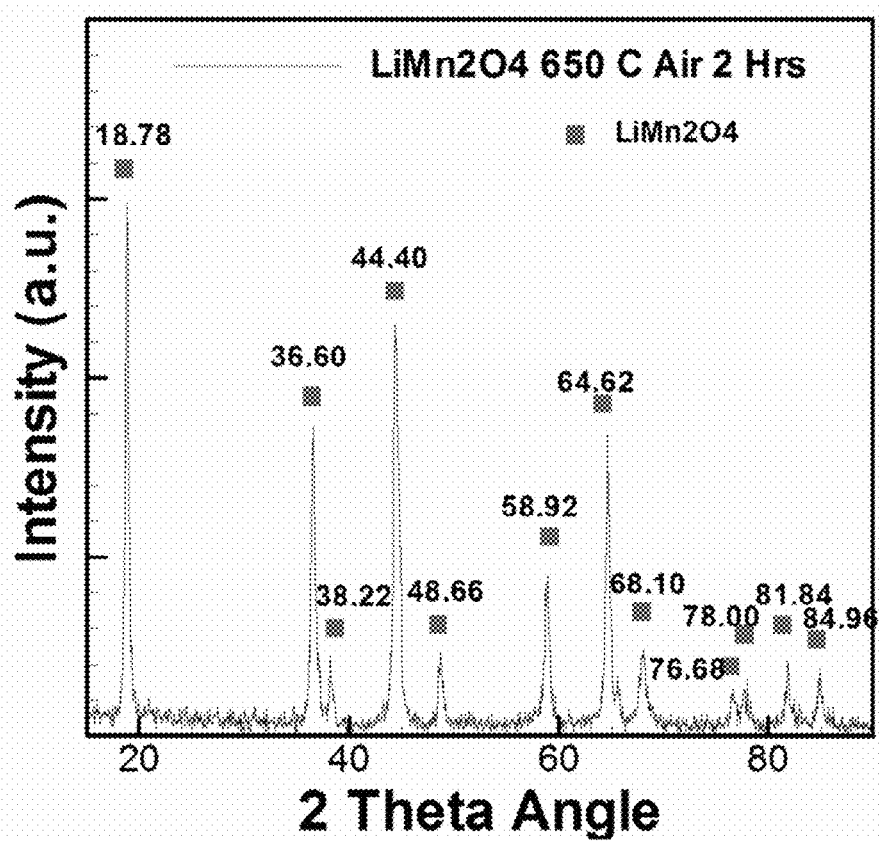
FIG. 40 illustrates the XRD pattern for certain lithium manganese oxide nanofibers.

FIG. 39 (panel A) illustrates an SEM image of as-spun nanofibers. Panel B illustrates an SEM image of thermally treated nanofibers (treated at 650 C in air). Panel C illustrates a TEM image of the thermally treated nanofibers. FIG. 40 illustrates the XRD pattern for the thermally treated nanofibers. FIG. 41 illustrates the charge/discharge capacity of the nanofibers for about 40 cycles. The lithium manganese oxide nanofibers produced is observed to have an initial capacity of about 95 mAh/g at 0.1 C.

Example 23: Li(Ni$_x$Mn$_z$)O$_4$ Nanofibers

Figure 42:
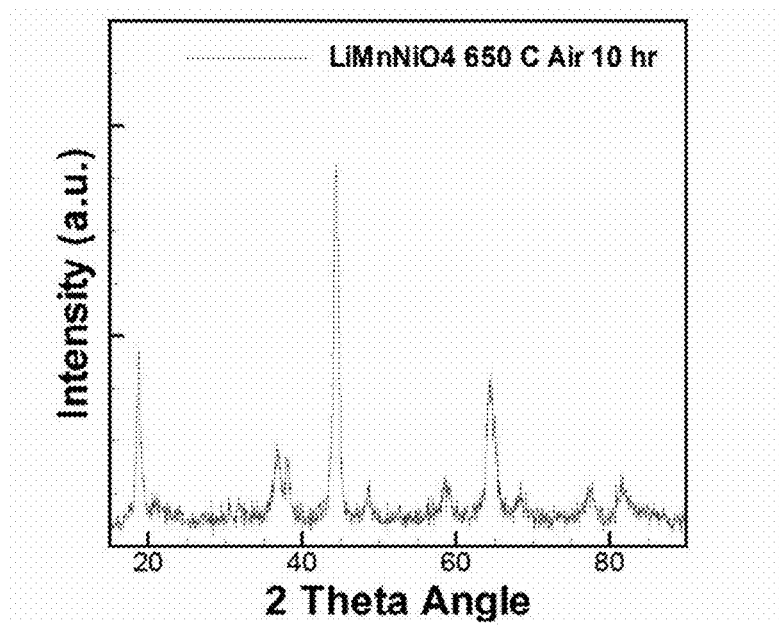
FIG. 42 illustrates an XRD pattern for certain lithium (nickel/manganese) oxide nanofibers.

Using a gas assisted procedure of Example 19, wherein nickel acetate and manganese acetate are utilized as the metal precursor, Li(Ni$_x$Mn$_z$)O$_4$ nanofibers are prepared. Nanofibers are prepared using 2:1, 3:2, and 1:1 molar ratios of the combined nickel/manganese acetate-to-lithium acetate. Various molar ratios of nickel acetate (x) to manganese acetate (z) are utilized (e.g., 1:3 for Li(Ni$_{0.5}$Mn$_{1.5}$)O$_4$). FIG. 42 illustrates the XRD pattern for the thermally treated nanofibers.

Example 24: Nanofiber Having a Continuous Core Matrix of a Lithium (Metal Phosphate)-Containing-Material A first composition is prepared by combining 0.5 g PVA (79 kDa, 88% hydrolyzed) with 4.5 g water. The first composition is heated to 95 C for at least 8 hours. A second composition is prepared by combining 1 g water, 0.5 g acetic acid, 3 drops x-100 surfactant, lithium acetate (hydrate), one or more metal precursor (e.g., iron acetate (hydrate), cobalt acetate (hydrate), manganese acetate (hydrate), nickel acetate (hydrate)), and a phosphorus precursor (e.g., triethylphosphite). The second composition is mixed for at least 4 hours. The first and second compositions are combined and mixed for at least 2 hours to form a fluid stock.

The fluid stock is electrospun in a coaxial gas assisted manner, using a flow rate of 0.01 mL/min, a voltage of 20 kV and a tip to collector distance of 15 cm. The fluid stock is also electrospun without coaxial gas assistance, using a flow rate of 0.005 mL/min, a voltage of 20 kV and a tip to collector distance of 18 cm. Electrospinning of the fluid stock prepares an as-spun precursor nanofiber, which is subsequently thermally treated.

A one step thermal treatment procedure involves treating the as-spun nanofibers in air at about 700 C (with a heat/cool rate of 2 C/min) for 5 hours. A two step thermal treatment procedure involves a first thermal treatment under argon at about 700 C (with a heat/cool rate of 2 C/min) for 5 hours, and a second thermal treatment under air at about 500 C (with a heat/cool rate of 2 C/min).

Example 25: LiFePO$_4$ Nanofibers

Using a gas assisted procedure of Example 6, wherein iron acetate is utilized as the metal precursor, lithium iron phosphate nanofibers are prepared. Nanofibers are prepared using 1:1, 1:1.5, and 1:2 molar ratios of iron acetate-to-lithium acetate.

Figure 43:
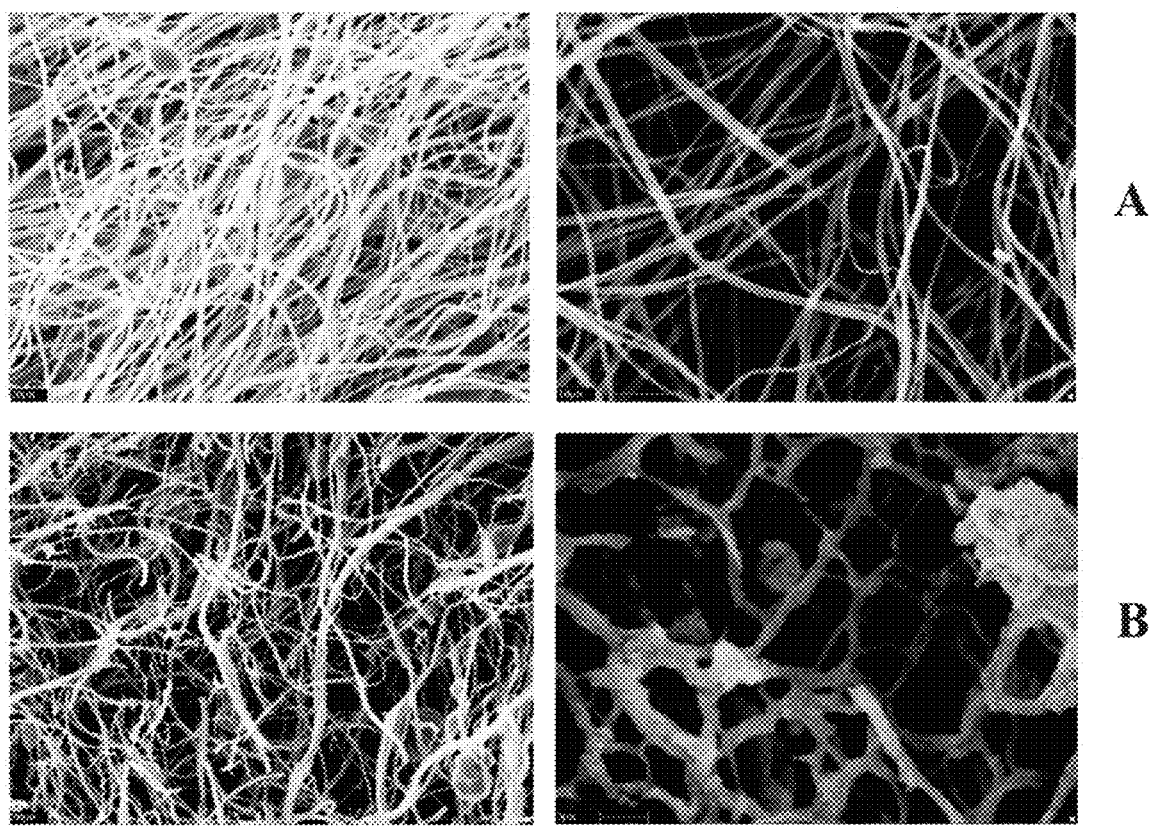
FIG. 43 illustrates SEM images for certain lithium iron phosphate nanofibers (Panel B) and the pre-treatment, as-spun precursor nanofibers therefor (Panel A).
Figure 44:
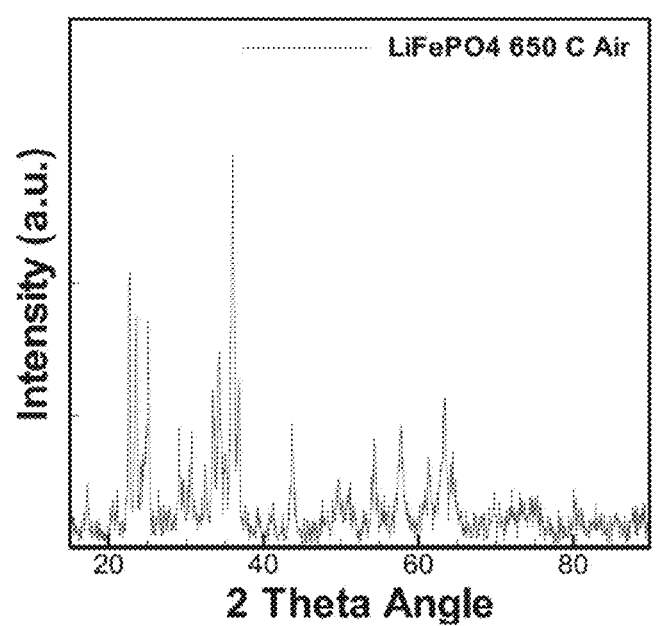
FIG. 44 illustrates an XRD pattern for certain lithium iron phosphate nanofibers.

FIG. 43 illustrates an SEM image of the as-spun nanofibers (panel A) and thermally treated nanofibers (panel B). FIG. 44 illustrates the XRD pattern for the lithium iron phosphate nanofibers.

Example 26: Nanofiber Having a Lithium (Sulfide/Sulfate)-Containing-Material A first composition is prepared by combining 0.5 g PVA (79 kDa, 88% hydrolyzed) with 4.5 g water. The first composition is heated to 95 C for at least 8 hours. A second composition is prepared by combining 1 g water, 0.5 g acetic acid, 3 drops x-100 surfactant, lithium acetate (hydrate), and a sulfur precursor (e.g., elemental sulfur, such as sulfur nanoparticles). The second composition is mixed for at least 4 hours. The first and second compositions are combined and mixed for at least 2 hours to form a fluid stock.

The fluid stock is electrospun in a coaxial gas assisted manner, using a flow rate of 0.01 mL/min, a voltage of 20 kV and a tip to collector distance of 15 cm. The fluid stock is also electrospun without coaxial gas assistance, using a flow rate of 0.005 mL/min, a voltage of 20 kV and a tip to collector distance of 18 cm. Electrospinning of the fluid stock prepares an as-spun precursor nanofiber, which is subsequently thermally treated.

Figure 45:
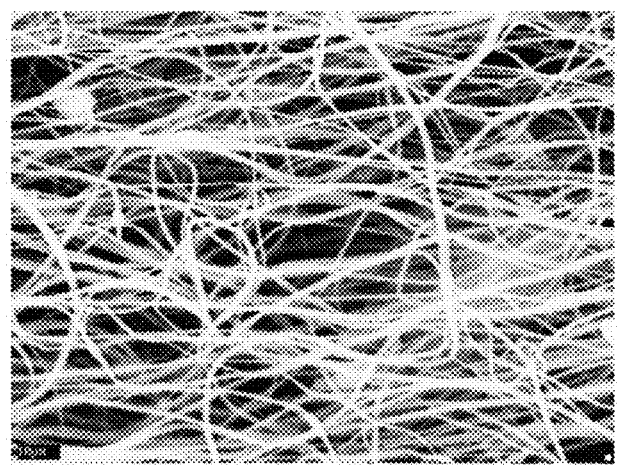
FIG. 45 illustrates SEM images for certain lithium sulfide containing (with carbon) nanofibers (Panel B) and the pre-treatment, as-spun precursor nanofibers therefor (Panel A). Panel C illustrates a TEM image of the lithium sulfide containing nanofibers.
Figure 45:
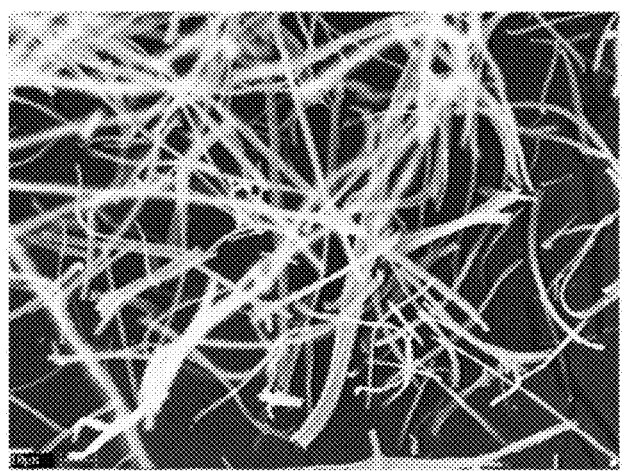
Figure 45:
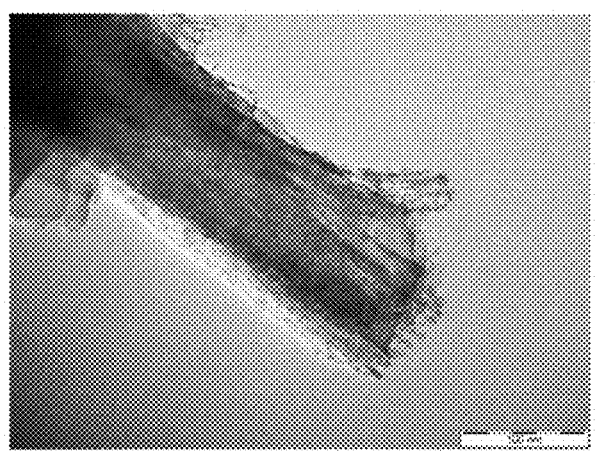
Figure 46:
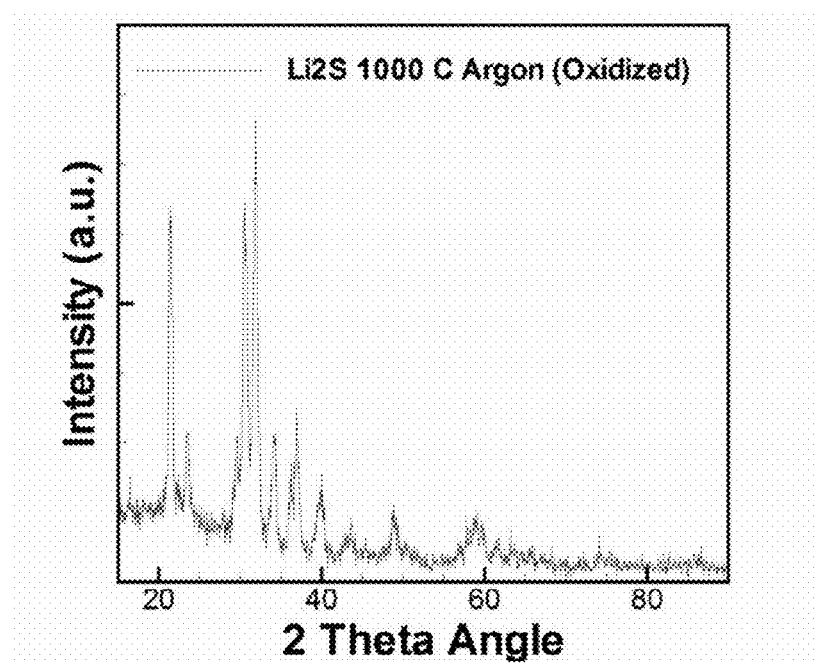
FIG. 46 illustrates the XRD pattern for lithium sulfate containing (with carbon) nanofibers.

The thermal treatment occurs under argon at about 1000 C (with a heat/cool rate of 2 C/min) for 5 hours for preparation of lithium sulfide containing fibers (Li$_2$S/Carbon nanocomposites). Subsequent air oxidation provides lithium sulfate containing fibers (Li$_2$SO$_4$/Carbon nanocomposites). FIG. 45 illustrates an SEM image of the as-spun nanofibers (panel A) and thermally treated nanofibers (panel B). Panel C illustrates a TEM image of the thermally treated nanofibers. FIG. 46 illustrates the XRD pattern for the oxidized nanofibers.

For fabricating the half cells, Li metal is used as a counter electrode and polyethylene (ca. 25 μm thickness) is inserted as a separator between working electrode and counter electrode. The mass of working electrode is 3~4 mg/cm$^2$. The coin cell-typed Li-ion batteries are assembled in Ar-filled glove box with electrolyte. The cut off voltage during the galvanostatic tests is 0.01~2.0 V for anode and 2.5~4.2 V by using battery charge/discharge cyclers from MTI.

Example 27—Nanoclay in Polymer Matrix

A first composition is prepared by combining preformed nanoclay (e.g., montmorillonite clay, Bentonite Nanomer® PGV) or nanoceramic with a solvent. In one example, 0.03 g of clay is suspended in 1 g DMF. A second composition is prepared by combining a polymer and a solvent. In one example, 0.63 g polyacrylonitrile (PAN) (e.g., MW=1,000 to 1,000,000, such as 150,000 g/mol) is combined with 5 g DMF. The first and second compositions are combined and mixed (e.g., stirring, sonication, or the like). The solution is mixed for 5 hours to create a fluid stock.

The fluid stock is electrospun using a flow rate of 0.005 to 0.04 mL/min, a voltage of 10-20 kV and a tip to collector distance of 10-20 cm. Electrospinning is optionally gas assisted. Electrospinning of the fluid stock prepares an as-spun polymer/(nanoclay/nanoceramic) nanocomposite nanofiber.

Figure 53:
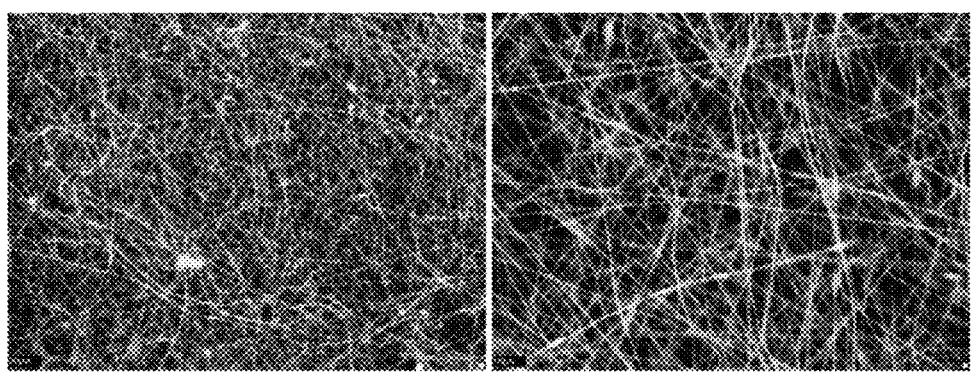
FIG. 53 illustrates SEM images of certain PAN:nanoclay nanofibers (91:9) provided herein.
Figure 54:
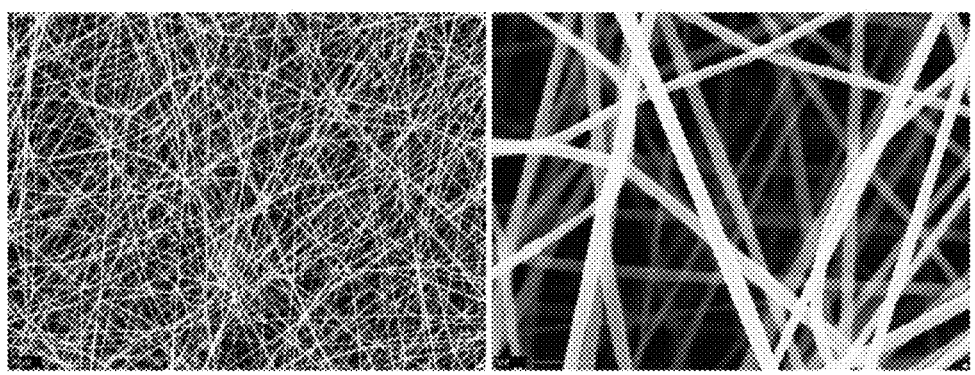
FIG. 54 illustrates SEM images of certain PAN nanofibers provided herein.

FIG. 53 illustrates nanofibers prepared with a PAN: nanoclay ratio of 91/9, 9.5 wt % pan in DMF. FIG. 54 illustrates nanofibers prepared without nanoclay (10 wt % PAN in DMF).

Example 28—Nanoclay in Polymer Matrix—Compressed Mats

Figure 55:
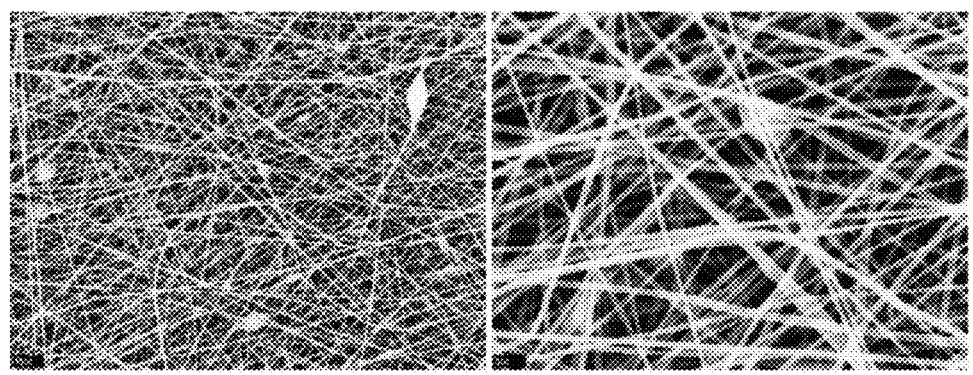
FIG. 55 illustrates SEM images of PAN/nanoclay (95.5/4.5) nanofibers compressed at 1 Mpa for 15 seconds.
Figure 56:
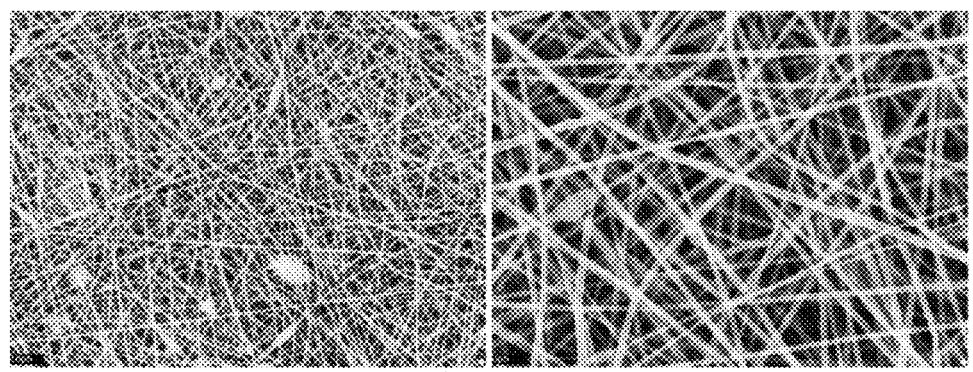
FIG. 56 illustrates SEM images of PAN/nanoclay (95.5/4.5) nanofibers compressed at 3 Mpa for 15 seconds.
Figure 57:
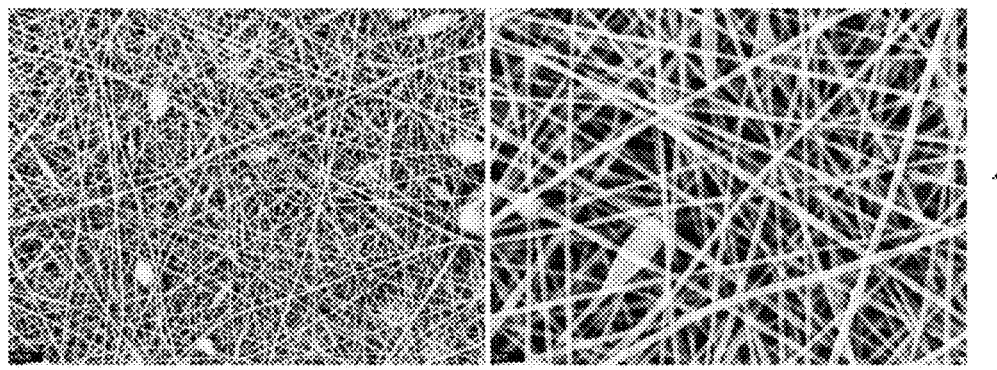
FIG. 57 illustrates SEM images of PAN/nanoclay (95.5/4.5) nanofibers compressed at 5 Mpa for 15 seconds. Panel A illustrates an SEM image of a front view and Panel B illustrates an SEM image of a back view of the compressed mat.
Figure 57:
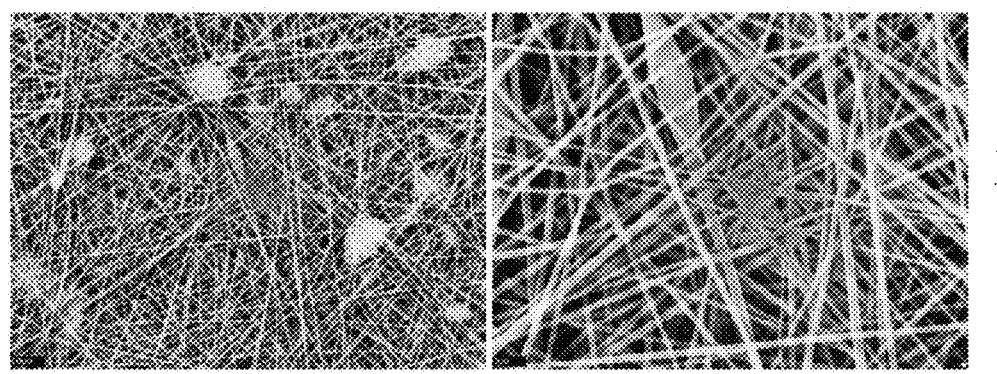

Nanocomposite (nanoclay or nanoceramic in polymer matrix) nanofibers are prepared according to a process of Example 27 in a non-woven mat and compressed. FIG. 55 illustrates SEM images of PAN/nanoclay (95.5/4.5 wt %) nanofibers compressed at 1 Mpa for 15 seconds. FIG. 56 illustrates SEM images of PAN/nanoclay (95.5/4.5 wt %) nanofibers compressed at 3 Mpa for 15 seconds. FIG. 57 illustrates SEM images of PAN/nanoclay (95.5/4.5 wt %) nanofibers compressed at 5 Mpa for 15 seconds. Panel A illustrates an SEM image of a front view and Panel B illustrates an SEM image of a back view of the compressed mat.

The nanofibers are optionally annealed at 150 C for 3 hours, before or after compression.

FIG. 47 illustrates the narrow pore size distribution for various PAN systems. The porosity is illustrated pure PAN, PAN/nanoclay nanocomposites compressed at 5 MPa, and PAN/nanoclay nanocomposites annealed and compressed at 5 Mpa. FIG. 48 illustrates the good resistance profile of the nanofibers systems provided herein. Nyquist plots are illustrated for pure PAN, and various PAN/nanoclay nanocomposites—fresh state cell test (constant voltage=VOC (1.7-2.0V)), stock $LiCoO_2$ electrode (32 mg) and Li metal). FIG. 49 illustrates charge capacity cycle tests for commercial polyethylene films compared to various PAN/NC nanofibers mats described herein. The first (top) line illustrates capacity retention of compressed PAN/NC separators; the second (from top) line illustrates capacity retention of annealed and compressed PAN/NC separators; the third (second from bottom) line illustrates capacity retention of not-compressed, not-annealed PAN/NC separators; and the four (bottom) illustrates capacity retention of commercial PE separator. FIG. 50 illustrates nanofiber stability/solvent analysis by TGA of annealed versus not annealed PAN/NC nanofibers. Observed range is from room temperature to 200 C at 2 C/min, under air flow with 20 mL/min. FIG. 51 illustrates C rate capacity tests for discharge capacity of half cells using 32 mg $LiCoO_2$ and Li metal. Programmed C rates are 0.63 mA for 5 cycles, 1.02 mA for 5 cycles, 2.30 mA for 5 cycles, and 6.90 mA for 5 cycles, repeat. The voltage sweep is between 2.5 V and 4.0 V. As seen in FIG. 51, the PAN/NC separators provided herein demonstrate improved performance over commercial PE separator. Similarly, FIG. 52 illustrates C rate capacity tests for discharge capacity of half cells—this time using 32.8 mg $LiMn_2O_4$ and Li metal. Programmed C rates are 0.46 mA for 5 cycles, 0.92 mA for 5 cycles, 1.38 mA for 5 cycles, 2.3 mA for 5 cycles, and 4.5 mA for 5 cycles. As seen in FIG. 52, the PAN/NC separators provided herein demonstrate improved performance over commercial PE separator.

Example 29—Full Cell Testing

Figure 59:
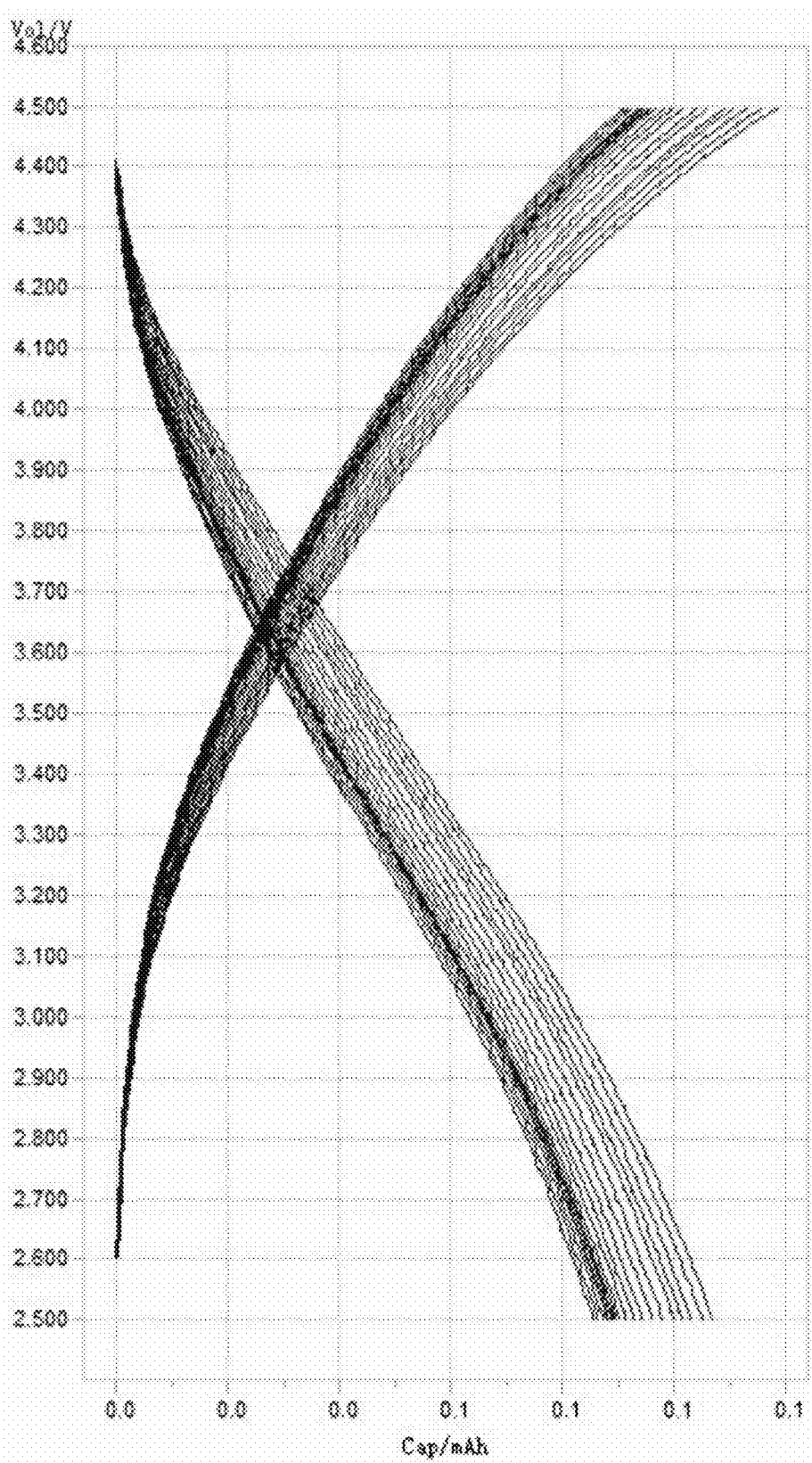
FIG. 59 illustrates the full cell performance of Si/C nanofibers with $Li(Ni_{1/3}Co_{1/3}Mn_{1/3})O_2$ nanofibers.
Figure 60:
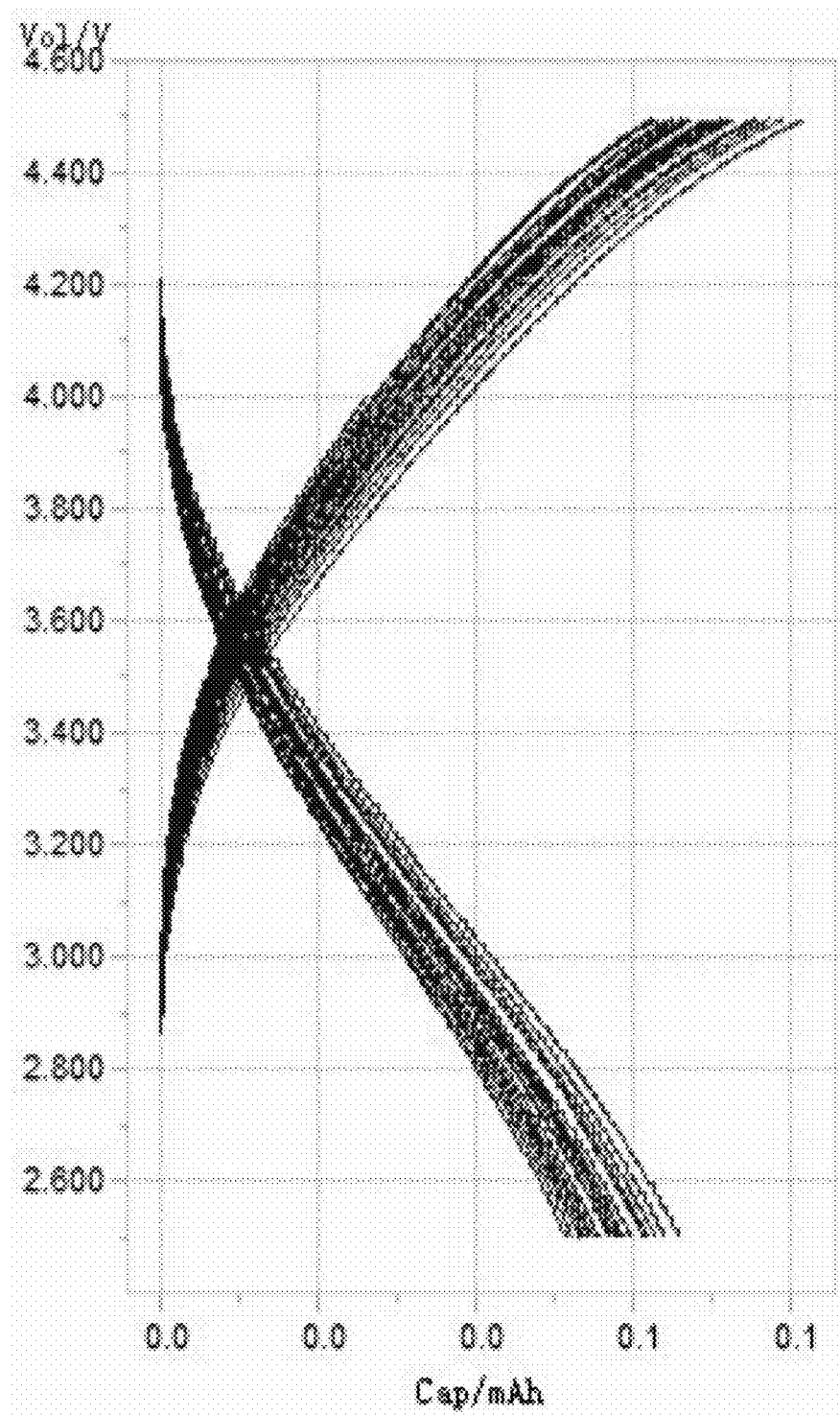
FIG. 60 illustrates the full cell performance of Si/C nanofibers with $Li[Li_{0.2}Mn_{0.56}Ni_{0.16}Co_{0.08}]O_2$ nanofibers.

Full cells are prepared using Si/C nanofibers provided herein as the anode/negative electrode and lithium-containing nanofibers provided herein as the cathode/positive electrode. The cells are prepared using a anode:cathode weight ratio of 1:1. FIG. 59 illustrates the full cell performance of Si/C nanofibers with ($Li(Ni_{1/3}$ $Co_{1/3}Mn_{1/3})O_2$) nanofibers. Initial capacity of some of such cells are 157 mAh per gram of anode. FIG. 60 illustrates the full cell performance of Si/C nanofibers with $Li[Li_{0.2}Mn_{0.56}Ni_{0.16}$ $Co_{0.08}]O_2$ nanofibers. Initial capacity of some of such cells are 150 mAh per gram of anode.

What is claimed is:

1. A process for producing a battery separator, the process comprising coaxially gas assisted electrospinning a fluid stock to form a nanofiber mat, the fluid stock comprising (i) a plurality of ceramic or clay nanoparticles, or a combination thereof, or a ceramic precursor, and (ii) a polymer, the separator comprising one or more nanofiber(s) comprising a continuous polymer matrix with ceramic or clay domains embedded therein to form the nanofibers, less than 25% of the embedded domains being aggregated.

2. The process of claim 1, further comprising annealing the nanofiber mat.

3. The process of claim 1, further comprising the act of compressing the nanofiber mat at a pressure between 0.1 Mpa to 10 Mpa, or the acts of annealing the nanofiber mat followed by compressing the nanofiber mat at a pressure between 0.1 Mpa to 10 Mpa.

4. The process of claim 1, wherein the polymer is a solvent soluble polymer.

5. The process of claim 2, wherein the nanofiber mat is annealed at a temperature between 100° C. and 300° C.

6. The process of claim 5, wherein the annealing of the nanofiber mat is performed under inert conditions.

7. The process of claim 2, wherein the nanofiber mat has a thickness of between 10-100 microns.

8. The process of claim 1, wherein the separator has an average pore size of between 0.25 micron and about 1 micron.

9. The process of claim 1, wherein less than 10% of the embedded domains are aggregated.

10. The process of claim 1, wherein the polymer comprises polyethylene (PE), ultra high molecular weight polyethylene (UHMWPE), polypropylene (PP), polyvinyl alcohol (PVA), polyacrylonitrile (PAN), polyvinylidene fluoride (PVDF), nylon, aramid, polyethylene terephthalate (PET), polyimide, polymethylmethacrylate (PMMA), or any combination thereof.

11. The process of claim 1, wherein the continuous polymer matrix comprises polyethylene (PE), ultra high molecular weight polyethylene (UHMWPE), polypropylene (PP), polyvinyl alcohol (PVA), polyacrylonitrile (PAN), polyvinylidene fluoride (PVDF), nylon, aramid, polyethylene terephthalate (PET), polyimide, polymethylmethacrylate (PMMA), or any combination thereof.

12. The process of claim 1, wherein the ceramic is selected from the group consisting of silica, zirconia, alumina, and any combination thereof.

13. The process of claim 1, wherein the separator comprises 1-15 wt. % ceramic.

14. The process of claim 13, wherein the separator comprises 3-12 wt. % ceramic.

15. The process of claim 1, wherein a weight ratio of the ceramic nanoparticles or the ceramic precursor to polymer present in the fluid stock is at least 1:5.

16. The process of claim 10, wherein the polymer is selected from the group consisting of polyacrylonitrile (PAN), polyvinylidene fluoride (PVDF), and any combination thereof.

17. The process of claim 11, wherein the continuous polymer matrix comprises polyacrylonitrile (PAN), polyvinylidene fluoride (PVDF), or any combination thereof.

18. A process for producing a battery separator, the process comprising coaxially gas assisted electrospinning a fluid stock to form a nanofiber mat, the fluid stock comprising (i) a plurality of ceramic or clay nanoparticles or a ceramic precursor, and (ii) a polymer, the separator comprising one or more nanofiber(s) comprising a continuous polymer matrix with non-aggregated ceramic or clay nanostructure(s) embedded therein, wherein the polymer matrix is PE, UHMPWPE, PP, PVA, PAN, PEO, PVP, PVDF, PMMA, or a combination thereof, and wherein the one or more polymer nanocomposite nanofiber(s) comprises 0.5-50 wt. % ceramic and/or clay.

19. The process of claim 1, wherein the nanofibers comprise a hollow core.

20. A process for producing a battery separator, the process comprising producing a non-woven mat of nanofibers by electrospinning a fluid stock to form nanofibers, the fluid stock consisting of: (i) a plurality of nanostructures comprising a clay, a ceramic, a ceramic precursor, or any combination thereof, (ii) a polymer portion comprising a polymer; and (iii) a solvent portion comprising an aqueous medium or a non-aqueous solvent; wherein the electrospinning is coaxially gas assisted to form a continuous polymer matrix with discrete non-aggregated ceramic and/or clay domains embedded therein.

\* \* \* \* \*